US007613796B2

(12) United States Patent
Harvey et al.

(10) Patent No.: US 7,613,796 B2
(45) Date of Patent: Nov. 3, 2009

(54) SYSTEM AND METHOD FOR CREATING IMPROVED OVERLAY NETWORK WITH AN EFFICIENT DISTRIBUTED DATA STRUCTURE

(75) Inventors: Nicholas J. Harvey, Redmond, WA (US); Michael B. Jones, Redmond, WA (US); Stefan Saroiu, Seattle, WA (US); Marvin M. Theimer, Bellevue, WA (US); Alastair Wolman, Seattle, WA (US); Atul Adya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 10/356,961

(22) Filed: Feb. 3, 2003

(65) Prior Publication Data

US 2004/0054807 A1    Mar. 18, 2004

Related U.S. Application Data

(60) Provisional application No. 60/409,735, filed on Sep. 11, 2002.

(51) Int. Cl.
G06F 15/177 (2006.01)
(52) U.S. Cl. .................. 709/220; 709/221; 709/222
(58) Field of Classification Search ............... 709/239, 709/243, 220
See application file for complete search history.

(56) References Cited

U.S. PATENT DOCUMENTS

| 4,142,069 | A |   | 2/1979  | Stover |
|-----------|---|---|---------|--------|
| 5,970,489 | A | * | 10/1999 | Jacobson et al. ............... 707/10 |
| 5,978,364 | A |   | 11/1999 | Melnik |
| 5,991,828 | A | * | 11/1999 | Horie et al. .................... 710/8 |
| 6,029,168 | A |   | 2/2000  | Frey |
| 6,134,553 | A | * | 10/2000 | Jacobson et al. ............... 707/10 |
| 6,249,813 | B1 |  | 6/2001  | Campion et al. |
| 6,430,527 | B1 | * | 8/2002 | Waters et al. .................. 703/3 |
| 6,522,632 | B1 | * | 2/2003 | Waters et al. ............... 370/254 |
| 6,611,872 | B1 |  | 8/2003  | McCanne |
| 6,636,854 | B2 | * | 10/2003 | Dutta et al. ................... 707/10 |
| 6,667,957 | B1 | * | 12/2003 | Corson et al. ............... 370/238 |
| 6,836,463 | B2 | * | 12/2004 | Garcia-Luna-Aceves et al. .......................... 370/238 |
| 6,975,631 | B1 | * | 12/2005 | Kastenholz ................. 370/401 |
| 7,043,644 | B2 | * | 5/2006 | DeBruine ................... 713/153 |
| 7,089,323 | B2 | * | 8/2006 | Theimer et al. ............. 709/238 |

(Continued)

FOREIGN PATENT DOCUMENTS

EP          0 465 090 A1    1/1992

(Continued)

OTHER PUBLICATIONS

Dunagan et al., "SkipNet: A scalable overlay network with practical ocality properties," Microsoft Research Technical Report MSR-TR-2002-92.*

(Continued)

*Primary Examiner*—Jeffrey Pwu
*Assistant Examiner*—Alicia Baturay
(74) *Attorney, Agent, or Firm*—Wolf, Greenfield & Sacks, P.C.

(57) ABSTRACT

A system and method for using skip nets to build and maintain overlay networks for peer-to-peer systems. A skip net is a distributed data structure that can be used to avoid some of the disadvantages of distributed hash tables by organizing data by key ordering. Skip nets can use logarithmic state per node and probabilistically support searches, insertions and deletions in logarithmic time.

32 Claims, 24 Drawing Sheets

U.S. PATENT DOCUMENTS

| | | | |
|---|---|---|---|
| 7,096,228 B2* | 8/2006 | Theimer et al. | 707/101 |
| 7,149,797 B1* | 12/2006 | Weller et al. | 709/223 |
| 7,194,552 B1* | 3/2007 | Schneider | 709/245 |
| 7,310,666 B2* | 12/2007 | Benfield et al. | 709/223 |
| 2002/0038296 A1 | 3/2002 | Margolus et al. | |
| 2002/0107934 A1* | 8/2002 | Lowery et al. | 709/213 |
| 2002/0116533 A1* | 8/2002 | Holliman et al. | 709/246 |
| 2003/0110252 A1* | 6/2003 | Yang-Huffman | 709/224 |
| 2003/0140051 A1 | 7/2003 | Fujiwara et al. | |
| 2003/0196024 A1* | 10/2003 | Frank | 711/3 |
| 2003/0212771 A1* | 11/2003 | Kwon et al. | 709/220 |
| 2004/0042403 A1* | 3/2004 | Xu et al. | 370/238 |
| 2004/0047350 A1* | 3/2004 | Zhang et al. | 370/392 |

FOREIGN PATENT DOCUMENTS

| | | |
|---|---|---|
| EP | 0 598 969 A1 | 6/1994 |
| EP | 1 113 372 A2 | 7/2001 |
| EP | 1 248 441 A2 | 10/2002 |
| WO | WO 99/66681 A1 | 12/1999 |

OTHER PUBLICATIONS

Ratnasamy et al., "Routing algorithms for DHTs: some open questions," Electronic Proceedings for the 1st International Workshop on Peer-to-peer systems (IPTPS '02), Mar. 7-8, 2002, MIT Faculty Club, Cambridge, MA (2002).*

Rowstron et al., "Pastry: Scalable, distributed object location and routing for large scale peer-to-peer systems," IFIP/ACM International Conference on Distributed Systems Platforms (Middleware), Heidelberg, Germany, pp. 329-350, (Nov. 2001).*

Stoica, I. et al., Chord: A Scalable Peer-to-Peer Lookup Service for Internet Applications, 2001, ACM Press, Proceedings of the 2001 Conference on Applications, Technologies, Architectures, and Protocols for Computer Communications, p. 149-160.*

Hildrum, K., et al., Distributed Object Location in a Dynamic Network, Aug. 10-13, 2002, ACM, Proceedings of the Fourteenth Annual ACM Symposium on Parallel Algorithms and Architectures, pp. 41-52.*

Castro, Miguel et al., "Topology-aware routing in structured peer-to-peer overlay networks," Microsoft Corporation, http://research.microsoft.com/scripts/pubs/view.asp?TR_ ID=MSR-TR-2002-82 (Sep. 2002) pp. 1-18.

Pugh, "Skip Lists: A Probabilistic Alternative to Balanced Trees", Communications of the ACM, 33(6), 668-676 (Jun. 1990).

Tannenbaum, "Network Layer Design Issues", Computer Networks, 289-309 (Jun. 1992) XP 002017557.

Aspnes et al., "Skip graphs," Fourteenth Annual ACM-SIAM Symposium on Discrete Algorithms, pp. 384-393 (Jan. 2003).

Bozanis et al. "DSL: Accommodating skip lists in the SDDS model," Proceedings 3rd Workshop on Distributed Data and Structures (WDAS 2000), L'Aquila, Italy (2000).

Harvey et al., "SkipNet: A scalable overlay network with practical ocality properties," Microsoft Research Technical Report MSR-TR-2002-92 (2003).

Keleher et al., "Are virtualized overlay networks too much of a good thing?" Electronic Proceedings for the 1st International Workshop on Peer-to-Peer Systems (IPTPS '02), Mar. 7-8, 2002, MIT Faculty Club, Cambridge, MA (2002).

Munro et al., "Deterministic skip lists," Proc. 3rd Annual ACM-SIAM Symposium on Discrete Algorithms, pp. 367-375 (1992).

Pugh, "A skip list cookbook," University of Maryland Technical Report CS-TR-2286.1 (Jul. 1989).

Ratnasamy et al., "A scalable content-addressable network," Proceedings of ACM SIGCOMM, San Diego, CA, pp. 161-172 (Aug. 2001).

Ratnasamy et al., "Routing algorithms for DHTs: some open questions," Electronic Proceedings for the 1st International Workshop on Peer-to-Peer Systems (IPTPS '02), Mar. 7-8, 2002, MIT Faculty Club, Cambridge, MA (2002).

Rowstron et al., "Pastry: Scalable, distributed object location and routing for large-scale peer-to-peer systems," IFIP/ACM International Conference on Distributed Systems Platforms (Middleware), Heidelberg, Germany, pp. 329-350 (Nov. 2001).

Stoica et al., "Chord: A scalable peer-to-peer lookup service for Internet applications," Proc. ACM SIGCOMM '01, San Diego, CA (Aug. 2001).

Zhao et al. "Tapestry: An infrastructure for fault-tolerant wide-area location and routing," University of California-Berkeley Technical Report UCB/CSD-01-1141 (Apr. 2001).

F. Ergun, S. Mittra, S. C. Sahinalp, J. Sharp and R. K. Sinha, "A Dynamic Lookup Scheme for Bursty Access Patterns," IEEE INFOCOM 2001, pp. 1444-1453.

Final Office Action for Japanese Patent Application No. 2003-316039 mailed Feb. 3, 2009.

W. Pugh, "A Skip List Cookbook," Jun. 1990, pp. 2-14.

W. Pugh, "Skip Lists: A Probabilistic Alternative to Balanced Trees," Communications of the ACM, Jun. 1990, pp. 668-675, vol. 33, No. 6.

* cited by examiner

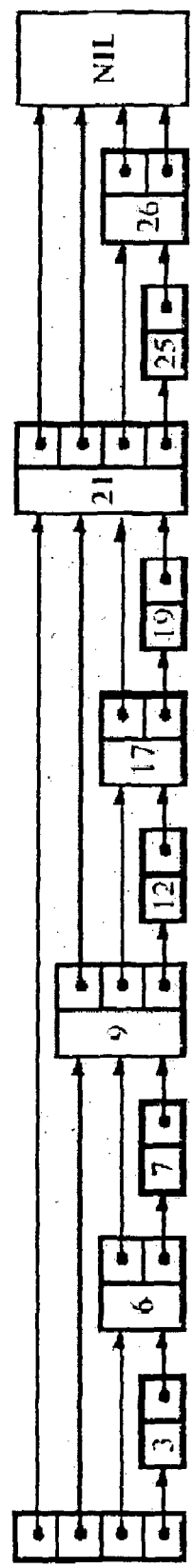
Figure 7a: A Perfect Skip List
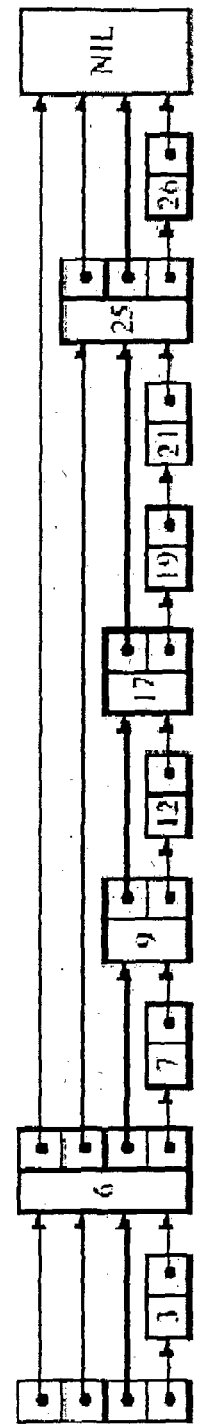
Figure 7b: A Probabilistic Skip List

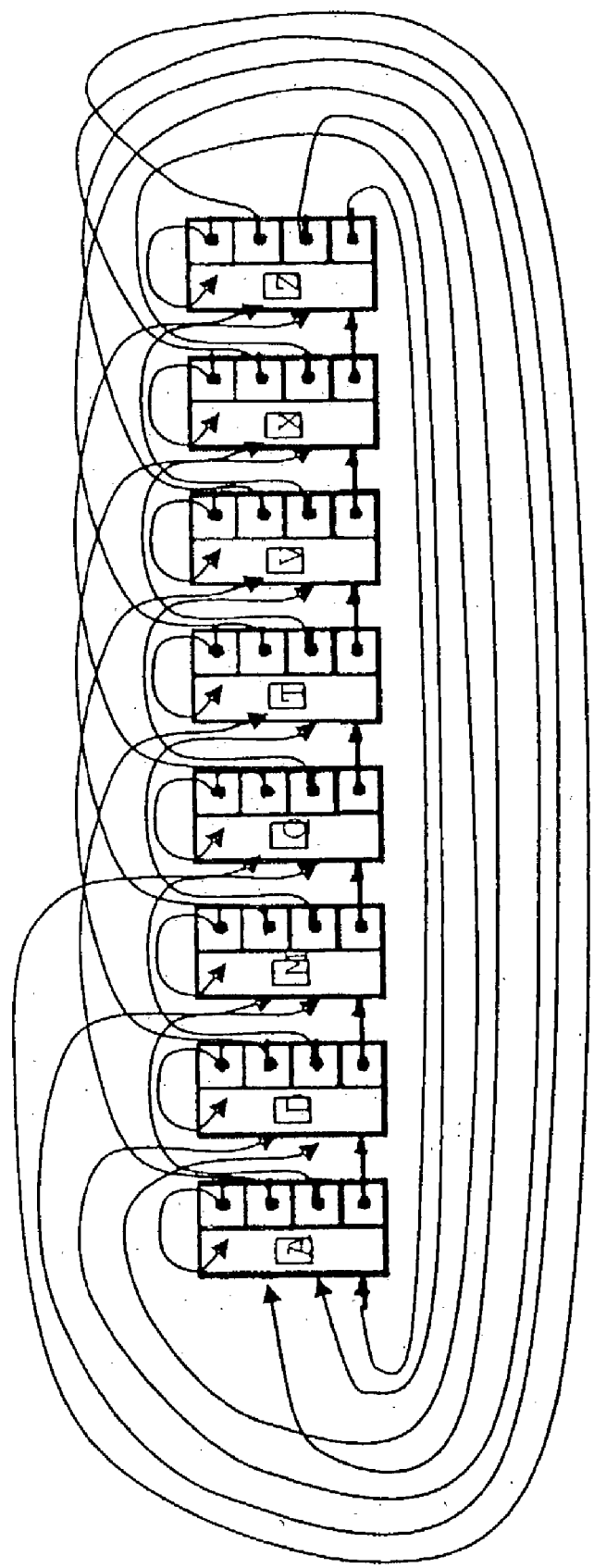
Figure 8: perfect Skip Net containing 8 elements

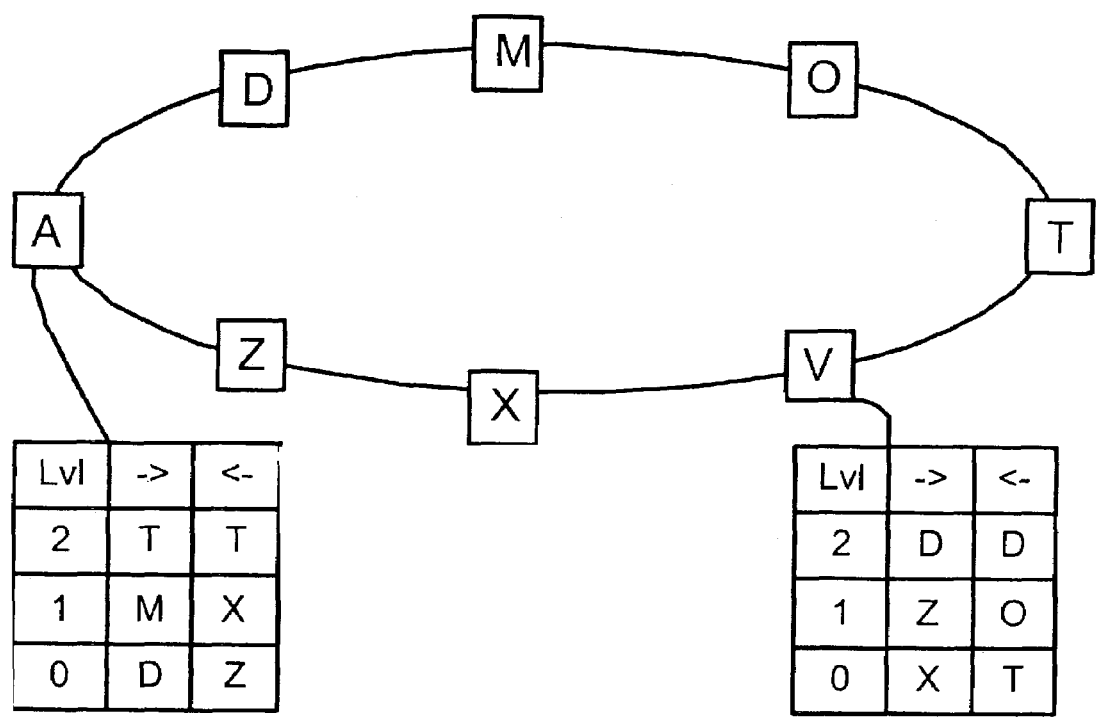
Figure 9. *SkipNet nodes ordered by name ID. Routing tables of nodes A and V are shown.*

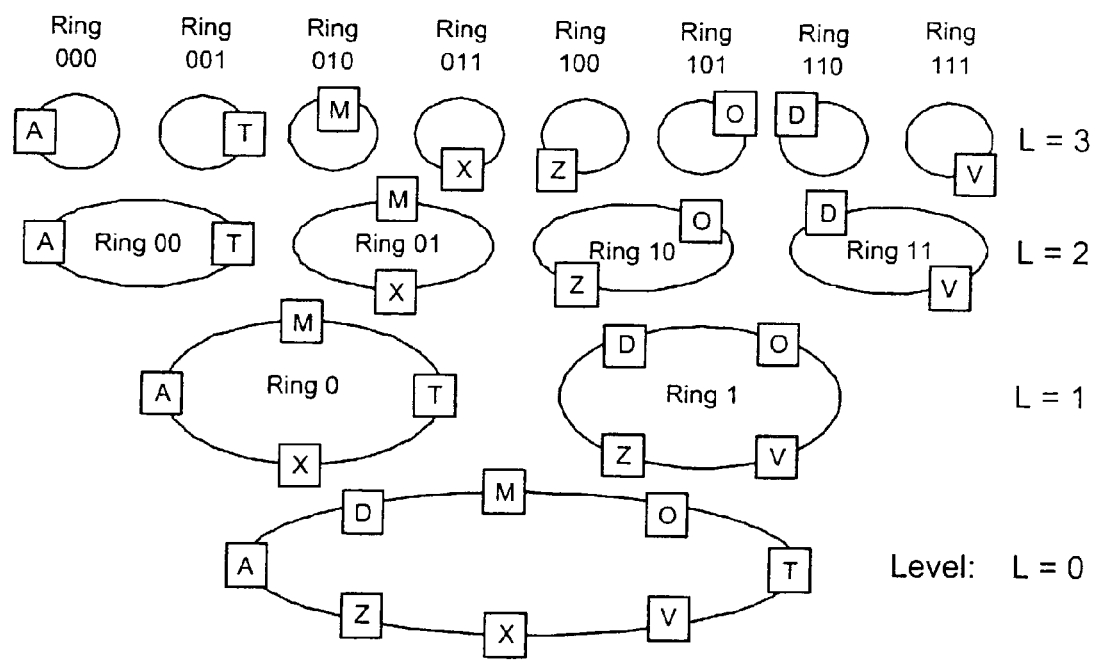
Figure 10. *The full SkipNet routing infrastructure for an 8 node system, including the ring labels.*

```
RouteByNameID(nameID, msg) {
    rmsg = new(RouteByNameMessage);
    rmsg.msg = msg;
    rmsg.routingOperation = routeByName;
    rmsg.nameID = nameID;
    if (nameID < localNode.nameID)
        rmsg.direction = counterClockwise;
    else if (nameID > localNode.nameID)
        rmsg.direction = clockwise;

RouteMessageByNameID(rmsg);
}

// Invoked for every message arriving at a node that has
// msg.routingOperation set to routeByName.
RouteMessageByNameID(msg) {
    h = localNode.maxHeight;
    while (h > 0) {
        nbr = localNode.RoutingTable[msg.direction][h];
        if (LiesBetween(localNode.nameID, nbr.nameID,
                        msg.nameID, msg.direction)) {
            SendToNode(msg, nbr);
            return;
        } else {
            h = h - 1;
        }
    }
    // At h=0 the destination is between localNode and nbr.
    if (ClosestNode(nameID, localNode.nameID,
                    nbr.nameID) == localNode)
        DeliverMessage(msg.msg);
    else
        SendToNode(msg, nbr);
}
```

Figure 11. *The algorithm for routing by name ID in SkipNet.*

```
RouteByNumericID(numericID, msg) {
  rmsg = new(RouteByNumberMessage);
  rmsg.routingOperation = routeByNumber;
  rmsg.numericID = numericID;
  rmsg.currH = -1;
  rmsg.startNode = null;
  rmsg.bestNode = null;
  rmsg.finalDestination = false;

RouteMessageByNumericID(rmsg);
}

// Invoked for every message arriving at a node that has
// msg.routingOperation set to routeByNumber.
RouteMessageByNumericID(msg) {
  if (msg.numericID == localNode.numericID ||
      msg.finalDestination) {
    DeliverMessage(msg.msg);
    return;
  } if (localNode == msg.startNode) {
    msg.finalDestination = true;
    SendToNode(msg.bestNode);
    return;
  } h = LongestCommonPrefixLen(msg.numericID,
                             localNode.numericID);
  if (h > msg.currH) {
    msg.currH = h;
    msg.startNode = msg.bestNode = localNode;
  } else if ( abs(localNode.numericID - msg.numericID)
              < abs(msg.bestNode.numericID - msg.numericID)) {
    msg.bestNode = localNode;
  } nbr = localNode.RoutingTable[clockWise||msg.currH];
  SendToNode(nbr);
}
```

Figure 12. *Algorithm to route by numeric ID in SkipNet*

```
InsertNode(nameID, numericID) {
    msg = new{JoinMessage};
    msg.operation = findTopLevelRing;
    msg.joiningNode = localNode;
    msg.nameID = nameID;
    msg.numericID = numericID;
    RouteByNumericID(numericID, msg);
}

// Called when a message that has been routed by nameID
// or numericID reaches its final destination.
DeliverMessage( msg ) {
    ...
    else if (msg.operation == findTopLevelRing) {
        InsertNodeIntoRings(msg.joiningNode,
                            msg.nameID, msg.numericID);
    }
    ...
}

InsertNodeIntoRings(joiningNode, nameID, numericID) {
    msg = new(CollectRingNeighborsMessage);
    msg.routingOperation = collectRingNeighbors;
    msg.joiningNode = localNode;
    msg.nameID = nameID;
    msg.numericID = numericID;
    msg.currH = LongestCommonPrefix(localNode.numericID,
                                    numericID);
    msg.ringNeighbors = new Node[msg.currH];
    msg.doInsertions = false;
    CollectRingNeighbors(msg);
}

// Invoked for every message arriving at a node that has
// msg.routingOperation set to collectRingNeighbors.
CollectRingNeighbors(msg) {
    if (!msg.doInsertions) {
        for (i = 0; i < msg.ringNeighbors.Length; i++)
            AtomicDistrRoutingTableInsert(i, msg.ringNeighbors[i]);
        return;
    }
    while (msg.currH >= 0) {
        nbr = localNode.RoutingTable[clockWise][msg.currH];
        if (LiesBetween(localNode.nameID, msg.nameID,
                        nbr.nameID, clockWise)) {
            msg.ringNeighbors[msg.currH] = nbr;
            msg.currH = msg.currH - 1;
        } else {
            SendToNode(msg, nbr);
            return;
        }
    }
    msg.doInsertions = true;
    SendToNode(msg, msg.joiningNode);
}
```

Figure 13. *SkipNet node insertion algorithm.*

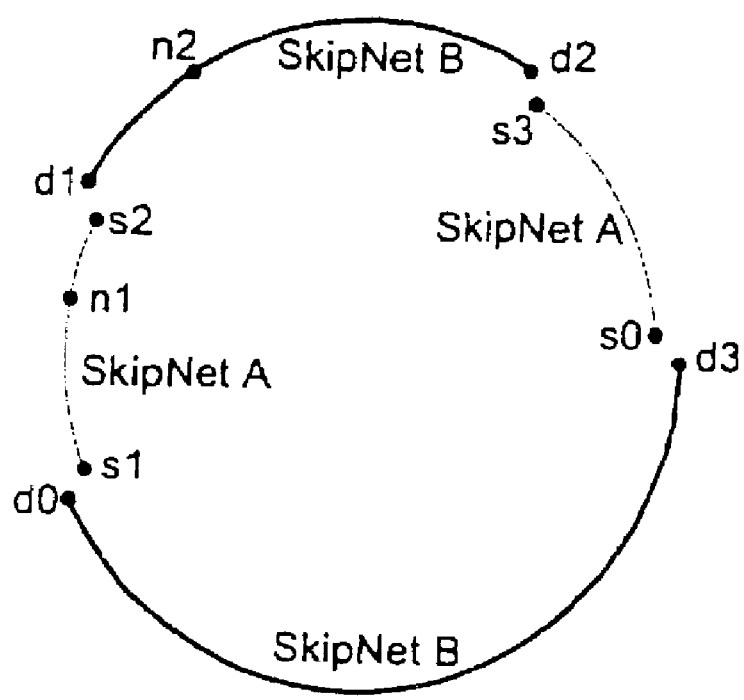
Figure 14. *Two partitioned SkipNets to be merged.*

```
Level0Connect(n1, n2) {
    edgeNodes = GatherEdgeNodeInfo(n1, n2, null)
    Connect all edge node pairs in one atomic operation.
}

GatherEdgeNodeInfo(n1, n2, msg) {
    n2 routes msg to n1 in its SkipNet.  Msg will arrive at d1.
    d1 appends d1 and next neighbor, d0, to msg contents.
    d1 sends msg directly to n1 over IP.
    n1 routes msg to d0 in its SkipNet.  Msg will arrive at s1.
    if (memberOf(s0, msg contents))  // -> all segments traversed
        return msg contents
    else  // -> Message needs to discover more edge nodes
        s1 appends s1 and next neighbor, s0, to msg contents.
        return GatherEdgeNodeInfo(s0, d0, msg)
}
```

Figure 15. *SkipNet level 0 ring connection algorithm.*

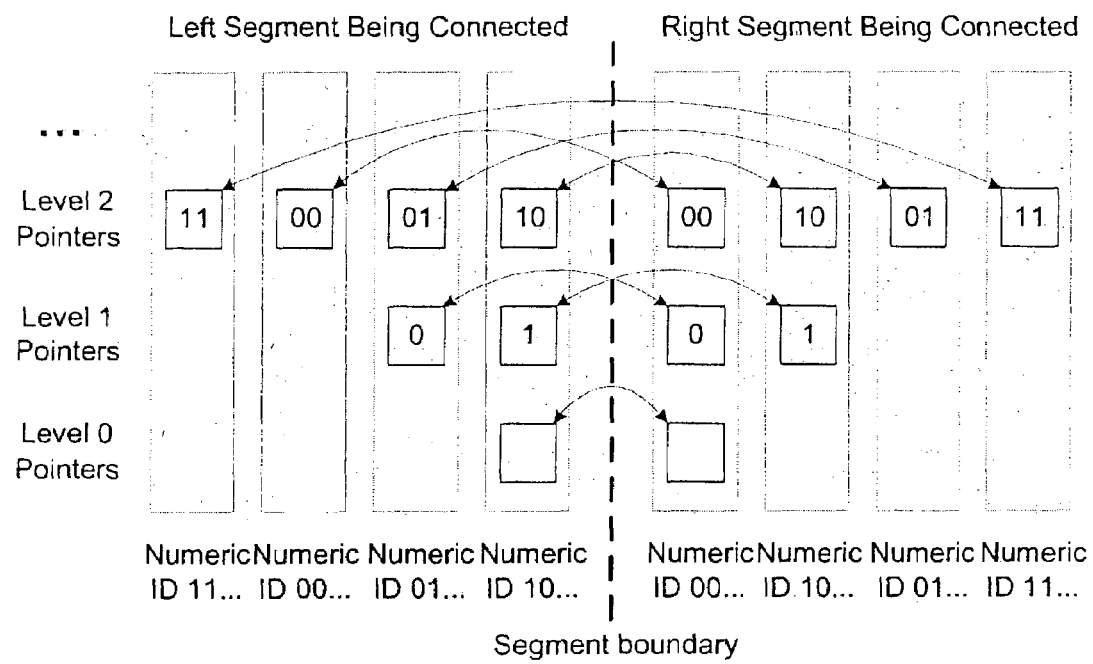
Figure 16. *Nodes whose pointers have been repaired at the boundary of two SkipNet segments.*

```
// Called initially with level h=0 at node
// to the left of the merge point
PostMergeRepair(h) {
    Find closest node to left whose numeric ID matches mine
        in the first h bits and whose ID differs from mine in the
        next bit, by following level h pointers to the left.
    On my node:
        cont = FixMyRightPointer(h+1)
        if (cont) PostMergeRepair(h+1)
    In parallel, on the other node:
        cont2 = FixMyRightPointer(h+1)
        if (cont2) PostMergeRepair(h+1)
}

FixMyRightPointer(h) {
    Search right using level h-1 pointers until a node is found
        that matches my numeric id in h bits.
    Connect our level h pointers.
    if (pointers are both from the same segment) return false
    else return true
}
```

Figure 17. *Level h ring repair algorithm for a single inter-segment boundary.*

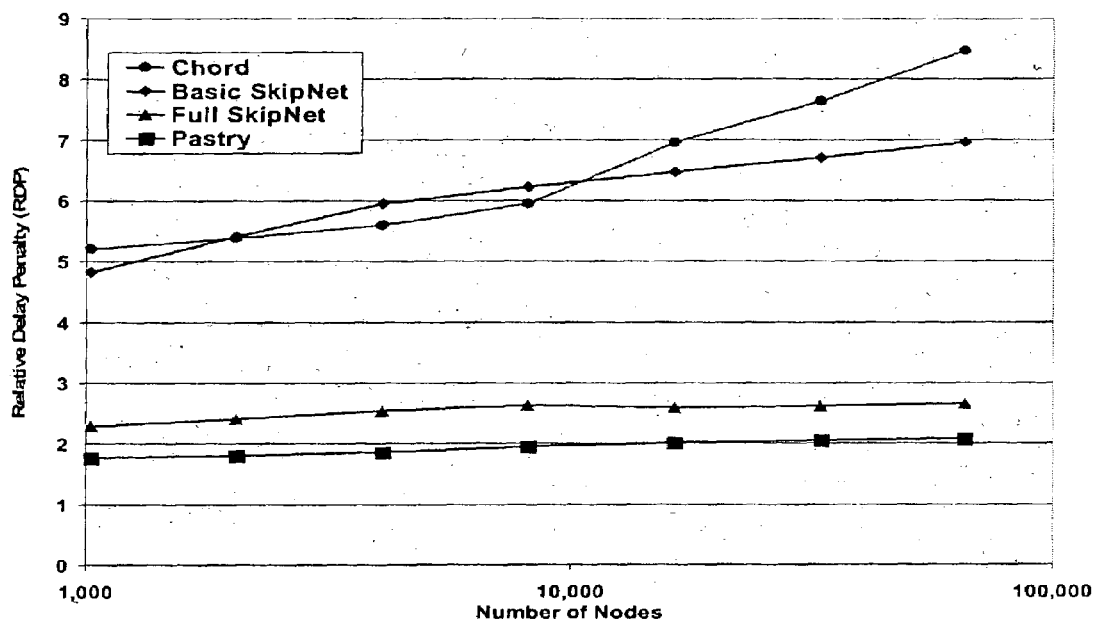
Figure 18. *RDP as a function of network size. Configuration: 1000 organizations with Zipf-like sizes, nodes and data names are Zipf-clustered.*

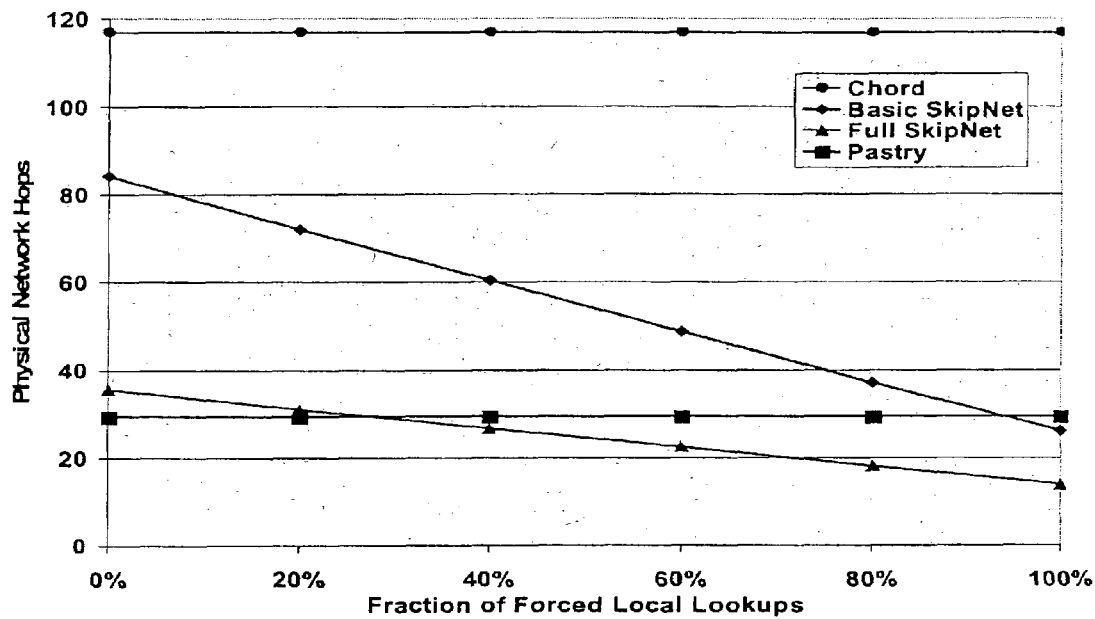
Figure 19. *Absolute lookup request latency as a function of data access locality (percentage of lookup requests forced to be within a single organization). Configuration: $2^{16}$ nodes, 100 organizations with Zipf-like sizes, nodes and data names are Zipf-clustered.*

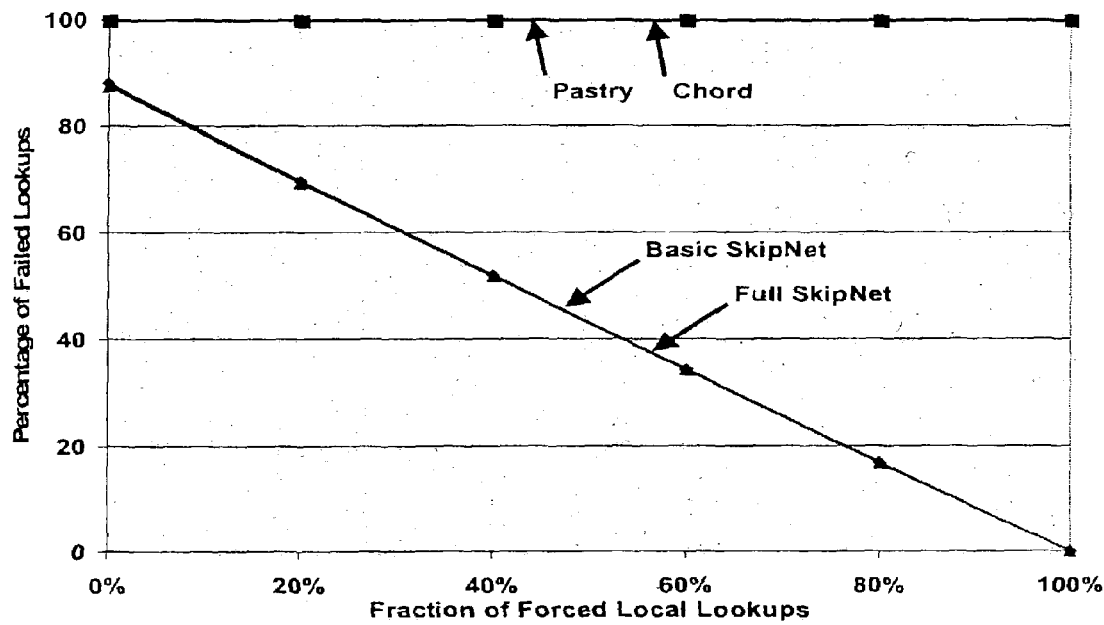
Figure 20. *Number of failed lookup requests as a function of data access locality (percentage of lookup requests forced to be within a single organization) for a disconnected organization. Configuration:* $2^{16}$ *nodes, 100 organizations with Zipf-like sizes, nodes and data names are Zipf-clustered.*

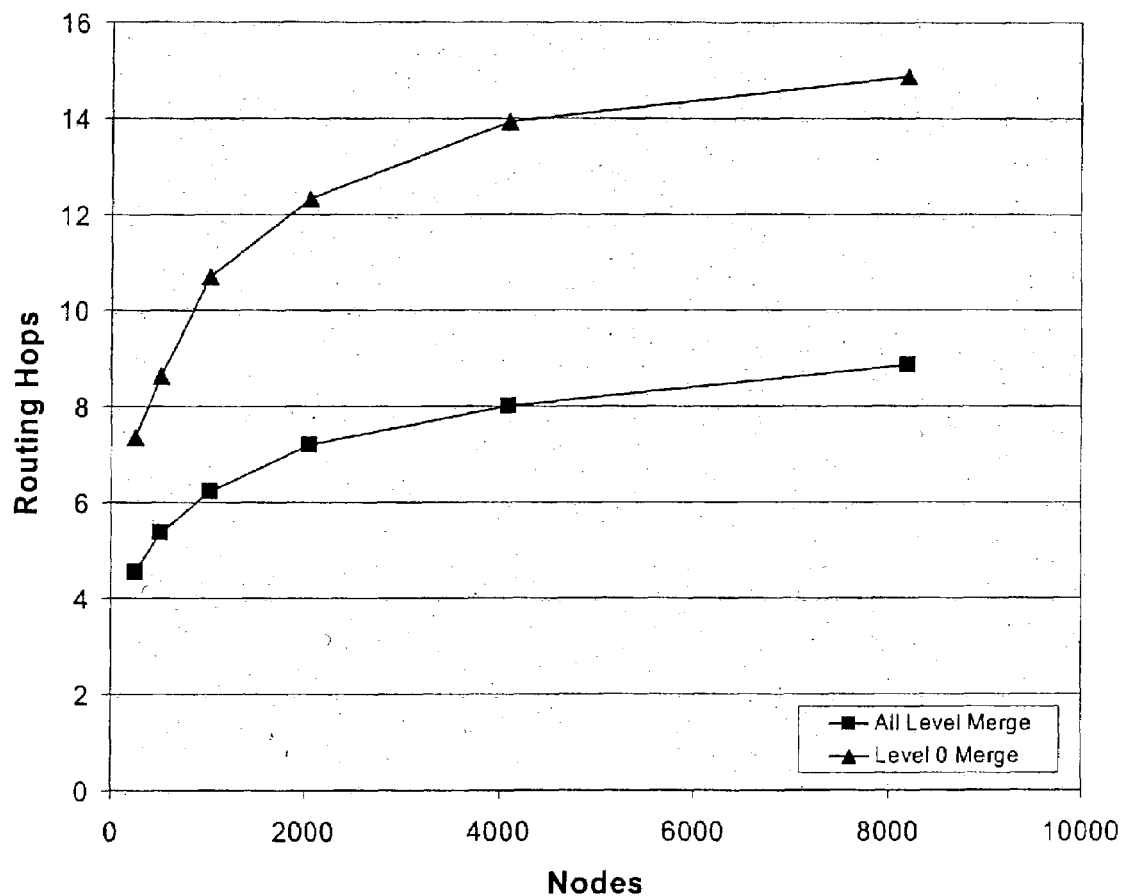
Figure 21. *Number of routing hops taken to route inter-organizational messages, as a function of network size, after an organization's internal SkipNet has been reconnected to the global SkipNet at level 0 and after the merge has been fully completed.*

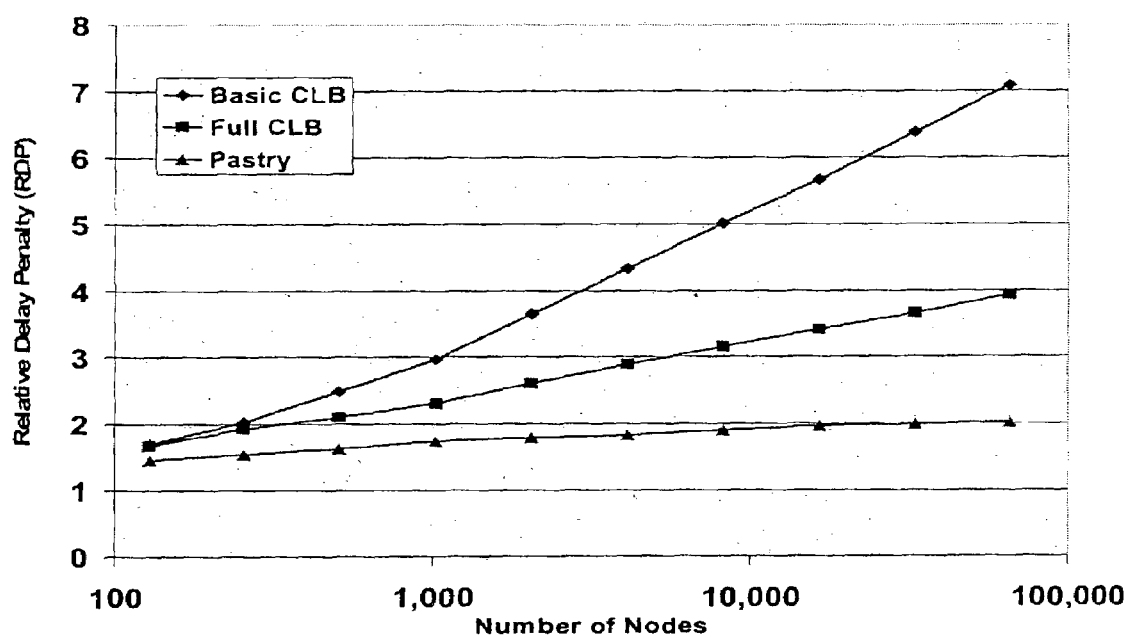
Figure 22. *RDP of lookups for data that is constrained load balanced (CLB) as a function of network size. Configuration: 100 organizations with Zipf-like sizes, nodes and data names are Zipf-clustered.*

SYSTEM AND METHOD FOR CREATING IMPROVED OVERLAY NETWORK WITH AN EFFICIENT DISTRIBUTED DATA STRUCTURE

RELATED APPLICATIONS

This application is related to and claims priority from like-titled U.S. provisional application Ser. No. 60/409,735 filed on Sep. 11, 2002, having as named inventors Alastair Wolman, Marvin M. Theimer, Michael B. Jones, Nicholas J. A. Harvey, and Stefan Saroiu, which provisional application is incorporated herein by reference in its entirety.

FIELD OF THE INVENTION

This invention generally relates to computer networks, and more particularly, to overlay networks usable for peer-to-peer network applications and distributed databases.

BACKGROUND

As ever increasing numbers of computers are networked together on the Internet, the usefulness and importance of peer-to-peer (P2P) network applications and distributed databases have become evident.

A peer-to-peer network is generally thought of as a self-managed network of computers in which there is no single server or controller responsible for maintaining the network. A number of different architectures are available for creating peer-to-peer networks and applications. One such architecture is an overlay network. In general, overlay networks provide a level of indirection over traditional networking addresses such as Internet Protocol (IP) addresses. An important benefit of using an overlay network is that routing decisions can be made by application software.

FIG. 1A illustrates a typical overlay network. The computers (10) that belong to the overlay network route messages between each other, using the underlying network medium 11. While the underlying network medium has the information and capability to directly route messages between specific computers, overlay networks typically maintain only partial routing information and rely on successive forwarding through intermediate nodes in order to deliver a message to its final intended destination. One common use for overlay networks is in building distributed hash tables. Each computer name is run through a hashing algorithm (e.g., an MD5 hash) to generate a GUID (globally unique identifier). Each member of the overlay network stores a part of the distributed hash table. When a request or update for a document is sent from a node on the overlay network, the originating node hashes the requested document's filename, and then looks through its routing table entries to find the node whose ID is closest to the document's hash. The request is then forwarded to this closest intermediate node. The intermediate node follows the same process, comparing the document's hash with the intermediate node's routing table entries. The overlay network maintains enough information in its routing tables to be able to tell when a node's ID is closer to a document's hash than any other node's ID. That closest node is then responsible for storing the document and responding to queries for it.

Current examples of overlay network types for peer-to-peer networks include Tapestry developed at the University of California at Berkeley by Ben Y. Zhao, et al., Chord developed at the Massachusetts Institute of Technology, and Pastry, developed by Microsoft. Tapestry, Chord and Pastry are toolkits for building distributed systems.

Tapestry provides a peer-to-peer, wide-area decentralized routing and location network infrastructure. It is an overlay network that sits at the application layer (on top of an operating system). When deployed on separate machines in the network, Tapestry allows any node to route messages to any other node in the network, given a location and network independent name. Furthermore, any node in a Tapestry network can advertise or "publish" location information about objects it possesses, in a manner such that applications on other Tapestry nodes can find these objects easily and efficiently, given the object name. Tapestry forms individual machines into a true peer-to-peer network, without any points of centralization that might become points of failure or attack.

Pastry is a generic, scalable and efficient substrate for peer-to-peer applications. Pastry nodes form a decentralized, self-organizing and fault-tolerant overlay network within the Internet. Pastry provides efficient request routing, deterministic object location, and load balancing in an application-independent manner. Furthermore, Pastry provides mechanisms that support and facilitate application-specific object replication, caching, and fault recovery.

MIT's Chord project relates to scalable, robust distributed systems using peer-to-peer ideas. Chord is based on a distributed hash lookup primitive. Chord is decentralized and symmetric, and can find data using only log(N) messages, where N is the number of nodes in the system. There are other overlay systems in addition to these. For example, CAN, Kademlia and Viceroy are other systems that are similar. New overlay designs are appearing on a frequent basis.

Many existing systems such as Tapestry, Pastry and Chord typically depend on characteristics of hashing, although in slightly different ways. These include uniformly distributed identifiers, arithmetic in the identifier space, and fixed-length identifiers. Both Chord and Pastry depend on the first property for efficient operation. Chord depends on arithmetic in the identifier space to decide on its 'fingers.' Finally, Pastry depends on fixed-length identifiers in order to guarantee fixed-depth routing tables.

The use of hashing is clearly also integral in implementing distributed hash tables. The primary benefit of hashing is the uniform distribution of data among nodes. This feature is often touted as 'load-balancing' but it is only one simple aspect of a load-balancing design. Many overlay networks based on hashing lack locality features that are important for certain peer-to-peer applications. See for example: Pete Keleher, Bobby Bhattacharjee, Bujor Silaghi, "*Are Virtualized Overlay Networks Too Much of a Good Thing?*" (IPTPS 2002). Two such features that are useful for peer-to-peer systems, but that are difficult to implement in hash-based overlay networks are content locality and path locality.

Content locality refers to the ability to store a data item on a specific node. In a more coarse form, content locality is the ability to store a data item on any one of a specific set of nodes. It is not unusual for enterprises such as corporations or government agencies to implement complex network security measures to prevent sensitive documents from being distributed outside the entity's network. Thus, these enterprises are unlikely to use peer-to-peer applications that do not provide control over where particular documents are stored. For example, XYZ Corporation may want to ensure that certain documents are only stored on computers belonging to the xyz.com domain.

Path locality refers to the ability to guarantee that the routing path between any two nodes in a particular region of the network does not leave that region. The region may be a building, an administrative domain, etc. Using the example above, XYZ Corporation may desire to restrict sensitive messages from being routed outside the xyz.com domain. Using path locality, a message from UserA (usera@xyz.com) to UserB (userb@xyz.com) could be restricted such that it is only routed across computers in the xyz.com domain. This may be of particular importance if some of the other domains on the overlay network belong to competitors of XYZ Corporation.

Current hash-based systems do not inherently support content locality or path locality. Indeed, their whole purpose is to uniformly diffuse load across all machines of a system. Thus, the pervasive use of hashing in those systems may actually reduce or prevent control over where data is stored and how traffic is routed.

Thus, an improved system and method for creating overlay networks is needed. In particular, an overlay network capable of providing content locality is desired. An overlay network that is capable of providing path locality is also desirable. Furthermore, an overlay network that can provide the content locality and path locality features while retaining the routing performance of existing overlay networks is desirable.

The following references may provide further useful background information for the convenience of the reader:

[1] I. Stoica, R. Morris, D. Karger, M. F. Kaashoek, and H. Balakrishnan, "Chord: A scalable peer-to-peer lookup service for Internet applications," *Proc. ACM SIGCOMM'01*, San Diego, Calif., August 2001.
[2] A. Rowstron and P. Druschel, "Pastry: Scalable, distributed object location and routing for large-scale peer-to-peer systems," *IFIP/ACM International Conference on Distributed Systems Platforms (Middleware)*, Heidelberg, Germany, pages 329-350, November 2001.
[3] Sylvia Ratnasamy, Paul Francis, Mark Handley, Richard Karp, and Scott Shenker, "A Scalable Content-Addressable Network," *Proceedings of ACM SIGCOMM*, San Diego, Calif., pp. 161-172, August 2001.
[4] Ben Y. Zhao, John D. Kubiatowicz, and Anthony D. Joseph, "Tapestry: An Infrastructure for Fault-tolerant Wide-area Location and Routing," U. C. Berkeley Technical Report.
[5] W. Pugh, "Skip Lists: A Probabilistic Alternative to Balanced Trees," *Communications of the ACM*, vol. 33, no. 6, June 1990, pp. 668-676.
[6] W. Pugh, "A Skip List Cookbook," Technical Report CS-TR-2286.1, University of Maryland, 1989.
[7] J. I. Munro, T. Papadakis and R. Sedgewick, "Deterministic skip lists," *Proc. 3rd Annual ACM-SIAM Symposium on Discrete Algorithms*, pages 367-375, 1992.
[8] Bozanis P. and Manolopoulos Y., "DSL: Accommodating Skip Lists in the SDDS Model," *Proceedings 3rd Workshop on Distributed Data and Structures (WDAS'2000)*, L'Aquila, 2000.

SUMMARY

As noted above, distributed hash tables built upon scalable peer-to-peer overlay networks have recently emerged as flexible infrastructure for building peer-to-peer systems. Two disadvantages of such systems are that it is difficult to control where data is stored and it is difficult to guarantee that routing paths stay within an administrative domain. A skip net is a type of distributed data structure that can be utilized to compensate for the disadvantages of distributed hash tables by organizing data by key ordering. Skip nets can use logarithmic state per node, and can support searches, insertions, and deletions in logarithmic time. Skip nets may also have several other potential advantages over distributed hash tables, depending on the implementation. These potential advantages may include support for efficient range queries, a more efficient way of implementing multiple virtual nodes on a physical node, a more efficient way of dealing with partition failures in which an entire organization or other separable segment is disconnected from (and later reconnected to) the rest of the system, and an ability to load balance over a specified subset of all nodes participating in the system.

Improved systems and methods for creating, managing, and operating overlay networks using skip nets are disclosed herein. Advantageously, these systems have the potential to overcome some of the drawbacks typically associated with the use of distributed hash tables. In an embodiment, a method for creating an overlay network for a peer-to-peer network application is contemplated. In particular, a routing table as depicted in various forms in FIGS. 2 and 8, encodes ring structures, and can be utilized either in numeric space or lexicographic space. Two additional tables are preferably created to optimize routing in numerical and lexicographic space respectively by accounting for network proximity. The hash value used to establish the numeric address space is also used to determine which rings a particular node will join, ensuring a probabilistic resultant net.

Methods for storing and retrieving files on an overlay network are also disclosed. In some embodiments, the methods may include constraining a file to a particular subset of the overlay network (e.g., by limiting storage of the file to a particular domain or domains). One embodiment of such constrained load balancing entails initially routing in name space before transitioning to numeric space, discussed below, near the end of routing to provide load balancing associated with the pseudo-random nature of the numeric space address assignments.

A method for repairing skip net-based overlay networks is also disclosed, as is a method for more efficiently hosting multiple virtual nodes on a single computer.

Additional features and advantages of the invention will be set forth in the description that follows, and in part will be apparent from the description, or may be learned by the practice of the invention. The features and advantages of the invention may be realized and obtained by means of the instruments and combinations particularly pointed out in the appended claims. These and other features of the present invention will become more fully apparent from the following description and appended claims. The headings included below in the detailed description are for organizational purposes only and are not intended to limit or modify the scope of the invention or the appended claims.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 7A-B are skip list diagrams illustrating a perfect skip list and a probabilistic skip list;

FIG. 8 is a pointer diagram corresponding to a perfect skip list according to an embodiment of the invention;

FIG. 9 is a schematic network diagram of a skip net ring according to an embodiment of the invention;

FIG. 10 is a schematic network diagram of a skip net according to an embodiment of the invention;

FIG. 11 is an illustration of a routing algorithm according to an embodiment of the invention;

FIG. 12 is an illustration of another routing algorithm according to an embodiment of the invention;

FIG. 13 is an illustration of a skip net node insertion algorithm according to an embodiment of the invention;

FIG. 14 is a schematic network diagram showing merger of skip net partitions according to an embodiment of the invention;

FIG. 15 is an illustration of a skip net level zero ring connection algorithm according to an embodiment of the invention;

FIG. 16 is a pointer diagram showing node pointers at boundary nodes after repair according to an embodiment of the invention;

FIG. 17 is an illustration of a skip net level h ring repair algorithm according to an embodiment of the invention;

FIG. 18 is a chart showing relative delay penalty as a function of network size for various networks including networks according to embodiments of the invention;

FIG. 19 is a chart showing absolute lookup request latency as a function of data access locality for various networks including networks according to embodiments of the invention;

FIG. 20 is a chart showing number of failed lookup requests as a function of data access locality for various networks including networks according to embodiments of the invention;

FIG. 21 is a chart showing number of routing hops taken to route inter-organizational messages as a function of network size according to embodiments of the invention; and FIG. 22 is a chart comparing relative delay penalty of lookups for data that is constrained load balanced as a function of network size according to embodiments of the invention.

DETAILED DESCRIPTION

Prior to proceeding with a description of the various embodiments of the invention, a description of the computer and networking environment in which the various embodiments of the invention may be practiced will now be provided. Although it is not required, the present invention may be implemented by programs that are executed by a computer. Generally, programs include routines, objects, components, data structures and the like that perform particular tasks or implement particular abstract data types. The term "program" as used herein may connote a single program module or multiple program modules acting in concert. The term "computer" as used herein includes any device that electronically executes one or more programs, such as personal computers (PCs), hand-held devices, multi-processor systems, microprocessor-based programmable consumer electronics, network PCs, minicomputers, mainframe computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1A:
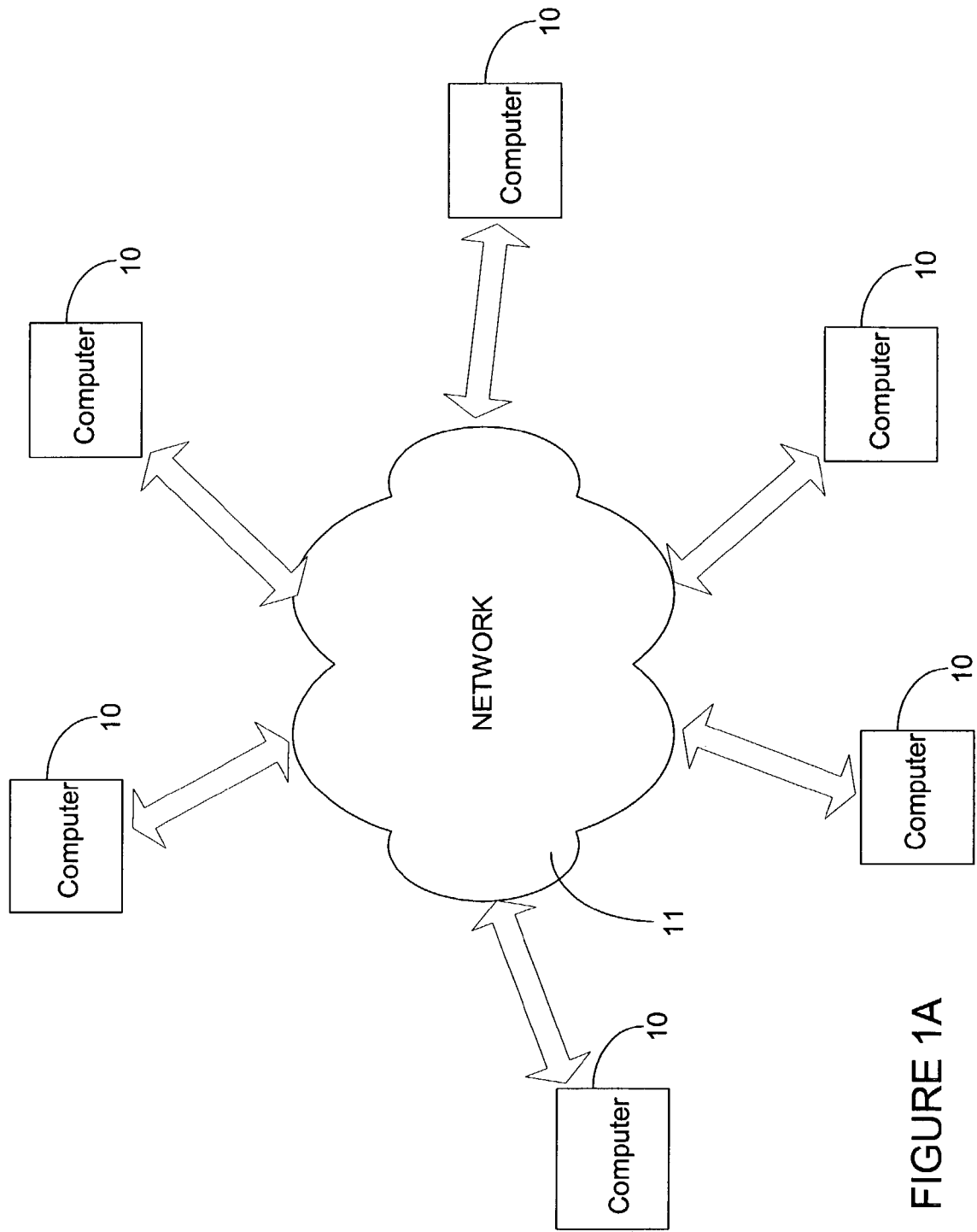
FIG. 1A is a schematic diagram generally illustrating an exemplary computer network system usable to implement embodiments of the invention.

An example of a networked environment in which the invention may be used will now be described with reference to FIG. 1A. The example network includes several computers 10 communicating with one another over a network 11, represented by a cloud. Network 11 may include many well-known components, such as routers, gateways, hubs, etc. and allows the computers 10 to communicate via wired and/or wireless media. When interacting with one another over the network 11, one or more of the computers may act as clients, servers or peers with respect to other computers. Accordingly, the various embodiments of the invention may be practiced on clients, servers, peers or combinations thereof, even though specific examples contained herein do not refer to all of these types of computers.

Figure 1B:
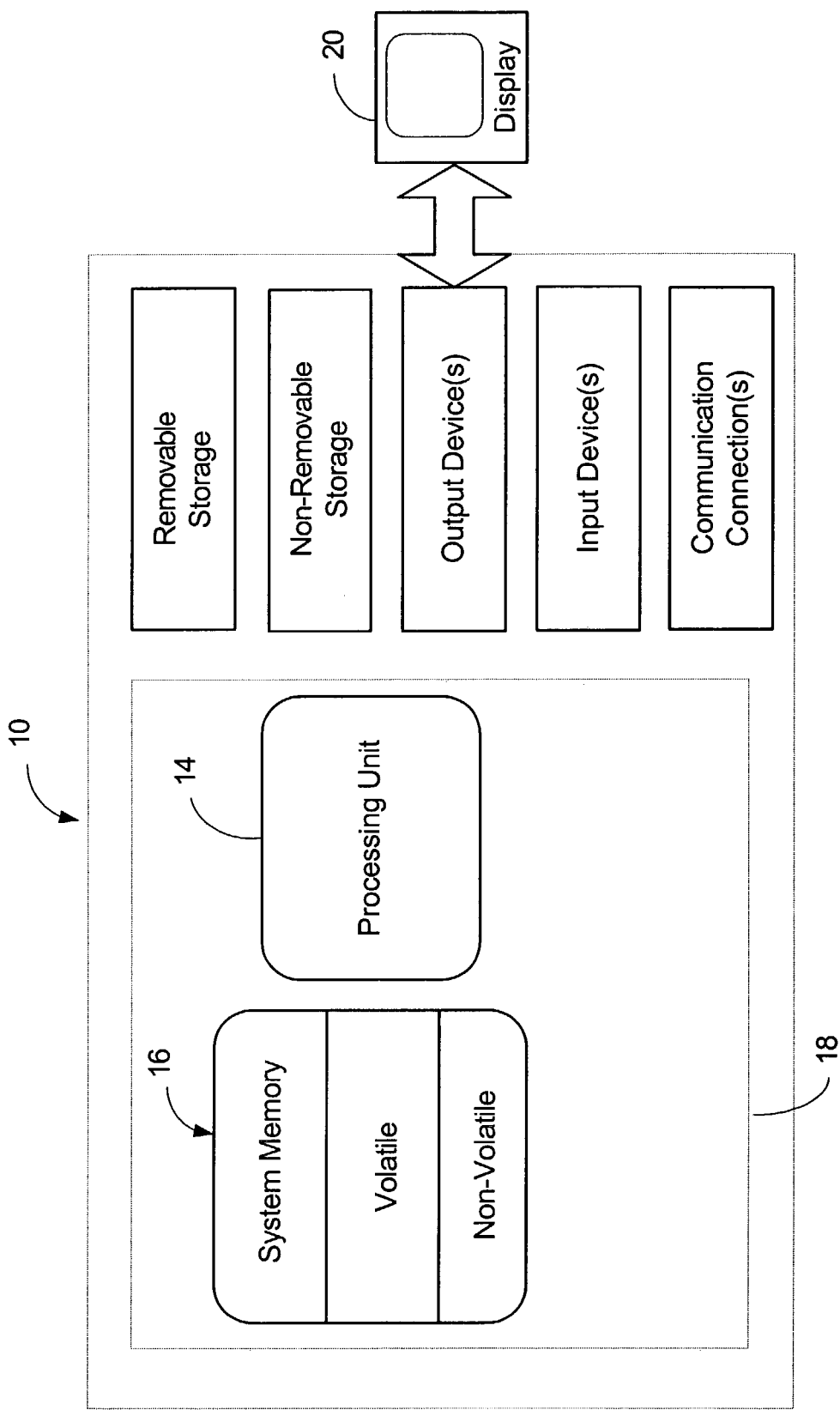
FIG. 1B is a schematic diagram generally illustrating an exemplary computer system usable to implement embodiments of the invention.
Figure 2:
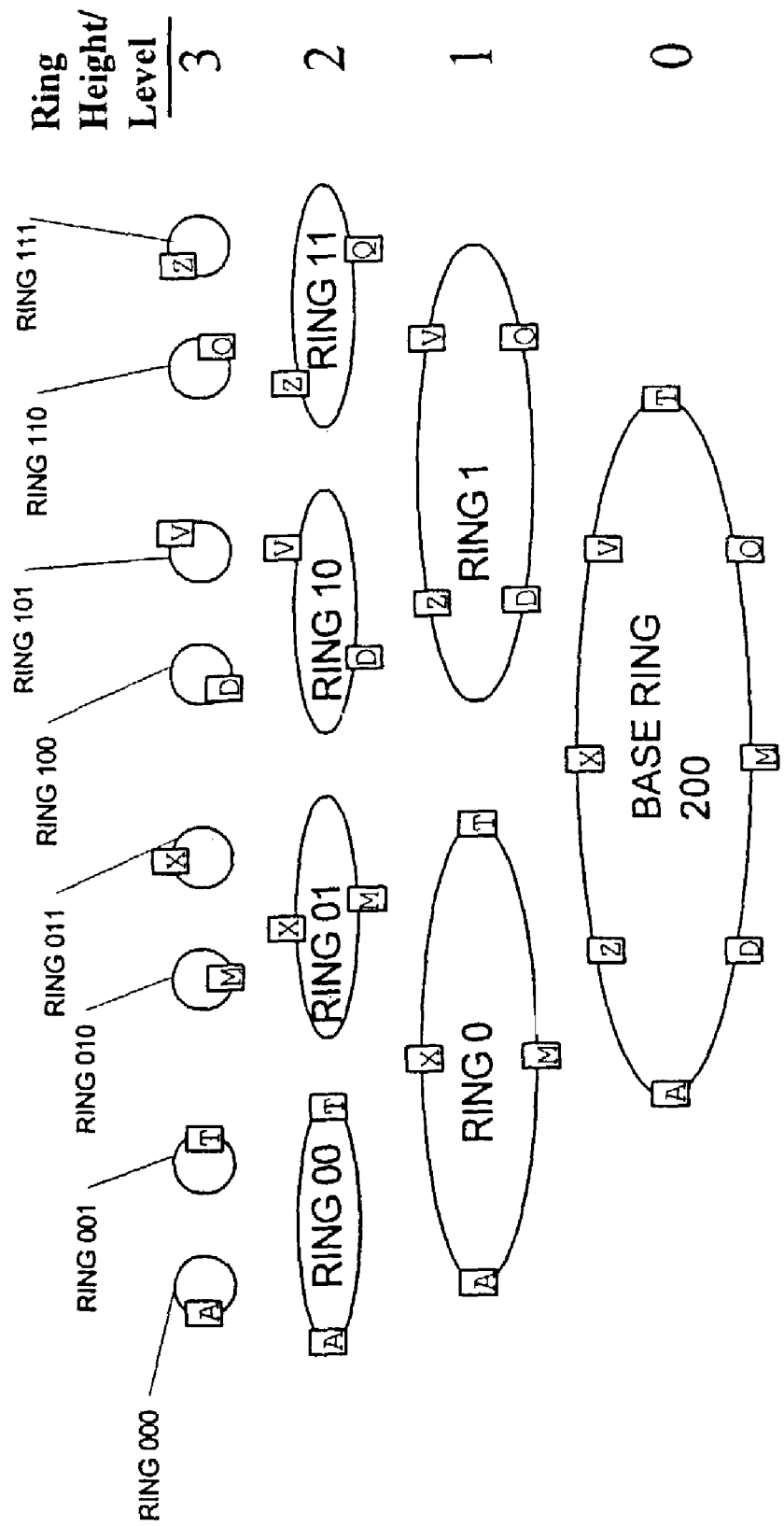
FIG. 2 is a network diagram illustrating a skip net structure according to an embodiment of the invention.

Referring to FIG. 1B, an example of a basic configuration for a computer on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18. Additionally, the computer may also have additional features/functionality. For example, computer 10 may also include additional storage (removable and/or non-removable) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

Computer 10 preferable also contains communications connections that allow the device to communicate with other devices. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wired media such as a wired network or direct-wired connection, and wireless media such as acoustic, RF, infrared and other wireless media. The term "computer-readable medium" as used herein includes both computer storage media and communication media.

Computer 10 may also have input devices such as a keyboard, mouse, pen, voice input device, touch input device, etc. Output devices such as a display 20, speakers, a printer, etc. may also be included. All these devices are well known in the art and need not be discussed at length here.

With respect to each topic in the following discussion, note that the Addendum to the Detailed Description preceding the claims should be referred to for additional material regarding embodiments of the invention.

Skip Nets

A particular list structure known in the art is sometimes referred to as a skip list. A skip list is an in-memory dictionary data structure. Briefly, a skip list is a sorted linked list where some nodes are supplemented with pointers that skip over many list elements. A 'perfect' skip list, as shown in FIG. 7A, is one where the height of the i'th node in the list is determined by the exponent of the largest power of two that divides i. Pointers of height i have length $2^i$ (i.e. they traverse $2^i$ nodes in the list). A perfect skip list thus clearly supports searches in O(log n) time.

Since it is prohibitively expensive to perform insertions and deletions in a perfect skip list, a probabilistic scheme has been suggested. See [6]. The purpose is to ensure that the pointers adjusted during insertion or deletion are relatively local, e.g. at the inserted/deleted node, and/or close neighbours while determining node heights to maintain O(log n) searches with high probability, as shown in FIG. 7B. Briefly, a node has height 1 with probability 0.5, height 2 with probability 0.25, etc. It would be possible to make a skip list into a distributed structure simply by placing each list element on a different node in the distributed system. However the few nodes with large height would have to process many more search messages than the nodes with shorter height and therefore such a structure would be inappropriate for use in peer-to-peer systems. If the original skip lists were modified so that each node had height n, then all pointers regardless of height would have length 1, and the list would degenerate into a linked list which enables no long distance hops at all.

In a skip net, to be distinguished from a skip list as just discussed, every node preferably has height log n, but pointers of height i nonetheless have an expected length of roughly $2^i$. A skip net uses messages having a destination field that is a string instead of a number obtained from a hash function. The message is routed to the node whose string name is the longest prefix match to the message destination string of any node in the overlay network.

Using string names for nodes, one could arrange all nodes in the overlay network into a lexicographically sorted linked list (a "base ring"), and that would suffice in order to route a message to its correct final destination. However, it would be slow, taking O(N) steps where N is the number of nodes in the overlay network. One can improve routing performance by maintaining multiple rings that "skip" over various members of the lexicographically sorted list of all nodes. These additional rings allow one to find the desired end destination node more quickly.

An organization having multiple rings enables routing to be completed in O(log n) forwarding steps instead of the O(N) steps required if only the base ring was maintained. In a "perfect" skip net, such as corresponding to the pointer structure shown in FIG. 8 (illustrated in ring structure form in FIG. 2), the network is arranged so that at height h there are $2^h$ disjoint rings, and each node belongs to exactly one ring at each height. Thus we expect each ring at height h contains $n/2^h$ nodes. Furthermore, in this embodiment we specify that ring r at height h is partitioned into rings 2*r and 2*r+1 at height h+1.

Thus, in the ideal example skip net of FIG. 2, an overlay network including nodes A, D, M, Q, T, V, X, and Z is illustrated in the base ring 200. Using skip nets, the overlay network can be logically divided into different levels of rings. For example, level one divided the base ring (which contains all of the nodes in the overlay network) into two smaller rings (sometimes referred to as subrings). These two smaller rings are labeled ring 0 (including nodes A, M, T, and X) and ring 1 (including nodes D, Q, V, and Z). In this example, nodes from the base ring are assigned to smaller rings based on their lexicographical names, in an alternating manner. Within each smaller ring, the nodes are once again logically ordered lexicographically.

This process may be repeated to form additional smaller rings. For example, ring 00 includes nodes A and T from ring 0, ring 01 includes nodes M and X from ring 0. Similarly, ring 10 includes nodes D and V from ring 1, and ring 11 includes nodes Q and Z from ring 1. Thus, each subsequently smaller level of rings includes a subset of the nodes from the corresponding larger ring. This process may be continued until all nodes are assigned to "leaf rings" that include only one node. In the example, rings 000 through 111 with a ring height or level of 3 are all leaf rings.

Unfortunately, adding and deleting nodes from the overlay network using a perfect skip net could require considerable rearranging of many ring memberships, which would be computationally expensive. Assigning an essentially random binary number from which ring memberships may be gleaned assures a probabilistic decision at each level. Furthermore, by assuring substantial uniqueness of each such number within the particular net, such numbers can also provide a usable numerical address space.

Thus, in an embodiment of the invention, membership in the various rings is determined by picking a substantially random number and using it to specify which rings a node should join. In particular, a node joins rings at levels up until it exists in a ring by itself. Typically unique IDs are generated for nodes by using a one-way hash function and applying it to a node's name. That results in a number that has many digits—128 bits are produced by a number of commonly used one-way hash functions. Rings are numbered as depicted in FIG. 2. An upper limit, such as $2^{128}$, in the above example on the number of nodes in the structure results in an upper bound, such as 127 in this example, for the number of ring levels, although in practice there will generally be far fewer. Given the foregoing example, the ring membership determination can be described more generally as follows. At insertion time, each node generates a sequence of 127 random bits called the node's 'mask'. To determine a node's ring membership at height h, the first h bits are extracted from the mask and the node of interest joins the ring indicated by those bits. Every node joins the one ring of height 0. Note that this scheme still has the desired property that ring r at height h is partitioned into rings 2*r and 2*r+1 at height h+1. Furthermore the expected number of nodes in each ring at height h is $n/2^h$, and thus the expected length of the pointers at height h is $2^h$.

Figure 4A:
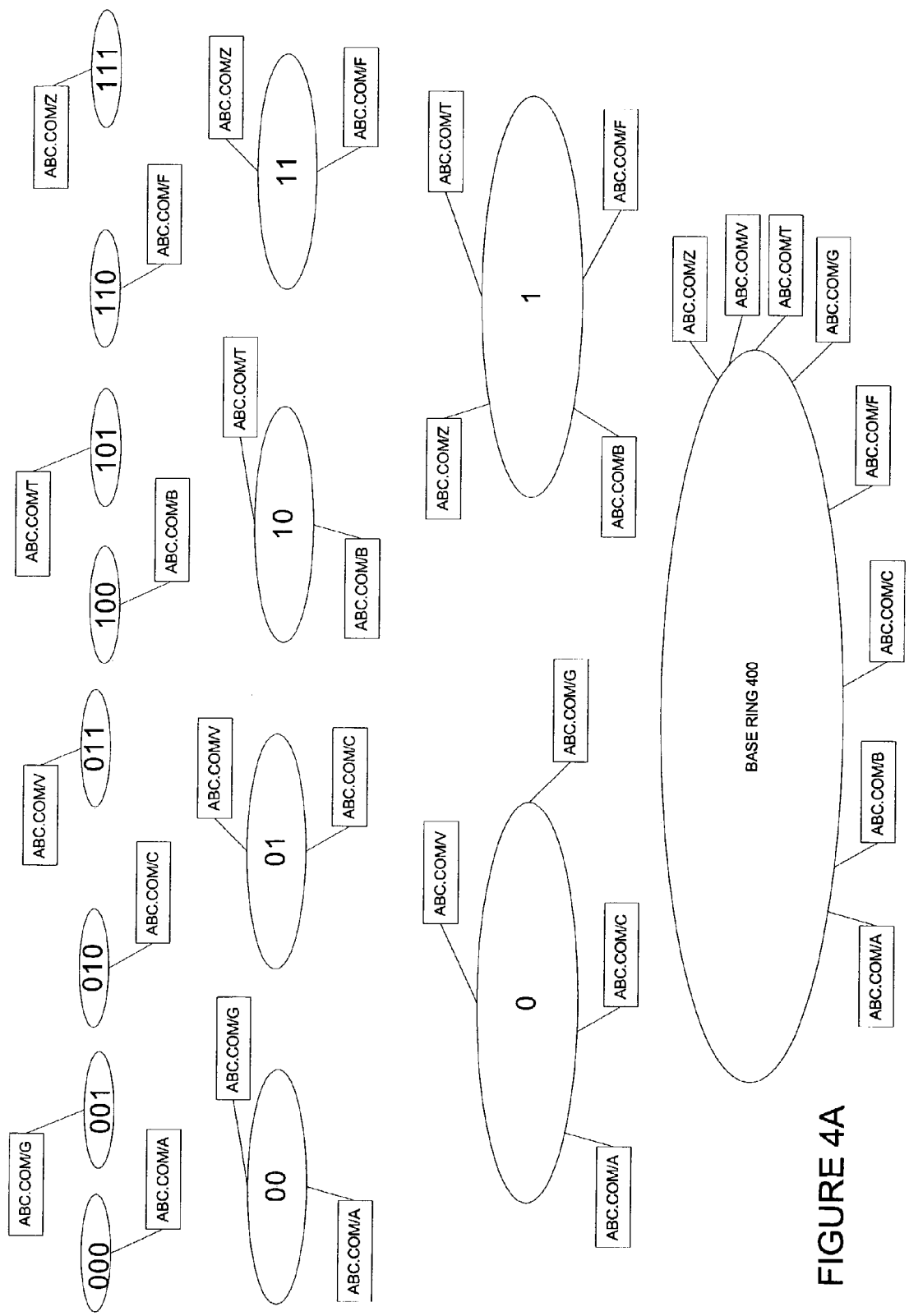
FIG. 4A is an alternative network diagram illustrating a skip net structure according to an embodiment of the invention.

Turning briefly to FIG. 4A, another example of an overlay network using a skip net is shown. In this example, base ring 400 includes a number of nodes within the "abc.com"

domain. These nodes include nodes having local lexigraphical names A, B, C, F, G, T, V, and Z. As shown in the figure, the complete lexicographical name of these nodes may be specified according to the following format: "domainname/local lexigraphical name". Thus, node A's complete lexicographical nodename may be specified as "abe.com/A".

Pointer Tables

Figure 3:
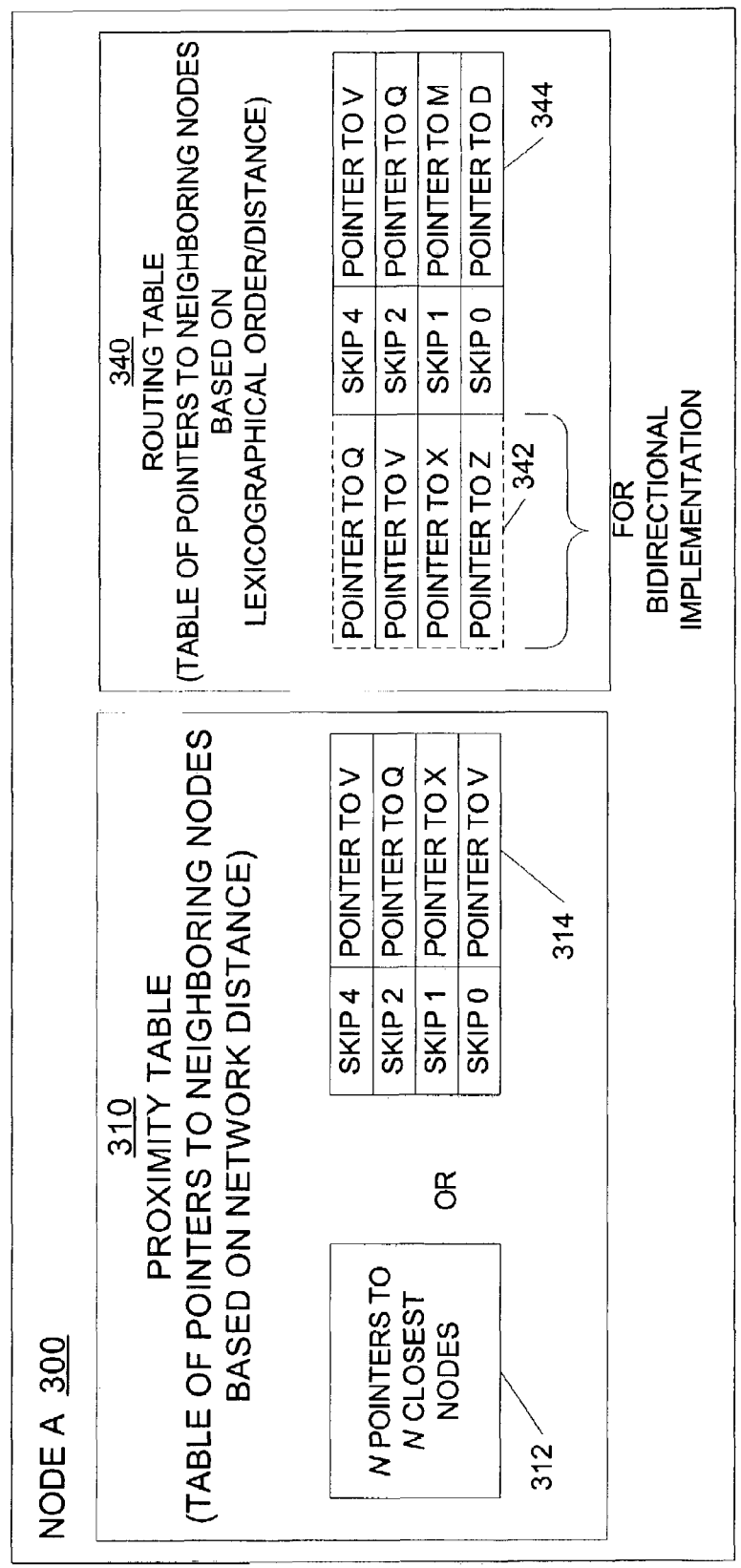
FIG. 3 is a data structure diagram illustrating pointer table structures according to an embodiment of the invention.

Turning now to FIG. 3, a node 300 on the overlay network uses two pointer tables, proximity table 310 and routing table 340, to store pointers to a number of other nodes on the overlay network. Proximity table 310 represents an optimization of the basic routing table 340 in name space. Note that in addition, as discussed above, a proximity table that optimizes routing in the numeric space is preferably also maintained. In general, each node that is part of the overlay network should have its own set of tables for storing pointers. Routing table 340 stores pointers to neighboring nodes based on the ring memberships and the lexicographical distance between node 300 and the listed neighboring nodes. As an optimization, proximity table 310 stores pointers to neighboring nodes based on the network distance between node 300 and the neighboring nodes. Various schemes are possible for implementing proximity tables in name and or numeric space. (See for example: Sylvia Ratnasamy, Scott Shenker, Ion Stoica "Routing Algorithms for DHTs: Some Open Questions" IPTPS 2002). For example, in one embodiment, each node uses the neighboring nodes in its routing table to establish a set of lexicographic identifier 'intervals.' Each node then finds a nearby node in terms of network proximity to fill each of those intervals.

Routing table 340 enables delivery of a message in log(n) forwarding steps. However, each step might end up going to a node that is far away in terms of network distance. Proximity table 310, as well as the proximity table in numeric space, provides an alternative set of routing choices that take network proximity into account. The two types of tables are related to each other in that the routing table is necessary for correctly constructing the proximity tables to maintain a log (n) forwarding hops property.

Searching the Skip Net by Identifier

In searching the skip net by identifier, the search proceeds from node 'source' across a sequence of intermediate nodes to identify the closest node to the identifier 'destID'. In one embodiment of the invention, each intermediate routes the message forward using its pointer that is closest to the destination but not beyond it.

Since each pointer is bi-directional, there is a choice of direction in which to search. If destID<sourceID then the search preferably proceeds to the left. If, on the other hand, destID>sourceID then the search preferably proceeds to the right. Algorithm 1 below gives the pseudocode for an algorithm for searching to the right. It will be appreciated by those of skill in the art that the case of searching to the left is symmetric. The algorithm assumes that the currNode.Right-Finger[ ] operation is an RPC call, but such is not required—other schemes such as 'message passing' are possible and may be desirable.

---
Algorithm 1
---

```
Node SearchRight( Node source, string destID, bit [ ] searchMask )
{
    currNode = source
    while( true ) {
```

---
-continued

Algorithm 1
---

```
        h = 128
        nextNode = currNode.RightFinger[h]
        while(nextNode.ID>destID | | nextNode.ID<currNode.ID ) {
            if( h==0 ) {
                return currNode;
            }
            h--;
            nextNode = currNode.RightFinger[h]
        }
        currNode = nextNode
    }
}
```

At each intermediate node, Algorithm 1 finds the highest pointer that does not point beyond the destination and sends the message to that node. If every pointer points beyond the destination then the local node or immediate neighbour must be the destination of the message. The run time of these phases is discussed below for the convenience of the reader.

Consider a search operation that starts at node S and terminates at node D, where the distance in the list between S and D (i.e. the number of pointers between them at height 0) is d. In this situation, it can be shown that the expected number of intermediate nodes encountered by Algorithm 1 is roughly log d. This can be appreciated from the following. Suppose the maximum height achieved during searches at increasing height is h. As remarked earlier, the rings containing the source node from height h down to height 0 induce a skip-list structure on the nodes. Thus the number of comparisons performed by Algorithm 1 is the same as the number of comparisons used to search on a skip list of length d. The expected value of this number is 2*log d+1. The number of intermediate nodes encountered by Algorithm 1 is bounded by the number of comparisons, and thus the expected number of network hops during a search operation on a skip net is ≦2*log n+1.

It also follows that, assuming s to be the longest prefix of the identifiers source.ID and destID, the search operation will not communicate with a node whose identifier does not have s as a prefix, assuming the initial search direction is chosen so as to stay inside the prefix. In particular, for example, in the search right algorithm, currNode is never set to a node that is greater than the destination or less than the source. Thus the algorithm generally maintains the invariant source.ID≦currNode.ID≦destID. As a result, the longest common prefix of source.ID and destID is also a prefix of currNode.ID.

Searching the Skip Net by Numeric Identifier

Skip nets can also support the same distributed hash table functionality that other overlay networks do. One can implement a distributed hash table—and hence do load balanced data storage and retrieval—using the numeric address space. In this section we describe the performance of these activities in the numeric address space, and in particular the hashing of node names and data names to obtain the relevant numeric ids. To store a document to the overlay network, the document's filename is entered into a one-way hash. This hash generates a pseudo-random globally unique identifier (GUID) that can be used to determine where to store the file in the overlay network. By using the GUID, locations for stored files should be sufficiently random, thereby accomplishing load balancing. For example, if the file to be stored were named "ShoppingList.doc", the GUID (in binary form) might begin with 1010 . . . . To determine which node will store the file, the node initiating the store (e.g., node abc.com/A) would search its pointer tables for the nearest node in ring 1. In the example overlay network of FIG. 4A, the nearest node in ring 1 may be node abc.com/B. Next, node abc.com/B would search its pointer tables for the nearest node in ring 10. In the example, this is node abc.com/B. This process continues until the request reaches node abc.com/T, which is the sole node in ring 101. At this point, the file is then stored in node abc.com/T.

Note that storing documents in the lexicographic space lets you control what data ends up on which nodes. However, this implementation does not result in probabilistically uniform load balancing, and thus does not implement a DHT. That is, since node and data names are not uniformly distributed, you end up with some amount of clumping of data onto nodes; however, this may be desirable for some designs.

Constrained Load Balancing

Figure 4B:
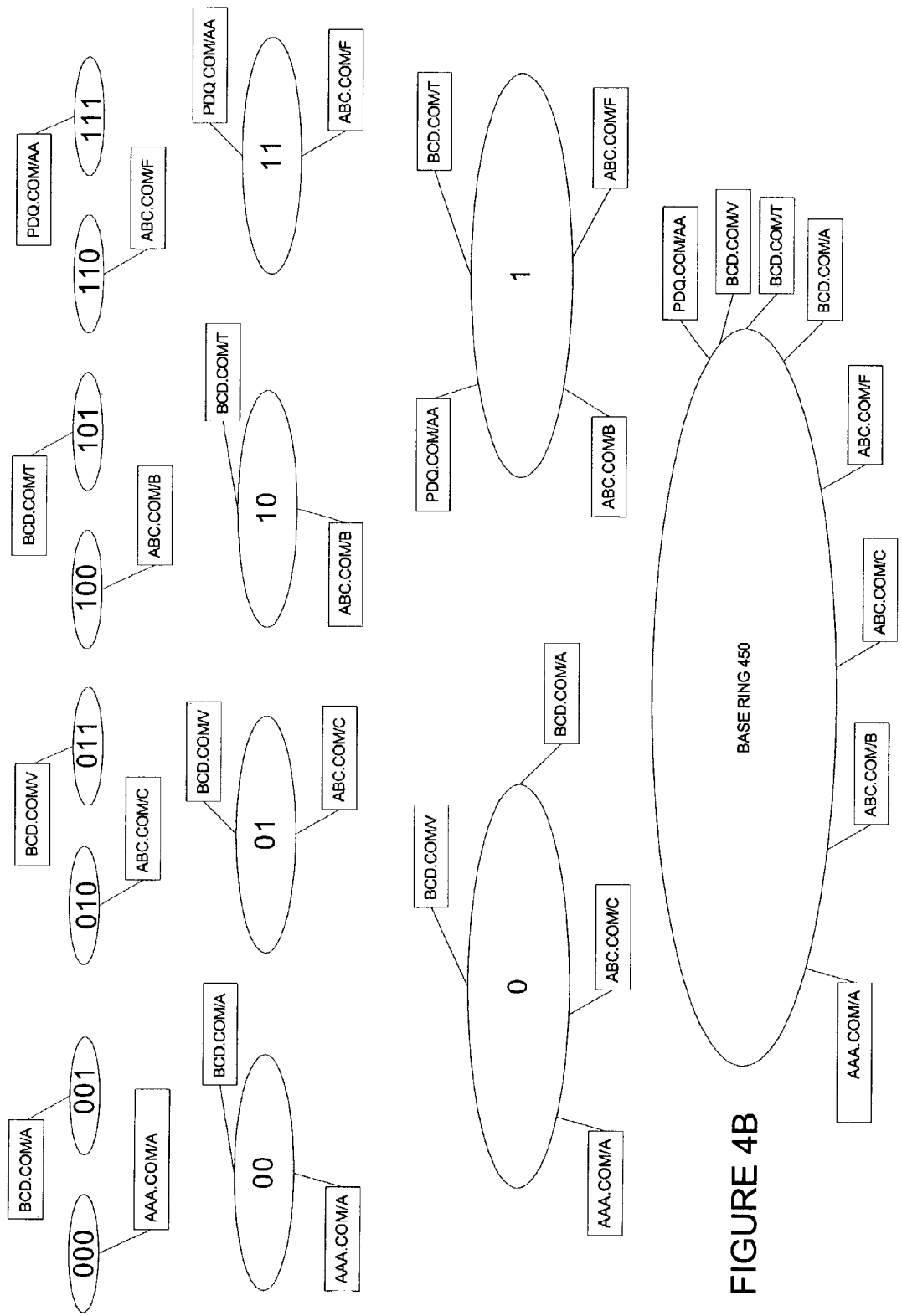
FIG. 4B is another alternative network diagram illustrating a skip net structure according to an embodiment of the invention.

As noted above, in some implementations it may be advantageous to restrict where on an overlay network a particular file is stored. Turning now to FIG. 4B, one example of an overlay network spanning multiple domains is shown. For example, ABC corporation may not wish to have its "ShoppingList.doc" file stored on a machine belonging to competitor BCD corporation's bcd.com domain. Following the DHT process outlined above, however, would result in the file being stored in bcd.com/T (once again assuming a hashed GUID of 1010 . . . ). This problem can be addressed using a process called constrained load balancing. To specify which domain a particular file should be restricted to, some implementations may provide for filenames including an explicit domain restrictor. For example, the file name "ShoppingList.doc" may be specified as "abc.com?ShoppingList.doc". In this example, the "?" character specifies that the file should only be stored on nodes belonging to the preceding domain abc.com. Using this restriction, the node assigned to store the "abc.com?ShoppingList.doc" file (assuming an GUID of 1010 . . . ) would be abc.com/B, which is the closest node to the ring 101 that belongs to the abc.com domain. It will be appreciated that a node may be associated with multiple nested domain names, rather than a single domain name, and that such multiple nested domain names can also be used in the same manner for constrained load balancing. Note that the search using the domain portion is a lexicographic search and the search using the hash of the file name portion is a numeric search that is constrained to nodes having the names that share the domain portion as a prefix. Since both the lexicographic and numeric searches, with or without constraints, are O(log n) operations, the overall search efficiency is also O(log n).

Ring Fix-Up

Referring again to FIG. 4B, when node abc.com/C goes offline, then nodes aaa.com/A and bcd.com/A in ring 0 are configured to repair or "fix-up" the broken connections in the ring. In one embodiment, they can do this by stepping down to a larger ring (in this case base ring 450) and looking for the next neighboring node that is in ring 0. Thus, node aaa.com/A would find that its new neighboring node in ring 0 is bcd.com/A, and node bcd.com/A would find that its new neighboring node in ring 0 is abc.com/A, thereby closing the broken link in ring 0 and the base ring.

The ring fix-up process can also be accomplished without searching rings by using already stored leaf pointers. Leaf pointers are described in greater detail below (See section titled "Leaf Sets"). Note that it is also desirable in most cases to fix higher levels as well, but this process is not as critical and may be done "lazily" as time and resources permit.

Node Insertion

When a new node is added to the overlay network using probabilistic skip nets, it is added to base ring 450 and smaller rings based on its lexicographical name and a random, unique identifier. The insert operation starts by finding the highest non-empty ring that the new node must join, determined by the value of the random unique identifier, using an approach similar to a search in the numeric space. Once this ring has been found, the insert operation continues by searching for the string identifier of the new node. During this search process, the new node keeps track of all nodes to which its routing table must contain pointer's. Once the search is complete, the new node creates pointers to the nodes that it must point to, and asks those nodes to point back to it.

Using the analysis set forth above with respect to searching, the expected number of node hops required for an insert operation would be log n. Pseudocode for the insertion operation is set forth in Algorithm 2 below.

---

Algorithm 2

---

```
Init ( ) {
    phase = upward
    currentH = 0
}
Insert ( ) {
    If (phase == upward) then
        nextHop = NextHopUp ( )
    else
        nextHop = NextHopDown ( )
    if (phase != complete) then
        SendMessage (InsertMsg, nextHop)
}
Node NextHop ( ) {
    h = LongestCommononPrefix (currNode, RandID, newNode, RandID);
    if (h > currentH) then
        currentH = h
        ringStart = currNode
        nextHop = currNode.ClockwiseFinger [h]
        if (ringStart == nextHop) then
            phase = downward
            return NextHopDown ( )
    else
        return nextHop
}
Node NextHopDown ( ) {
    While (currentH > 0)
        nextHop = currNode.ClockwiseFinger[currentH]
        if (LliesBetweenClockwise (newNode.LexID, currNode.LexID,
            nextHop.LexID)) then
            InsertHere (newNode)
        else
            return nextHop
        currentH = current H - 1
    endwhile
    phase = complete
    return null
}
```

---

As an example, if new node abc.com/P were added to the illustrated overlay network, it would be inserted into base ring 450 between nodes abc.com/F and bcd.com/A and at level i the ring that it joins is determined by the $i^{th}$ digit of its random id.

It will be appreciated that the neighbours of a node in a basic skip net structure are determined by the random choice of ring memberships and the ordering of identifiers in those rings to substantially ensure that the expected length of a pointer at height h is $2^h$. Accordingly, there are no guarantees that a node and its neighbours are nearby, in terms of network proximity. Skip nets are similar to Chord in this regard.

Pastry, on the other hand, is specifically designed to incorporate network proximity into its choice of routing table entries. A new Pastry node joins a ring by contacting a proximal node and leveraging its routing table entries in order to build the new node's routing table.

If network proximity is incorporated into the skip nets ring membership decisions then it is difficult to ensure that that the expected length of a pointer at height h is still $2^h$. To address this issue, an additional routing table called a proximity table may be maintained at each node in the skip net as discussed above. The proximity table, like the routing table, has both left and right fingers.

When the skip net incorporates network proximity, the insert operation is modified to have two phases: the Basic Phase and the Proximity Phase. The Basic Phase is simply the insert operation as described above. The Proximity Phase is similar to the Pastry join operation in that it involves bootstrapping from an existing node J that is close proximity-wise to the new node. More specifically, the Proximity Phase involves first using the routing table to determine an upper and lower bound for each of the entries in the proximity table, somewhat analogous to Pastry's use of the routing table entries that start with a certain prefix. For skip nets, since the identifier space is not necessarily uniformly populated, requiring that entries start with a particular prefix is not sufficient to ensure that the entries are appropriately distributed in the identifier space. Next, the new node may use the proximity table at another node, referred to herein as node J, to fill any entries of its proximity table, if possible. Subsequently, the new node uses the proximity tables at certain neighbours of node J to fill any remaining proximity table entries, if possible. Algorithm 3 below sets forth pseudocode for building the right proximity table, with the code for building the left proximity table being symmetric. For the convenience of the reader, a fuller version of this simplified algorithm is presented in the technical report contained in the addendum to the detailed description below.

Algorithm 3

```
BuildRightPTable(Node newNode, Node J ) {
  // Compute bounds for each entry in the P table
  for( h=127; newNode.RightFingers[h]==null; h-- ) { }
  maxH = h;
  while( h>0 ) {
    newNode.upperBound[h] = newNode.RightFingers[h].ID;
    newNode.lowerBound[h] = newNode.RightFingers[h-1].ID;
    if( newNode.upperBound[h]==newNode.lowerBound[h] ) {
      newNode.RightP[h] = newNode.RightFingers[h];
    }
    h--;
  }
  currNode = J;
  while( true ) {
    FillEntries( newNode, currNode );
    // Find the highest empty entry in the right P table
    for( h=maxH; h>0; h-- ) {
      if( newNode.RightP[h]==null ) break;
    }
    if(h==0) break;
    // Search for any node that fits newNode's bounds at height h
    if( currNode.ID < newNode.lowerBound[h] ) {
      Let nextNode = the closest node in currNode's P Table to
        the left of newNode.upperBound[h]
      Set currNode = nextNode
    } else {
      Let nextNode = the closest node in currNode's P Table to
        the right of newNode.lowerBound[h]
      Set currNode = nextNode
```

-continued

Algorithm 3

```
    }
  }
  newNode.RightP[0] = newNode.RightFinger[0];
}
FillEntries( Node newNode, Node J ) {
  TryInsertOne( newNode, J );
  for( i=0; i<128; i++ ) {
    if( J.LeftP[i] !=null ) TryInsertOne( newNode, J.LeftP[i] );
    if( J.RightP[i] !=null ) TryInsertOne( newNode, J.RightP[i] );
  }
}
TryInsertOne( Node newNode, Node n ) {
  for( i=0; i<128; i++ ) {
    if( newNode.RightP[i] !=null ) continue;
    if( FitBounds(newNode, i, n.ID) ) {
      newNode.RightP[i] = n;
    }
  }
}
bool FitBounds( Node newNode, int h, bit[ ] ID ) {
  if( newNode.lowerBound[h]<ID && ID<=newNode.upperBound[h] )
    return true;
  if( newNode.upperBound[h]<newNode.lowerBound[h]
      && (newNode. lowerBound[h]<ID ||
      ID<=newNode.upperBound[h])
  )
    return true;
}
```

As can be seen, in BuildRightPTable( ), each iteration of the outer "while(true)" loop tries to fill in more entries of the table. When filling the entry at height h, the process is looking for any node in a range of expected size $2^{h-1}$. The expected distance between this range and the node that the process is searching from is $2^h$. The expected number of network hops to complete this search is 2, and thus the total expected number of network hops is 2*log(n).

Leaf Sets

Leaf sets can be used to improve the fault tolerance of the system. For example, each node's address table could store the addresses of k neighboring nodes (in lexicographic order), wherein k is a positive integer (e.g., 8). By storing the addresses of the k closest neighbors (lexicographically), when a neighbor experiences a fault (e.g., going offline), the neighbors will have the information necessary to close the link. These leaf sets can be part of another table such as the proximity table, or stored in addition to the proximity table, depending on the implementation. In some embodiments, if additional pointer storage is available, instead of storing only selected pointers (e.g., skip 0, skip 1, skip 2, skip 4, skip 8, skip 16, skip 32, et seq.), additional pointers neighboring the selected pointers could also be stored (e.g., skip 0, skip 1, skip 2, skip 4, skip 7, skip 8, skip 9, skip 15, skip 16, skip 17, skip 31, skip 32, skip 33, et seq.). Other combinations of stored nodes or patterns for skipped nodes are possible and contemplated.

Domain Connection Failures

One common failure mode for networks is for a particular domain to become disconnected from a WAN (e.g., the Internet). This may be due to the failure of the domain's bastion server, firewall, or router. When a domain goes off line, it would be advantageous for those in the domain to continue to be able to communicate with each other. Referring to the example skip net illustrated in FIG. 4B, suppose the abc.com Internet router fails. If the skip net is bidirectional (i.e. it maintains pointers to both its left and right neighbors), then the routing algorithm guarantees that any node within the abc.com domain can successfully route to any other node in the abc.com domain. That is, in general, if a disconnected organization's nodes' names employ one of several organizational prefixes, then the relevant portion of the skip net will be partitioned into several disjoint but internally well-connected segments. Because of a skip net's routing locality property, message traffic within each segment will be unaffected by disconnection and will thus continue to routed with O(log n) efficiency.

Cross-segment traffic among the other portions of the skip net will also be largely unaffected since, unless the disconnecting organization represents a sizable portion of the entire overlay, most cross-segment pointers among global segments will remain valid. This may not be the case for the segments of the disconnected organization, and hence the primary repair task after disconnection and reconnection is to merge overlay segments. In particular, for the disconnect case, segments are merged into two (or more) disjoint skip nets, while for the reconnect-case, segments of the two (or more) disjoint skip nets are merged into a single skip net.

The first step in either case is discovery. When an organization disconnects, its segments may not be able to find each other using only skip net pointers. This is because there is no guarantee that non-contiguous segments will have pointers into each other. This problem can be solved by assuming that organizations will generally divide their nodes into a relatively small number of name segments and requiring that they designate some number of nodes in each segment as "well-known". Each node in an organization maintains a list of these well-known nodes and uses them as contact points between the various overlay segments.

When an organization reconnects, the organization and global skip nets discover each other through their segment edge nodes. As discussed, each node maintains a "leaf set" that points to the eight closest nodes (or other number of closest nodes) on each side of itself in the level 0 ring. If a node discovers that one side of its leaf set, but not the other, is completely unreachable then it may conclude that a disconnect event has occurred and that it is an edge node of a segment. These edge nodes keep track of their unreachable leaf set pointers and periodically ping them for reachability; should a pointer become reachable, the node initiates the merge process. Note that merging two previously independent skip nets together—for example, when a new organization joins the system—is functionally equivalent to reconnecting a previously connected one, except that a different discovery mechanism may be employed.

The segment merge process is divided into two steps: repair of the pointers comprising level 0 rings and repair of the pointers for all higher rings. The first step can be done quickly, as it only involves repair of the level 0 pointers of the "edge" nodes of each segment. Once the first step has been done it should be possible to correctly route messages among nodes in different segments and to do so with O(log n) efficiency. As a consequence, the second, more expensive step can be done as a background task.

The primary task for connecting skip net segments at level 0 is to discover the relevant edge nodes by having a node in one segment route a message towards the ID of a node in the other segment. This message will be routed to the edge node in the first segment that is nearest to other node's ID. Messages routed in this fashion can be used to gather together a list of all segments' edge nodes. The actual inter-segment pointer updates are then done as a single atomic operation among the segment edge nodes, using distributed two-phase commit. This avoids routing inconsistencies.

Immediately following level 0 ring connection, messages sent to cross-segment destinations will be routed with O(log n) efficiency, albeit with a constant factor degradation. This factor will differ, depending on whether one is repairing a disconnect or performing a reconnection. In the disconnect case there will be few, if any, cross-segment pointers other than the level 0 ones. Consequently, cross-segment messages will be routed in O(log n) hops to the edge of each segment they traverse and will then hop to the next segment using the level 0 pointer connecting segments. Thus, if a disconnected organization contains S segments, cross-segment traffic will be routed with O(S log n) efficiency after level 0 ring connection.

When an organization reconnects its fully repaired skip net at level 0 to the global one, traffic destined for external nodes will be routed in O(log n) hops to an edge node of the organization's skip net. The level 0 pointer connecting the two skip nets will be traversed and then O(log n) hops will be needed to route traffic within the global skip net. Traffic that does not have to cross between the two skip nets will not incur this routing penalty.

Once the level 0 ring connection phase has completed, all remaining pointers that need repair can be updated using a background task. In an embodiment of the invention, pointers are recursively repaired at one level by using correct pointers at the level below to find the desired nodes in each segment. Pointers at one level should be repaired across all segment boundaries before a repair of a higher level is initiated. Because rings at higher levels are nested within rings at lower levels, repair of ring at level h+1 can be initiated by one of the nodes that had its pointer repaired for the enclosing ring at level h. A repair operation at level h+1 is unnecessary if the level h ring (a) contains only a single member or (b) does not have an inter-segment pointer that required repair. The latter termination condition implies that most rings—and hence most nodes—in the global skip net will not need to be examined for potential repair.

The total work involved in this repair algorithm is O(M log(n/M)), where M is the size of the disconnecting or reconnecting organization. Since rings at level h+1 can be repaired in parallel once their enclosing rings at level h have been repaired across all segment boundaries, the time required to complete repair of all rings is O(S log n), where S is the number of segments.

Concurrent Updates and Unexpected Failures

Concurrent updates and unexpected node failures may cause a breakdown in certain skip net properties as described above. Below is a discussion of some potential problems in this regard, probes for detecting them, and corrective actions for resolving them.

Problems:
1. Unexpected failures may create nodes that do not have a valid neighbour at a certain height. This can be detected by Probe 1, discussed below.
2. Unexpected failures may cause a node to reflect that another node is dead when in fact the node in question is still alive. For example, node N might reflect that node M is dead when node M is not. N might then chose L to be its new neighbour instead of node M. Probe 1 can detect this situation.
3. Concurrent node joins may result in incorrect ordering within a ring (perhaps only briefly during a join). If the problem occurs at height 0 then searches may return incorrect results. If the problem occurs at height>0 then searches will be less efficient. This situation can be partially detected by Probes 2 and 3, discussed below.

4. In the case of severe network partitions, if two partitions can be identified, they should be rejoined if possible. Assuming the partitions are contiguous, they can be rejoined simply by repairing the height 0 pointers at the endpoints and allowing the periodic ring corrections to repair all other pointers.

Probes (Each Probe is Executed Periodically for Each Height h):

1. The probing node periodically contacts its left and right neighbours at height h. If the contacted nodes are dead, then Correction 1, discussed below, should be employed. If a neighbour does not recognize the probing node as its neighbour then Correction 2, discussed below, should be employed.
2. The probing node examines its next k neighbours in each direction and checks that it does not travel past itself without encountering itself. The purpose of this is to detect rings with multiple loops where a loop has length<k.
3. The probing node checks that its neighbours at height h are the closest nodes in the ring at height h−1 that could possibly be a member of the ring at height h. If this does not hold, then Correction 3, discussed below, should be employed.

Corrections:

1. If h=0 then the pointers at height>0 are used to skip beyond the failed node, and then the pointers in the reverse direction are used to skip back to find the closest live node. If h>0 then use the pointers at height<h to skip to find the closest live node that can be a member of ring h.
2. Starting from a neighbour of the probing node, follow its pointers at level h towards the probing node. The last node encountered before passing the probing node is the new neighbour of the probing node. Set pointer to point to the new neighbour and its pointer to point to the probing node.
3. Set new neighbours to the appropriate nodes and notify new neighbours that they should run Probe 3 immediately.

Virtual Nodes

For some applications, such as web hosting, it may be advantageous to host multiple domains on a single physical server. Thus, two or more nodes can be associated with a single physical network node. This virtual node configuration may be particularly advantageous to ISPs (Internet Service Providers) offering web hosting services to their clients. In order to reduce the amount of overhead associated with each virtual domain, the virtual nodes may be configured to share address tables.

Figure 5:
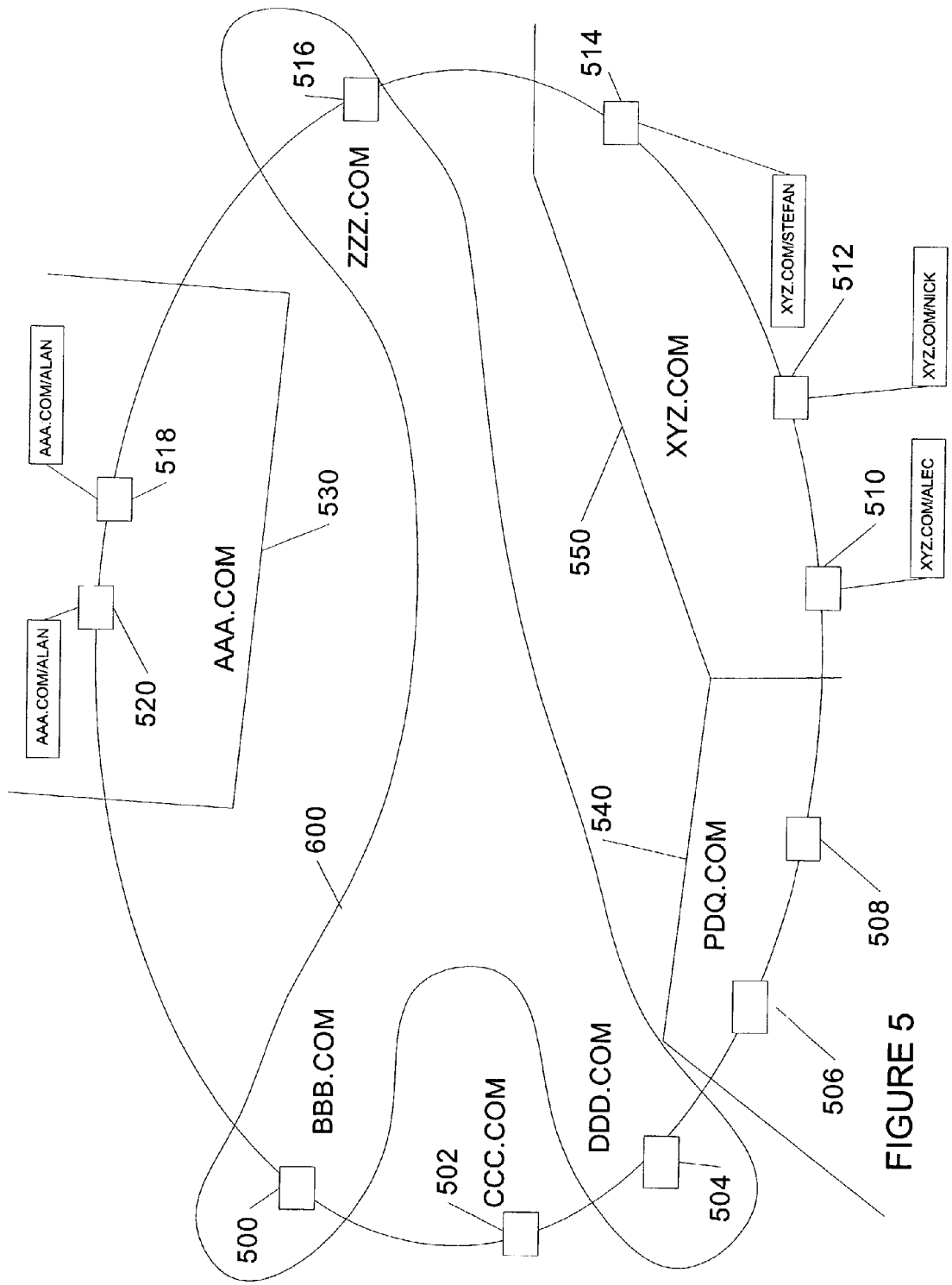
FIG. 5 is a network diagram illustrating a skip net structure according to an embodiment of the invention wherein lexicographically distinct nodes are hosted at a single physical location.

Turning now to FIG. 5, one example of an overlay network in which three nodes are associated with a single physical address is shown. In this example, node bbb.com, ddd.com, and zzz.com are all hosted on a single physical location 600.

Figure 6:
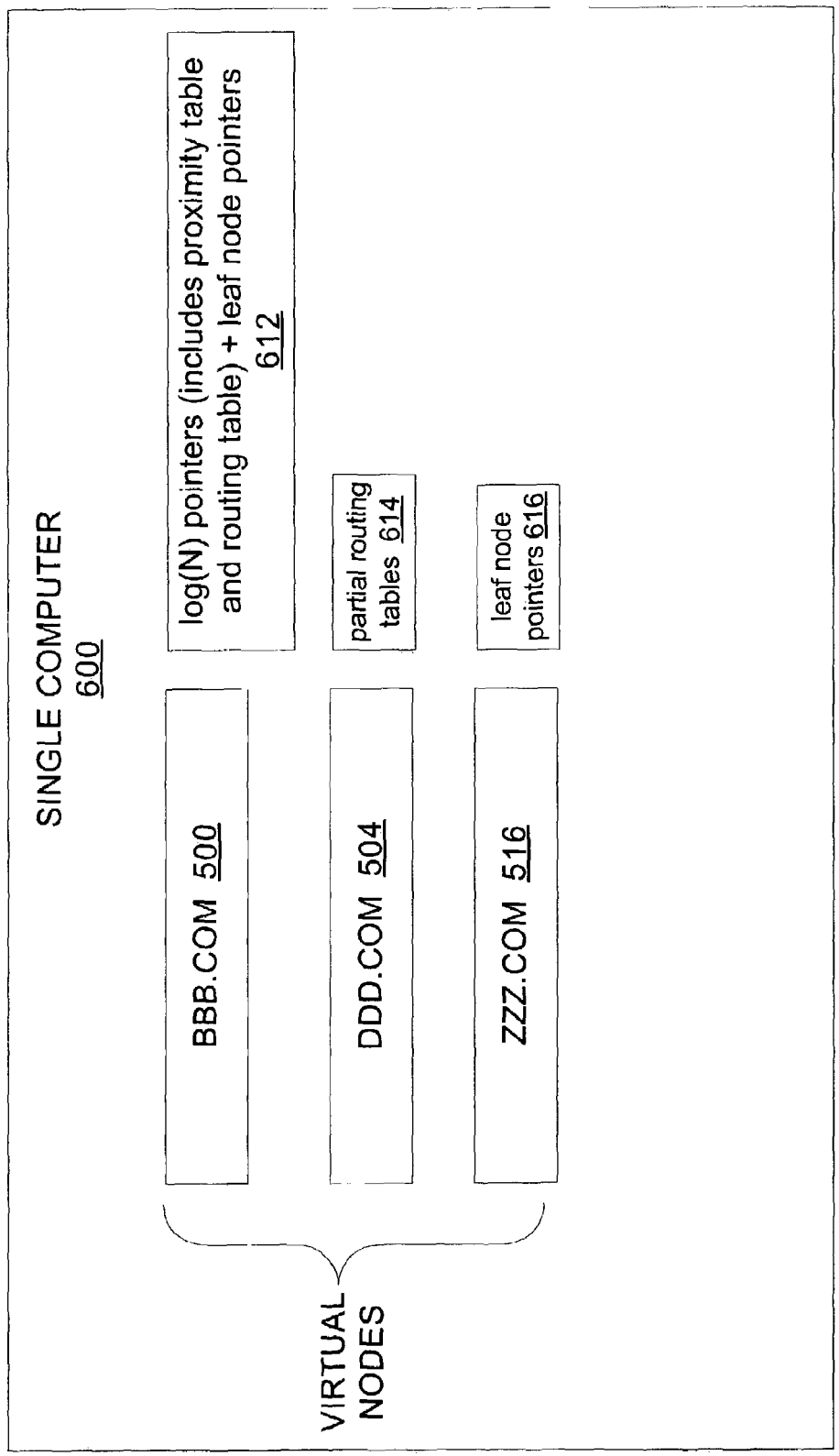
FIG. 6 is a schematic diagram illustrating node and pointer table structures according to an embodiment of the invention wherein lexicographically distinct nodes are hosted at a single physical location.

Turning now to FIG. 6, an example of one method for efficiently dealing with virtual nodes on a single physical computer is shown. In this example, one physical computer 600 is hosting three virtual nodes 500, 504, and 516. However, instead of storing an entire address pointer table for each virtual node, computer 600 only stores one full routing table 612, and partial routing tables for the other virtual nodes. The sizes of the routing tables for the virtual nodes can be chosen probabilistically (using the geometric distribution) so that the average number of nodes in these partial routing tables is a constant. A typical configuration might have an average of 2 pointers per partial routing table. As shown in the figure, in this embodiment address pointer tables include (i) a set of log(n) pointers 612 that point to neighboring nodes for each ring to which node 602 belongs, (ii) a set of partial routing tables 614 for all other virtual nodes, and (iii) a set of leaf node pointers 616.

Thus, nodes 500, 504 and 516 each route using node 500's proximity table, which can be based on computer 600's network location. The nodes can each use their own respective set of leaf pointers for fault tolerance. This works because the proximity table is based on computer 600's network location, which is the same for each node residing on computer 600. In contrast, leaf pointers are based on a node's lexicographical domain name.

The savings in overhead storage afforded by this embodiment can be dramatic when the number of virtual nodes is large. For example, storing a full set of pointers for 100 nodes could result in approximately 100*log(n)+100*L pointers, where N is the number of nodes in the overlay network and L is the number of leaf node pointers for each node. In contrast, by storing only one full set of pointers per physical computer, the number of stored pointers would fall to approximately log(n)+100*(L+2), saving approximately 99*(log(n)-2) pointers. Since many web hosting services operate large numbers of websites on a single server, these savings may be significant in some implementations. Of course, changing the distribution of fingers impacts the search path. The expected number of node hops on a search path is identical to the expected cost of a search in a skip list with p=¼, which is <=4*$\log_4(d)$+1. The total search cost is thus 4*$\log_4(d)$= 2*$\log_2(d)$, which is identical to the search cost in basic skip nets.

Variations

There are a number of variations that are possible with respect to the basic skip net structure described above. Several such variations will be described hereinafter in greater detail, although the following discussion is not intended to provide an exhaustive listing. In one embodiment of the invention, a node keeps a pointer to the immediate successor (and predecessor) on each ring to which it belongs. As a result, it is possible for a node to point to the same successor on several rings, and, therefore, maintain duplicate pointers. In this embodiment, each node detects these redundancies and reuses duplicate pointers to point to the first successor that is not a duplicate. Since these pointers could potentially alter the precise structure of a skip net, these pointer readjustments will not be transparent to a node; instead, the node will preferably only use the readjusted pointers for searches and not for node insertions and/or removals. The readjustment of duplicate pointers may be performed during node insertion.

In particular, as the pseudo-code above illustrates, a node joins skip net rings from top to bottom, from the most exclusive ring, that is not shared with any other node, to the most inclusive ring, that is shared with all remaining nodes. Thus, according to the present embodiment, when a newcomer joins a ring, it checks whether its new neighbors are duplicates of the neighbors in the ring one level up. If the new neighbors are duplicates of the neighbors in the ring one level up, then the node marks this pointer as a duplicate and asks its neighbour to start searching among its neighbours for a "non-duplicate" pointer. This process may proliferate until a non-duplicate neighbour is found. Once such a non-duplicate is found, the newcomer will readjust its duplicate pointer, linking to the non-duplicate.

In addition, it may sometimes be desirable to increase the number of fingers of one or more nodes. For example, it is possible to adjust the number of pointers with respect to a node by adjusting the distribution of the random number generator used to generate random ids. Alternatively, instead of generating random bits (i.e. 0s or 1s), random integers in the range [0, . . . , k] may be generated, where k is a positive integer. In general, larger values of k mean fewer fingers are stored, leading to a smaller routing table. However, one side affect of this is less efficient routing. However, one can also add in additional pointers at each level, as discussed above, and regain routing efficiency at the expense of increasing the routing table size. Algorithm 4, set forth below, can be used to add additional fingers.

---
Algorithm 4
---
```
for i=log(n) downto 1
    if( i==log(n) ) stop = me
    else stop = Fingers[i + 1]
    while n < stop
        AddToList( AdditionalFingers[i], n )
        n = n.Fingers[i]
    end
end
```
---

It can thus be seen that a new and useful system and method for creating and maintaining improved overlay networks with an efficient distributed data structure have been provided. In view of the many possible embodiments to which the principles of this invention may be applied, it should be recognized that the embodiments described herein, such as with respect to the figures, are meant to be illustrative only and should not be taken as limiting the scope of the invention. For example, those of skill in the art will recognize that the elements of the illustrated embodiments shown in software may be implemented in hardware and vice versa and that the illustrated embodiments can be modified in arrangement and detail without departing from the spirit of the invention. Therefore, the invention as described herein contemplates all such embodiments as may come within the scope of the appended claims and equivalents thereof. All references, patents, publications, and other printed materials mentioned herein are hereby incorporated by reference in their entireties for all teachings therein without exception or exclusion.

Addendum to the Detailed Description

The following technical report is included herein to provide additional discussion regarding embodiments of the invention and the implementation thereof. Each of the references cited in the technical report is herein incorporated by reference in its entirety for all teachings therein without exception. Note that the reference numbers hereinafter refer to the references listed after at the end of this section.

Abstract: Scalable overlay networks such Chord, Pastry, and Tapestry have recently emerged as flexible infrastructure for building large peer-to-peer systems. In practice, such systems have two disadvantages: They provide no control over where data is stored and no guarantee that routing paths remain within an administrative domain whenever possible. SkipNet is a scalable overlay network that provides controlled data placement and guaranteed routing locality by organizing data primarily by string names. SkipNet allows for both fine-grained and coarse-grained control over data placement: Content can be placed either on a pre-determined node or distributed uniformly across the nodes of a hierarchical naming subtree. An additional useful consequence of SkipNet's locality properties is that partition failures, in which an entire organization disconnects from the rest of the system, can result in two disjoint, but well-connected overlay networks. Furthermore, SkipNet can efficiently re-merge these disjoint networks when the partition heals.

1 Introduction

Scalable overlay networks, such as Chord [30], CAN [25], Pastry [27], and Tapestry [36], have recently emerged as flexible infrastructure for building large peer-to-peer systems. A key function that these networks enable is a distributed hash table (DHT), which allows data to be uniformly diffused over all the participants in the peer-to-peer system.

While DHTs provide nice load balancing properties, they do so at the price of controlling where data is stored. This has at least two disadvantages: data may be stored far from its users and it may be stored outside the administrative-domain to which it belongs. This paper introduces SkipNet, a distributed generalization of Skip Lists [23], adapted and enhanced to meet the goals of peer-to-peer systems. SkipNet is a scalable overlay network that supports traditional overlay functionality and possesses two locality properties that we refer to as content locality and path locality.

Content locality refers to the ability to either explicitly place data on specific overlay nodes or distribute it across nodes within a given organization. Path locality refers to the ability to guarantee that message traffic between two overlay nodes within the same organization is routed within that organization only.

Content and path locality provide a number of advantages for data retrieval, including improved availability, performance, manageability, and security. For example, nodes can store important data within their organization (content locality) and the nodes will be able to reach their data through the overlay network even if the organization has disconnected from the rest of the Internet (path locality). Storing data near the clients that use it yields performance benefits. Placing content onto a specific overlay node also enables pro-visioning of that node to reflect demand. Content placement also allows administrative control over issues such as scheduling maintenance for machines storing important data, thus improving manageability.

Content locality provides security guarantees that are unavailable in DHTs. Many organizations trust nodes within the organization more than nodes outside the organization. Even when encrypted and digitally signed, data stored on an arbitrary overlay node outside the organization is susceptible to denial of service (DoS) attacks as well as traffic analysis. Although other techniques for improving the resiliency of DHTs to DoS attacks exist [3], content locality is a simple, zero-overhead technique.

Once content locality has been achieved, path locality is a naturally desirable second property. Although some overlay designs [4] are likely to keep routing messages within an organization most of the time, none guarantee path locality. For example, without such a guarantee the route from explorer.ford.com to mustang.ford.com could pass through camaro.gm.com, a scenario that people at ford.com might prefer to prevent. With path locality, nodes requesting data within their organization traverse a path that never leaves the organization. This example also illustrates that path locality can be desirable even in a scenario where no content is being placed on nodes.

Controlling content placement is in direct tension with the goal of a DHT, which is to uniformly distribute data across a system in an automated fashion. A generalization that combines these two notions is constrained load balancing, in which data is uniformly distributed across a well-defined subset of the nodes in a system, such as all nodes in a single organization, all nodes residing within a given building, or all nodes residing within one or more data centers.

SkipNet is a scalable peer-to-peer overlay network that is a distributed generalization of Skip Lists [23]. It supports efficient message routing between overlay nodes, content placement, path locality, and constrained load balancing. It does so by employing two separate, but related address spaces: a string name IDspace as well as a numeric IDspace. Node names and content identifier strings are mapped directly into the name IDspace, while hashes of the node names and content identifiers are mapped into the numeric IDspace. A single set of routing pointers on each overlay node enables efficient routing in either address space and a combination of routing in both address spaces provides the ability to do constrained load balancing.

A useful consequence of SkipNet's locality properties is resiliency against a common form of Internet failure. Because SkipNet clusters nodes according to their name IDordering, names within a single organization survive failures that disconnect the organization from the rest of the Internet. Furthermore, the organization's SkipNet segment can be efficiently re-merged with the external SkipNet when connectivity is restored. In the case of uncorrelated, independent failures, SkipNet has similar resiliency to previous overlay networks [30].

The rest of this paper is organized as follows: Section 2 describes related work, Section 3 describes SkipNet's basic design, Section 4 discusses SkipNet's locality properties, Section 5 presents enhancements to the basic design, Section 6 presents the ring merge algorithms, Section 7 discusses design alternatives to SkipNet, Section 8 presents a theoretical analysis of SkipNet, Section 9 presents an experimental evaluation, and Section 10 concludes the paper.

2 Related Work

A large number of peer-to-peer overlay network designs have been proposed recently, such as CAN [25], Chord [30], Freenet [6], Gnutella [11], Kademlia [20], Pastry [27], Tapestry [36], and Viceroy [19]. SkipNet is designed to provide the same functionality as existing peer-to-peer overlay networks, and additionally to provide improved content availability through explicit control over content placement.

The key feature of systems such as CAN, Chord, Pastry, and Tapestry is that they afford scalable routing paths while maintaining a scalable amount of routing state at each node. By scalable routing path we mean that the expected number of forwarding hops between any two communicating nodes is small with respect to the total number of nodes in the system. Chord, Pastry, and Tapestry scale with log N, where N is the system size, while maintaining log N routing state at each overlay node. CAN scales with $D N^{1/D}$, where D is a dimensionality factor with a typical value of 6, while maintaining an amount of per-node routing state proportional to D.

A second key feature of these systems is that they are able to route to destination addresses that do not equal the address of any existing node. Each message is routed to the node whose address is 'closest' to that specified in the destination field of a message; we interchangeably use the terms 'route' and 'search' to mean routing to the closest node to the specified destination. This feature enables implementation of a distributed hash table (DHT) [12], in which content is stored at an overlay node whose node ID is closest to the result of applying a collision-resistant hash function to that content's name (i.e. consistent hashing [15]).

Distributed hash tables have been used, for instance, in constructing the PAST [28] and CFS [8] distributed filesystems, the Overlook [33] scalable name service, the Squirrel [13] cooperative web cache, and scalable application-level multicast [5, 29, 26]. For most of these systems, if not all of them, the overlay network on which they were designed can easily be substituted with SkipNet.

SkipNet has a fundamental philosophical difference from existing overlay networks, such as Chord and Pastry, whose goal is to implement a DHT. The basic philosophy of systems like Chord and Pastry is to diffuse content randomly throughout an overlay in order to obtain uniform, load-balanced, peer-to-peer behavior. The basic philosophy of SkipNet is to enable systems to preserve useful content and path locality, while still enabling load balancing over constrained subsets of participating nodes.

This paper is not the first to observe that locality properties are important in peer-to-peer systems. Keleher et al. [16] make two main points: DHTs destroy locality, and locality is a good thing. Vahdat et al. [34] raises the locality issue as well. SkipNet addresses this problem directly: By using names rather than hashed identifiers to order nodes in the overlay, natural locality based on the names of objects is preserved. Furthermore, by arranging content in name order rather than dispersing it, operations on ranges of names are possible in SkipNet.

3 Basic SkipNet Structure

In this section, we introduce the basic design of SkipNet. We present the SkipNet architecture, including how to route in SkipNet, and how to join and leave a SkipNet.

3.1 Analogy to Skip Lists

A Skip List, first described in Pugh [23], is a dictionary data structure typically stored in-memory. A Skip List is a sorted linked list in which some nodes are supplemented with pointers that skip over many list elements. A "perfect" Skip List is one where the height of the $i^{th}$ node is the exponent of the largest power-of-two that divides i. FIG. 7a depicts a perfect Skip List. Note that pointers at level h have length $2^h$ (i.e. they traverse $2^h$ nodes in the list). A perfect Skip List supports searches in O(log N) time.

Because it is prohibitively expensive to perform insertions and deletions in a perfect Skip List, Pugh suggests a probabilistic scheme for determining node heights while maintaining O(log N) searches with high probability. Briefly, each node chooses a height such that the probability of choosing height h is $\frac{1}{2}^h$. Thus, with probability ½ a node has height 1, with probability ¼ it has height 2, and so forth. FIG. 7b depicts a probabilistic Skip List.

Whereas Skip Lists are an in-memory data structure that is traversed from its head node, we desire a data structure that links together distributed computer nodes and supports traversals that may start from any node in the system. Furthermore, because peers should have uniform roles and responsibilities in a peer-to-peer system, we desire that the state and processing overhead of all nodes be roughly the same. In contrast, Skip Lists maintain a highly variable number of pointers per data record and experience a substantially different amount of traversal traffic at each data record.

3.2 The SkipNet Structure

The key idea we take from Skip Lists is the notion of maintaining a sorted list of all data records as well as pointers that "skip" over varying numbers of records. We transform the concept of a Skip List to a distributed system setting by replacing data records with computer nodes, using the string name IDs of the nodes as the data record keys, and forming a ring instead of a list. The ring must be doubly-linked to enable path locality, as is explained in Section 3.3.

Rather than having nodes store a highly variable number of pointers, as in Skip Lists, each SkipNet node stores roughly 2 log N pointers, where N is the number of nodes in the overlay system. Each node's set of pointers is called its routing table, or R-Table, since the pointers are used to route message traffic between nodes. The pointers at level h of a given node's routing table point to nodes that are roughly $2^h$ nodes to the left and right of the given node. FIG. 9 depicts a SkipNet containing 8 nodes and shows the routing table pointers that nodes A and V maintain.

The SkipNet in FIG. 9 is a "perfect" SkipNet: each level h pointer traverses exactly $2^h$ nodes. Maintaining a perfect SkipNet in the presence of insertions and deletions is impractical, as is the case with perfect Skip Lists. To facilitate efficient insertions and deletions, we derive a probabilistic Skip-Net design. FIG. 10 depicts the same SkipNet of FIG. 9, arranged to show all node interconnections at every level simultaneously. All nodes are connected by the root ring formed by each node's pointers at level 0. The pointers at level 1 point to nodes that are 2 nodes away and hence the overlay nodes are implicitly divided into two disjoint rings. Similarly, pointers at level 2 form 4 disjoint rings of nodes, and so forth. Note that rings at level h+1 are obtained by splitting a ring at level h into two disjoint sets, each ring containing every second member of the level h ring. To obtain a probabilistic SkipNet design each ring at level h is split into two rings at level h+1 by having each node randomly and uniformly choose which of the two rings it belongs to. With this probabilistic scheme, insertion/deletion of a node only affects two other nodes in each ring to which the node randomly chooses to belong. Furthermore, a pointer at level h still skips over $2^h$ nodes in expectation, and routing is possible in O(log N) forwarding hops with high probability.

Each node's random choice of ring memberships can be encoded as a unique binary number, which we refer to as the node's numeric ID. As illustrated in FIG. 10, the first h bits of the number determine ring membership at level h. For example, node X's numeric ID is 011 and its membership at level 2 is determined by taking the first 2 bits of 011, which designate Ring 01. As described in [30], there are advantages to using a collision-resistant hash (such as MD-5) of the node's DNS name as the numeric ID. For the rest of this paper, we are not concerned with how the numeric ID is generated—we simply assume that it is indeed random and unique.

Because the numeric IDs of nodes are unique they can be thought of as a second address space that is maintained by the same SkipNet data structure. Whereas SkipNet's string address space is populated by node name IDs that are not uniformly distributed throughout the space, SkipNet's numeric address space is populated by node numeric IDs that are uniformly distributed. The existence of the latter address space is what allows us to construct routing table entries for the former address space that skip over the appropriate number of nodes.

Readers familiar with Chord may have observed that SkipNet's routing tables are similar to those maintained by Chord in that the pointer at level h hops over $2^h$ nodes in expectation. The fundamental difference is that SkipNet's routing tables support routing through a name space populated by nodes' name IDs whereas Chord's routing tables support routing through a numeric space that is populated by unique hashes derived from nodes' string names. Chord guarantees O(log N) routing and node insertion performance by uniformly distributing node identifiers in it numeric address space. SkipNet achieves the same goals for its string name space by encoding information about two address spaces within its routing tables, one of which has properties similar to that of Chord's numeric address space.

3.3 Routing by Name ID

Routing by name ID in SkipNet is based on the same basic principle as searching in Skip Lists: Follow pointers that route closest to the intended destination. At each node, a message will be routed along the highest-level pointer that does not point past the destination value. Routing terminates when the message arrives at a node whose name ID is closest to the destination.

FIG. 11 is a pseudo-code representation of this algorithm. The routing operation begins when a node calls the function RouteByNameID, passing in a destination name ID and a message to route. This function wraps the message inside a larger message that also contains fields for the name ID to route to and the direction in which to route. The direction is set according to whether the destination name ID is lexicographically greater or lesser than the name ID of the local node.

After wrapping the message, the function RouteMessageByNameID is called to actually forward the message to the next node. This function will be called on each node that the message is routed through (including the originating node). RouteMessageByNameID uses the local node's routing table to try to forward the message towards its final destination. If the local node is the closest node to the destination name ID then DeliverMessage is called to effect actual delivery of the message on the local node.

Since nodes are ordered by name ID along each ring and a message is never forwarded past its destination, all nodes encountered during routing have name IDs between the source and the destination. Thus, when a message originates at a node whose name ID shares a common prefix with the destination, all nodes traversed by the message have name IDs that share the same prefix as the source and destination do. Note that, because rings are doubly-linked, this scheme can route using both right and left pointers depending upon whether the source name ID is smaller or greater than the destination name ID, respectively. The key observation of this scheme is that a routing by name ID traverses nodes with non-decreasing name ID prefix matches with the destination.

If the source name ID and the destination share no common prefix, a message could be routed in either direction, using right or left pointers. For fairness sake, one could randomly pick a direction to go so that nodes whose name IDs are near the middle of the lexicographic ordering do not get a disproportionately larger share of the forwarding traffic than do nodes whose name IDs are near the beginning or end of the ordering. For simplicity however, our current implementation never wraps around from Z to A or vice-versa. Section 8.5 proves that node stress is well-balanced even under this scheme.

The expected number of hops traversed by a message when routing by name ID is O(log N) with high probability. For a proof see Section 8.1.

3.4 Routing by Numeric ID

It is also possible to route messages efficiently according to a given numeric ID. In brief, the routing operation begins by examining nodes in the level 0 ring until a node is found whose numeric ID matches the destination numeric ID in the first digit. At this point the routing operation jumps up to this node's level 1 ring, which also contains the destination node. The routing operation then examines nodes in this level 1 ring until a node is found whose numeric ID matches the destination numeric ID in the second digit. As before, we conclude that this node's level 2 ring must also contain the destination node, and thus the routing operation proceeds in this level 2 ring.

This procedure repeats until we cannot make any more progress—we have reached a ring at some level h such that none of the nodes in that ring share h+1 digits with the destination numeric ID. We must now somehow deterministically choose one of the nodes in this ring to be the destination node. Our algorithm defines the destination node to be the node whose numeric ID is numerically closest to destination numeric ID amongst all nodes in this highest ring[1].

[1] A simpler alternative would be to choose the closest node under the XOR metric proposed in [20].

FIG. 12 is a pseudo-code representation of this algorithm. The routing operation begins when a node calls the function RouteByNumericID, passing in a destination numeric ID and a message to route. This wraps the message inside a larger message that also contains fields for several state variables that need to be maintained and updated throughout the (distributed) routing procedure. These fields include numericID: The destination numeric ID to route to,
currH: The level of the current ring that is being traversed,
startNode: The first node encountered in the current ring,
bestNode: The node that is closest to the destination among all nodes encountered so far,
finalDestination: A flag that is set to true if the next node to process the message is the correct final destination for the message.

After wrapping the message, the function RouteMessageByNumericID is called to actually forward the message to the next node. This function will be called on each node that the message is routed through (including the originating node). RouteMessageByNumericID checks to see if the final destination for the message is itself and invokes the function DeliverMessage to effect local delivery of the message if so.

Otherwise, a check is made to see if the message has traversed all the way around the routing table ring indicated by currH. If so, this implies that no higher-level ring was found that matched a prefix of the destination ID. In that case, bestNode will contain the identity of the node on the current ring that should be the final destination for the message; the message will be forwarded to that node.

If the message has not fully traversed the current ring then RouteMessageByNumericID checks to see if the local node is also a member of a higher-level ring that matches a prefix of the destination ID. If so, then a search of that ring is initiated. If not, then a check is made to see if the local node is closer to the destination ID than the best node found on the ring so far. In either case the message will be forwarded to the next member of the routing ring to traverse.[2]

[2] The choice of going around a ring in a clockwise or counter-clockwise direction is arbitrary; we have chosen to go in a clockwise direction.

The expected number of hops traversed by a message when routing by numeric ID is $O(\log N)$ with high probability. For a proof see Section 8.3.

3.5 Node Join and Departure

To join a SkipNet, a newcomer must first find the top-level ring that corresponds to the newcomer's numeric ID. This amounts to routing a message to the newcomer's numeric ID, as described in Section 3.4.

The newcomer first finds its neighbors in this top-level ring, using a search by name ID within this ring only. Starting from one of these neighbors, the newcomer searches for its name ID at the next lower level for its neighbors at this lower level. This process is repeated for each level until the newcomer reaches the root ring. For correctness, none of the existing nodes point to the newcomer until the new node joins the root ring; the newcomer then sends messages to its neighbors along each ring to indicate that it should be inserted next to them.

FIG. 13 is a pseudo-code representation of this algorithm. The joining node calls InsertNode, passing in the name ID and numeric ID it will use. This function creates a message that will be routed towards the joining node's numeric ID. The message will end up at a node belonging to the top-level ring that the new node should join. There, the message will be passed in to the general-purpose message delivery routine DeliverMessage.

That routine will initiate the second phase of node insertion by calling InsertNodeIntoRings, which creates a new message that will be used to gather up the neighbor nodes of all rings into which the joining node should insert itself. The state encoded by this message includes the following fields:

joiningNode: The identity of the newly joining node.
nameID: The name ID of the newly joining node.
numericID: The numeric ID of the newly joining node.
currH: The ring in which an insertion neighbor is currently being searched for.
ringNeighbors: An array of insertion neighbor nodes.
doInsertion: A flag that is set to true if the array of ringNeighbors has been completely filled in and the next node to process the message is the newly joining node (which should then do the actual insertions into each ring).

To actually process an insertion-neighbors collection message the function CollectRingNeighbors is called. This function will be called on each node that the message created by InsertNodeIntoRings is routed through.

CollectRingNeighbors checks to see if the collection of insertion neighbors is complete and it's time to do the actual insertion of the newly joining node into all the relevant rings. If not, then the neighbor node for the current ring is checked to see if it is the right node to insert before. If yes, then the insertion neighbor is recorded in the message and search is initiated for the next-lower level ring. If not, then the message is forwarded to the neighbor along the current ring. Once neighbors have been found for all ring levels, the completed list of insertion neighbors is sent back to the newly joining node.

The key observation for this algorithm's efficiency is that a newcomer joins a ring at a certain level only after joining a higher level ring. As a result, the search by name ID within the ring to be joined will typically not traverse all members of the ring. Instead, the range of nodes traversed is limited to the range between the newcomer's neighbors at the higher level. Therefore, with high probability, a node join in SkipNet will traverse $O(\log N)$ hops (for a proof see Section 8.4).

The basic observation in handling node departures is that SkipNet can route correctly as long as the bottom level ring is maintained. All pointers but the level-0 ones can be regarded as routing optimization hints, and thus not necessary to maintain routing protocol correctness. Therefore, like Chord and Pastry, SkipNet maintains and repairs these rings' memberships lazily, by means of a background repair process. However, when a node voluntarily departs from the SkipNet, it can proactively notify its neighbours to repair their pointers immediately, instead of doing the lazy repair later.

To maintain the bottom ring correctly, each SkipNet node maintains a leaf set that points to additional nodes along the bottom ring. We describe the leaf set next.

3.6 Leaf Set

Every SkipNet node maintains a set of pointers to the L/2 nodes closest in name ID on the left side and similarly on the right side. We call this set of pointers a leaf set. Several previous peer-to-peer systems [27] incorporate a similar architectural feature; in Chord [31] they refer to this as a successor list.

These additional pointers in the bottom level ring provide two benefits. First, the leaf set increases fault tolerance. If a search operation encounters a failed node, a node adjacent to the failed node will contain a leaf set pointer with a destination on the other side of the failed node, and so the search will eventually move past the failed node. Repair is also facilitated by repairing the bottom ring first, and recursively relying on the accuracy of lower rings to repair higher rings. Without a leaf set, it is not clear that higher level pointers (that point past a failed node) sufficiently enable repair. If two nodes fail, it may be that some node in the middle of them becomes invisible to other nodes looking for it using only higher level pointers. Additionally, in the node failure scenario of an organizational disconnect, the leaf set pointers on most nodes are more likely to remain intact than higher level pointers. The resiliency to node failure that leaf sets provide (with the exception of the organizational disconnect scenario) was also noted by [31].

A second benefit of the leaf set is to increase search performance by subtracting a noticeable additive constant from the required number of search hops. When a search message is within L/2 of its destination, the search message will be immediately forwarded to the destination. In our current implementation we use a leaf set of size L=16, just as Pastry does.

3.7 Background Repair

SkipNet uses the leaf set to ensure with good probability that the neighbor pointers in the level 0 ring point to the correct node. As is the case in Chord [30], this is all that is required to guarantee correct, if possibly inefficient, routing by name ID. For an intuitive argument of why this is true, suppose that some higher-level pointer does not point to the correct node, and that the search algorithm tries to use this pointer. There are two cases. In the first case, the incorrect pointer points further around the ring than the routing destination. In this case the pointer will not be used, as it goes past the destination. In the second case, the incorrect pointer points to a location between the current location and the destination. In this case the pointer can be safely followed and routing will proceed from wherever it points. The only potential loss is routing efficiency. In the worst case, correct routing will occur using the level 0 ring.

Nonetheless, for efficient routing, it is important to ensure as much as possible that the other pointers are correct. Skip-Net employs two background algorithms to detect and repair incorrect ring pointers.

The first of these algorithms builds upon the invariant that a correct set of ring pointers at level h can be used to build a correct set of pointers in the ring above it at level h+1. Each node periodically routes a message a short distance around each ring that it belongs to, starting at level 0, verifying that the pointers in the ring above it point to the correct node and adjusting them if necessary. Once the pointers at level h have been verified, this algorithm iteratively verifies and repairs the pointers one level higher. At each level, verification and repair of a pointer requires only a constant amount of work in expectation.

The second of these algorithms performs local repairs to rings whose nodes may have been inconsistently inserted or whose members may have disappeared. In this algorithm nodes periodically contact their neighbors at each level saying "I believe that I am your left (right) neighbor at level h". If the neighbor agrees with this information no reply is necessary. If it doesn't, the neighbor replies saying who he believes his left (right) neighbor is, and a reconciliation is performed based upon this information to correct any local ring inconsistencies discovered.

4 Useful Locality Properties of SkipNet

In this section we discuss the useful locality properties that SkipNet is able to provide, and their consequences.

4.1 Content and Routing Path Locality

Given the basic structure of SkipNet, describing how Skip-Net supports content and path locality is straightforward. Incorporating a node's name ID into a content name guarantees that the content will be hosted on that node. As an example, to store a document doc-name on the node john.microsoft.com, naming it john.microsoft.com/doc-name is sufficient.

SkipNet is oblivious to the naming convention used for nodes' name IDs. Our simulations and deployments of Skip-Net use DNS names for name IDs, after suitably reversing the components of the DNS name. In this scheme, john.microsoft.com becomes com.microsoft.john, and thus all nodes within microsoft.com share the com.microsoft prefix in their name IDs. This yields path locality for organizations in which all nodes share a single DNS suffix (and hence share a single name ID prefix).

4.2 Constrained Load Balancing

As mentioned in the Introduction, SkipNet supports Constrained Load Balancing (CLB). To implement CLB, we divide a data object's name into two parts: a part that specifies the set of nodes over which DHT load balancing should be performed and a part that is used as input to the DHT's hash function. In SkipNet the special character '!' is used as a delimiter between the two parts of the name. For example, the name msn.com/DataCenter!TopStories.html indicates load balancing over nodes whose names begin with the prefix msn.com/DataCenter. The suffix, TopStories.html, is used as input to the DHT hash function, and this determines on which of the nodes within msn.com/DataCenter to place the data object.

To search for a data object that has been stored using CLB, we first search for the appropriate subset of nodes using search by name ID. To find the specific node within the subset that stores the data object, we perform a search by numeric ID within this subset for the hash of the suffix.

The search by name ID is unmodified from the description in Section 3.3, and takes O(log N) message hops. The search by numeric ID is constrained by a name ID prefix and thus at any level must effectively step through a doubly-linked list rather than a ring. Upon encountering the right boundary of the list (as determined by the name ID prefix boundary), the search must reverse direction in order to ensure that no node is overlooked. Reversing directions in this manner affects the performance of the search by numeric ID by at most a factor of two, and thus O(log N) message hops are required in total.

Note that both traditional system-wide DHT semantics as well as explicit content placement are special cases of constrained load balancing: system-wide DHT semantics are obtained by placing the '!' hashing delimiter at the beginning of a document name. Omission of the hashing delimiter and choosing the name of a data object to have a prefix that matches the name of a particular SkipNet node will result in the object being placed on that SkipNet node.

Constrained load balancing can be performed over any naming subtree of the SkipNet but not over an arbitrary subset of the nodes of the overlay network. In this respect it has flexibility similar to a hierarchical file system's. Another limitation is that the domain of load balancing is encoded in the name of a data object. Thus, transparent remapping to a different load balancing domain is not possible.

4.3 Fault Tolerance

Previous studies [18, 21] have shown that network connectivity failures in the Internet today are due primarily to Border Gateway Protocol (BGP) misconfigurations and faults. Other hardware, software and human failures play a lesser role. As a result, node failures in overlay systems are not independent, but instead, nodes belonging to the same organization or AS domain tend to fail together. In consequence, we have focused the design of SkipNet's fault-tolerance to handle failures occurring along organizational boundaries. SkipNet's tolerance to uncorrelated, independent failures is much the same as previous overlay designs (e.g., Chord and Pastry), and is achieved through similar mechanisms.

4.3.1 Failure Recovery

The key observation in failure recovery is that maintaining correct neighbor pointers in the level 0 ring is enough to ensure correct functioning of the overlay. Since each node maintains a leaf set of L level 0 neighbors, level 0 ring pointers can be repaired by replacing them with the leaf set entries that point to the nearest live nodes following the failed node. The live nodes in the leaf set may be contacted to repopulate the leaf set fully.

As described in Section 3.7, SkipNet also employs a lazy stabilization mechanism that gradually updates all necessary routing table entries in the background when a node fails. Any query to a live, reachable node will still succeed during this time; the stabilization mechanism simply restores optimal routing.

4.3.2 Failures Along Organization Boundaries

In previous peer-to-peer overlay designs [25, 30, 27, 36], node placement in the overlay topology is determined by a randomly chosen numeric ID. As a result, nodes within a single organization are placed uniformly throughout the address space of the overlay. While a uniform distribution enables the O(log N) routing performance of the overlay it makes it difficult to control the effect of physical link failures on the overlay network. In particular, the failure of a interorganizational network link will manifest itself as multiple, scattered link failures in the overlay. Indeed, it is possible for each node within a single organization that has lost connectivity to the Internet to become disconnected from the entire overlay and from all other nodes within the organization. Section 9.4 reports experimental results that confirm this observation.

Since SkipNet name IDs tend to encode organizational membership, and nodes with common name ID prefixes are contiguous in the overlay, failures along organization boundaries do not completely fragment the overlay, but instead result in ring segment partitions. Consequently, a significant fraction of routing table entries of nodes within the disconnected organization still point to live nodes within the same network partition. This property allows SkipNet to gracefully survive failures along organization boundaries. Furthermore, the disconnected organization's SkipNet segment can be efficiently re-merged with the external SkipNet when connectivity is restored, as described in Section 6.

4.4 Security

Our discussion of the benefits of content and path locality assumes an access control mechanism on choice of name ID. SkipNet does not directly provide this mechanism but rather assumes that it is provided at another layer. Our use of DNS names for name IDs does provide this: Arbitrary nodes cannot create global DNS names with the microsoft.com suffix.

Path locality allows SkipNet to guarantee some security beyond what previous peer-to-peer systems offer: Messages between two machines within a single administrative domain that corresponds to a common prefix in name ID space will never leave the administrative domain. Thus, these messages are not susceptible to traffic analysis or denial-of-service attacks by machines located outside of the administrative domain. Indeed, SkipNet even provides resiliency to the Sybil attack [9]: creating an unbounded number of nodes outside microsoft.com will not allow the attacker to see any traffic internal to microsoft.com.

An attacker might attempt to target a particular domain (for example, microsoft.com) by choosing to join SkipNet with a name ID that is adjacent to the target (for example, microsofta.com). Suppose microsoft.com consists of M nodes. In this case, the attacker expects to see an O((log M)/M) fraction of the messages passing between microsoft.com nodes and the outside world, under a uniform traffic assumption.

In Chord, a system that lacks path locality, inserting oneself adjacent to a target node and intercepting a constant fraction of the traffic to the target (assuming that messages are routed using only the Chord finger table and not the Chord successor list) may require computing as many SHA-1 hashes as there are nodes in the system. In contrast, in SkipNet there is no computational overhead to generating a name ID, but it is impossible to insert oneself into SkipNet in a place where one lacks the administrative privileges to create that name ID. It does seem that in SkipNet, it may be possible to target the connection between an entire organization and the outside world with fewer attacking nodes than would be necessary in other systems lacking path locality. We believe that path locality is a desirable property even though it facilitates this kind of attack.

Recent work [3] on improving the security of peer-to-peer systems has focused on certification of node identifiers, tests for the success of routing, and the use of redundant routing paths. While our present discussion has focused on the security benefits of content and path locality, the SkipNet design could also incorporate the techniques from this recent work.

4.5 Range Queries

Since SkipNet's design is based on and inspired by Skip Lists, it inherits their functionality and flexibility in supporting efficient range queries. In particular, since nodes and data are stored in name ID order, documents sharing common prefixes are stored over contiguous ring segments. Answering range queries in SkipNet is therefore equivalent to routing along the corresponding ring segment. Because our current focus is on SkipNet's architecture and locality properties, we do not discuss range queries further in this paper.

5 SkipNet Enhancements

This section presents several optimizations and enhancements to the basic SkipNet design.

5.1 Sparse and Dense Routing Tables

The basic SkipNet Routing Table structure and algorithms described in Section 3 may be modified in order to improve routing performance. Thus far in our discussions, SkipNet numeric IDs consist of 128 random binary digits. However, the random digits need not be binary. Indeed, Skip Lists using non-binary random digits are well-known [23].

If the numeric IDs in SkipNet consist of non-binary digits, this changes the ring structure depicted in FIG. 10, the number of pointers we expect to store, and the expected search cost. We denote the number of different possibilities for a digit by k—in the binary digit case, k=2. If k=3, the root ring of SkipNet still is just a single ring, but there are 3 (not just 2) level one rings, 9 level two rings, etc. As k increases, it becomes less likely that nodes will match in any given number of digits, and thus the total number of pointers will decrease. Because there are fewer pointers, we also expect that it will take more hops to get to any particular node. For increasing values of k, the number of pointers decreases to $O(\log_k n)$ while the number of hops required for search increases to $O(k \log_k n)$. We call the Routing Table that results from this modification a sparse R-Table with parameter k.

It is also possible to build a dense R-Table. As in the sparse construction, suppose that there are k possibilities for each digit. Suppose additionally that we store k−1 pointers to contiguous nodes at each level and in both directions. In this case, the expected number of search hops decreases to $O(\log_k n)$, while the expected number of pointers at a node increases to $O(k \log_k n)$—this is the opposite tradeoff from the sparse construction. These results are formally proved in Section 8. For intuition as to why we store k−1 pointers per direction per level, note that a node's $k^{th}$ neighbor at level h has a good chance of also being its first neighbor at level h+1.

Our density parameter, k, bears some similarity to Pastry's density parameter, b. Pastry always generates binary numeric IDs but divides bits into groups of b. This is analogous to our scheme for choosing numeric IDs with $k=2^b$.

Implementing node join and departure in the case of sparse R-Tables requires no modification to our previous algorithms. For dense R-Tables, the node join message must traverse (and gather information about) at least k−1 nodes in both directions in every ring containing the newcomer, before descending to the next ring. As before, node departure merely requires notifying every neighbor.

If k=2, the sparse and dense constructions are identical. Increasing k makes the sparse R-Table sparser and the dense R-Table denser. Any given degree of sparsity/density can be well-approximated by appropriate choice of k and either a sparse or a dense R-Table. Our implementation chooses k=8 to achieve a good balance between state per node and routing performance.

5.2 Duplicate Pointer Elimination

Two nodes that are neighbours in a ring at level h may also be neighbours in a ring at level h+1. In this case, these two nodes maintain "duplicate" pointers to each other at levels h and h+1. Intuitively, routing tables with more distinct pointers yield better routing performance than tables with fewer distinct pointers, and hence duplicate pointers reduce the effectiveness of a routing table. Replacing a duplicate pointer with a suitable alternative, such as the following neighbor in the lower ring, improves routing performance by a moderate amount (typically around 20%). Routing table entries adjusted in this fashion can only be used when routing by name ID since they violate the invariant that a node point to its closest neighbor on a ring, which is required for correct routing by numeric ID.

5.3 Incorporating Network Proximity: The P-Table

In SkipNet, a node's neighbors are determined by a random choice of ring memberships and by the ordering of identifiers within those rings. Accordingly, the SkipNet overlay is constructed without direct consideration of the physical network topology, potentially hurting routing performance. For example, when sending a message from the node saturn.com/nodeA to the node chrysler.com/nodeB, both in the USA, the message might get routed through the intermediate node jaguar.com/nodeC in the UK. This would result in a much longer path than if the message had been routed through another intermediate node in the USA.

To deal with this problem, we introduce a second routing table called the P-Table, which is short for the proximity table. Our P-Table design is inspired by Pastry's proximity-aware routing tables [4]. To incorporate network proximity, the key observation is that any node that is roughly the right distance away in name ID space can be used as an acceptable routing table entry that will maintain the underlying O(log N) hops routing behavior. For example, it doesn't matter whether a routing table entry at level 3 points to the node that is exactly 8 nodes away or to one that is 7 or 9 nodes away; statistically the number of forwarding hops that messages will take will end up being the same. However, if the 7th or 9th node is nearby in network distance then using it as the routing table entry can yield substantially better routing performance.

To bootstrap the P-Table construction process, we use information already contained in a node's basic routing table (the R-Table). Recall that the R-Table entries are expected to point to nodes that are exponentially increasing distances away. We construct routing entries for the P-Table by choosing nodes that interleave adjacent entries in the R-Table. In other words, the R-Table entries when sorted by name ID define the endpoints of contiguous segments of the root ring, and the P-Table construction process finds a node that is near to the joining node within each of those segments. We determine that two nodes are near each other by estimating the round-trip latency between them.

The following section provides a detailed description of the algorithm that a SkipNet node uses to construct its P-Table. After the initial P-Table is constructed, SkipNet constantly tries to improve the quality of its P-Table entries, as well as adjust to node joins and departures, by means of a periodic stabilization algorithm. The periodic stabilization algorithm is very similar to the initial construction algorithm presented below. Finally, in Section 8.8 we argue that P-Table routing performance and P-Table construction are efficient.

5.3.1 P-Table Construction

Recall that the R-Table has only two configuration parameters: the value of k and either sparse or dense construction. The P-Table inherits these parameters from the R-Table upon which it is based. In certain cases it is possible to construct a P-Table with parameters that differ from the R-Table's by first constructing a temporary R-Table with the desired parameters. For example, if the R-Table is sparse, one may construct a dense P-Table by first constructing a temporary dense R-Table to use as input to the P-Table construction algorithm.

To begin P-Table construction, the entries of the R-Table (whether temporary or not) are copied to a separate list, where they are sorted by name ID and duplicate entries are eliminated. Duplicates and out-of-order entries can arise due to the probabilistic nature of constructing the R-Table. Next, the joining node constructs a P-Table join message that contains the sorted list of endpoints: a list of j nodes defining j−1 intervals. The node then sends this P-Table join message to a node that should be nearby in terms of network distance, called the seed node.

Any node that receives a P-Table join message uses its own P-Table entries to fill in the intervals with "candidate" nodes. As a practical consideration, we limit the maximum number of candidates per interval to 10 in order to avoid accumulating too many nodes. After filling in any possible intervals, the node examines the join message to see if any of the intervals are still empty. If there are still unfilled intervals, the node forwards the join message, using its own P-Table entries, towards the furthest endpoint of the unfilled interval that is farthest away from the joining node. If all the intervals have at least one candidate, the node sends the completed join message back to the joining node.

When the original node receives its own join message, it iterates through each interval choosing one of the candidate nodes as its P-Table entry for that interval. The final choice between candidate nodes is performed by estimating the network latency to each candidate and choosing the closest node.

We summarize a few remaining key details of P-Table construction. Since SkipNet maintains doubly-linked rings, construction of a P-Table involves defining intervals that cover the address space in both the clockwise and counter-clockwise directions from the joining node. Hence two join messages are sent from the same starting node. In our simulator, the seed node of the P-Table join message is in fact the nearest node in the system. For a real implementation, we make the following simple proposal: The seed node should be determined by estimating the network latency to all nodes in the leaf set and choosing the closest leaf set node. Since SkipNet name IDs incorporate naming locality, a node is likely to be close in terms of network proximity to the nodes in its leaf set. Thus the closest leaf set node is likely to be an excellent choice for a seed node.

The P-Table is updated periodically in order that the P-Table segment endpoints accurately reflect the distribution of name IDs in the SkipNet, which may change over time. The only difference between P-Table construction and P-Table update is that for update, the current P-Table entries are considered as candidate nodes in addition to the candidates returned by the P-Table join message. The P-Table entries may also be incrementally updated as node joins and departures are discovered through ordinary message traffic.

5.4 Incorporating Network Proximity: The C-Table

We add a third table, the C-Table, to incorporate network proximity when searching by numeric ID, much as the P-Table incorporated network proximity when searching by name ID. Constrained Load Balancing (CLB), because it involves searches by both name ID and numeric ID, takes advantage of both the P-Table and the C-Table. Because search by numeric ID as part of a CLB search must obey the CLB search name constraint, C-Table entries breaking the name constraint cannot be used. When such an entry is encountered, the CLB search must revert to using the R-Table.

The C-Table has identical functionality and design to the routing table that Pastry maintains [27]. The suggested parameter choice for Pastry's routing table is b 4 (i.e. k=16), while our implementation chooses k=8, as mentioned in Section 5.1. As is the case with searching by numeric ID using the R-Table, and as is the case with Pastry, searching by numeric ID with the C-Table requires at most O(log N) message hops.

For concreteness, we describe the C-Table in the case that k=8, although this description could be inferred from [27]. At each node the C-Table consists of a set of arrays of node pointers, one array per numeric ID digit, each array having an entry for each of the eight possible digit values. Each entry of the first array points to anode whose first numeric-ID digit matches the array index value. Each entry of the second array points to a node whose first digit matches the first digit of the current node and whose second digit matches the array index value. This construction is repeated until we arrive at an empty array.

5.4.1 C-Table Construction and Update

The details of C-Table construction can be found in [4]. The key idea is: For each array in the C-Table, route to a nearby node with the necessary numeric ID prefix, obtaining its C-Table entries at that level, and then populate the joining node's array with those entries. Since several candidate nodes may be available for a particular table entry, the candidate with the best network proximity is selected. Section 8.8 shows that the cost of constructing a C-Table is O(log N) in terms of message traffic. As in Pastry, the C-Table is updated lazily, by means of a background stabilization algorithm.

We report experiments in Section 9.5 showing that use of the C-Table during CLB search reduces the RDP (Relative Delay Penalty). An adaptation of the argument presented in [4] for Pastry explains why this should be the case.

5.5 Virtual Nodes

Economies of scale and the ability to multiplex hardware resources among distinct web sites have led to the emergence of hosting services in the World Wide Web. We anticipate a similar demand for hosting virtual nodes on a single hardware platform in peer-to-peer systems. In this section, we describe a scheme for scalably supporting virtual nodes within the SkipNet design. For ease of exposition, we describe only the changes to the R-Table; the corresponding changes to the P-Table and C-Table are obvious and hence omitted.

Nothing in the SkipNet design prevents multiple nodes from co-existing on a single machine; however, scalability becomes a concern as the number of virtual nodes increases. As shown in Section 8.2, a single SkipNet node's R-Table will probably contain roughly log N pointers. If a single physical machine hosts v virtual nodes, the total number of R-Table pointers for all virtual nodes is therefore roughly v log N. As v increases, the periodic maintenance traffic required for each of those pointers poses a scalability concern. To alleviate this potential bottleneck, the present section describes a variation on the SkipNet design that reduces the expected number of pointers required for v virtual nodes to O(v+log n), while maintaining logarithmic expected path lengths for searches by name ID. In Section 8.6 we provide mathematical proofs for the performance of this virtual node scheme.

Although Skip Lists have comparable routing path lengths as SkipNet, Section 3 mentioned two fundamental drawbacks of Skip Lists as an overlay routing data structure:

Nodes in a Skip List experience markedly disproportionate routing loads.

Nodes in a Skip List have low average edge connectivity.

Our key insight is that neither of these two Skip List drawbacks apply to virtual nodes. In the context of virtual nodes, we desire that:

A peer-to-peer system must avoid imposing a disproportionate amount of work on any given physical machine. It is less important that virtual nodes on a single physical machine do proportionate amounts of work.

Similarly, each physical machine should have high edge connectivity. It is less important that virtual nodes on a single physical machine have high edge connectivity.

In light of these revised objectives, we can relax the requirement that each virtual node has roughly log n pointers. Instead, we allow the number of pointers per virtual node to have a similar distribution to the number of pointers per data record in a Skip List. More precisely, all but one of the virtual nodes independently truncate their numeric IDs such that they have length $i \geq 0$ with probability $\frac{1}{2}^{i+1}$. The one remaining virtual node keeps its full-length numeric ID, in order to ensure that the physical machine has at least log n expected neighbours. As a result, in this scheme, the expected number of total pointers for a set of v virtual nodes is 2v+log n+O(1).

When a virtual node routes a message, it can use any pointer in the R-Table of any co-located virtual node. Simply using the pointer that gets closest to the destination (without going past it) will maintain path locality and logarithmic expected routing performance.

The interaction between virtual nodes and DHT functionality is more complicated. DHT functionality involves searching for a given numeric ID. Search by numeric ID terminates when it reaches a ring from which it cannot go any higher; this is likely to occur in a relatively high-level ring. By construction, virtual nodes are likely only to be members of low-level rings, and thus they are likely not to shoulder an equal portion of the DHT storage burden. However, because at least one node per physical machine is not virtualized, the storage burden of the physical machine is no less than it would be without any virtual nodes.

6 Recovery from Organizational Disconnects

In this section, we characterize the behavior of SkipNet with respect to a common failure mode: when organizations become disconnected from the Internet. We describe and evaluate the recovery algorithms used to repair the SkipNet overlay when such failures occur. One key benefit of SkipNet's locality properties is graceful degradation in response to disconnection of an organization due to router misconfigurations and link and router faults [18]. Because SkipNet orders nodes according to their names, and assuming that organizations assign node names with one or a few organizational prefixes, an organization's nodes are naturally arranged into a few contiguous overlay segments. Should an organization become disconnected, its segments remain internally well-connected and intra-segment traffic can be routed with the same $O(\log M)$ hop efficiency as before, where M is the maximum number of nodes in any segment.

By repairing only a few key routing pointers on the "edge" nodes of each segment, the entire organization can be connected into a single SkipNet. Intra-segment traffic is still routed in $O(\log M)$ hops, but inter-segment traffic may require $O(\log M)$ hops for every segment that it traverses. In total, $O(S \log M)$ hops may be required for inter-segment traffic, where S is the number of segments in the organization.

A background process can repair the remaining broken routing pointers, thereby eliminating the performance penalty borne by inter-segment traffic. SkipNet's structure enables this repair process to be done proactively, in a manner that avoids unnecessary duplication of work. When the organization reconnects to the Internet, these same repair operations can be used to merge the organization's segments back into the global SkipNet.

In contrast, most previous scalable, peer-to-peer overlay designs [25, 30, 27, 36] place nodes in the overlay topology according to a unique random numeric ID. Disconnection of an organization in these systems will result in its nodes fragmenting into many disjoint overlay pieces. During the time that these fragments are reforming into a single overlay, if they are even able to do so, network routing may be unreliable and efficiency may be poor.

6.1 Recovery Algorithms

When an organization is disconnected from the Internet its nodes will at least be able to communicate with each other over IP but will not be able to communicate with nodes outside the organization. If the organization's nodes' names employ one of several organizational prefixes then the global SkipNet will partition itself into several disjoint, but internally well-connected, segments. FIG. 14 illustrates this situation.

Because of SkipNet's routing locality property, message traffic within each segment will be unaffected by disconnection and will continue to be routed with $O(\log M)$ efficiency. Cross-segment traffic among the global portions of the SkipNet will also remain largely unaffected because, unless the disconnecting organization represents a sizeable portion of the entire overlay, most cross-segment pointers among global segments will remain valid. This will not be the case for the segments of the disconnected organization. Thus, the primary repair task after both disconnection and reconnection concerns the merging of overlay segments.

The algorithms employed in both the disconnection and reconnection cases are very similar: SkipNet segments must discover each other and then be merged together. For the disconnect case segments are merged into two disjoint SkipNets. For the reconnect case, segments of the two disjoint SkipNets are merged into a single SkipNet.

6.1.1 Discovery Techniques

When an organization disconnects, its segments may not be able to find each other using only SkipNet pointers. This is because there is no guarantee that non-contiguous segments will have pointers into each other. We solve this problem by assuming that organizations will divide their nodes into a relatively small number of name segments and requiring that they designate some number of nodes in each segment as "well-known". Each node in an organization maintains a list of these well-known nodes and uses them as contact points between the various overlay segments.

When an organization reconnects, the organizational and global SkipNets discover each other through their segment edge nodes. Each node maintains a "leaf set" that points to the eight closest nodes on each side of itself in the level 0 ring. If a node discovers that one side of its leaf set, but not the other, is completely unreachable then it concludes that a disconnect event has occurred and that it is an edge node of a segment. These edge nodes keep track of their unreachable leaf set pointers and periodically ping them for reachability; should a pointer become reachable, the node initiates the merge process. Note that merging two previously independent SkipNets together—for example, when a new organization joins the system—is functionally equivalent to reconnecting a previously connected one, except some other means of discovery is needed.

6.1.2 Connecting SkipNet Segments at Level 0

We divide the segment merge process into two steps: repair of the pointers comprising level 0 rings and repair of the pointers for all higher-level rings. The first step can be done quickly, as it only involves repair of the level 0 pointers of the "edge" nodes of each segment. Once the first step has been done it will be possible to route messages correctly among nodes in different segments and to do so with $O(S \log M)$ efficiency, where S is the total number of segments and M is the maximum number of nodes within a segment. As a consequence, the second, more expensive step can be done as a background task, as described in Section 6.1.3.

The key idea for connecting SkipNet segments at level 0 is to discover the relevant edge nodes by having a node in one segment route a message towards the name ID of a node in the other segment. This message will be routed to the edge node in the first segment that is nearest to other node's name ID. Messages routed in this fashion can be used to gather together a list of all segments' edge nodes. The actual inter-segment pointer updates are then done as a single atomic operation among the segment edge nodes, using distributed two-phase commit. This avoids routing inconsistencies.

To illustrate, FIG. 14 shows two SkipNets to be merged, each containing two different name segments. Suppose that node n1 knows of node n2's existence. Node n1 will send a message to node n2 (over IP) asking it to route a search message towards n1 in SkipNet B. n2's message will end up at node d1 and, furthermore, d1's neighbor on SkipNet B will be d0. d1 sends a reply to n1 (over IP) telling it about d0 and d1. n1 routes a search message towards d0 on SkipNet A to discover s1 and s0 in the same manner. The procedure is iteratively invoked using s0 and d0 to gain information about s2, s3, d2, and d3. FIG. 15 presents the algorithm in pseudocode.

Immediately following level 0 ring connection, messages sent to cross-segment destinations will be routed efficiently. Cross-segment messages will be routed to the edge of each segment they traverse and will then hop to the next segment using the level 0 pointer connecting the segments. This leads to O(S log M) routing efficiency. When an organization reconnects its fully repaired SkipNet at level 0 to the global one, traffic destined for nodes external to the organization will be routed in O(log M) hops to an edge node of the organization's SkipNet. The level 0 pointer connecting the two SkipNets will be traversed and then O(log N) hops will be needed to route traffic within the global SkipNet. Note that traffic that does not have to cross between the two SkipNets will not incur this routing penalty.

6.13 Repairing Routing Pointers Following Level 0 Ring Connection

Once the level 0 ring connection phase has completed we can update all remaining pointers that need repair using a background task. We present here a proactive algorithm that avoids unnecessary duplication of work through appropriate ordering of repair activities.

The key idea is that we will recursively repair pointers at one level by using correct pointers at the level below to find the desired nodes in each segment. Pointers at one level must be repaired across all segment boundaries before a repair of a higher level can be initiated. To illustrate, consider FIG. 16, which depicts a single boundary between two SkipNet segments after pointers have been repaired. FIG. 17 presents an algorithm in pseudo-code for repairing pointers above level 0 across a single boundary. We begin by discussing the single boundary case, and later we extend our algorithm to handle the multiple boundary case.

Assume that the level 0 pointers have already been correctly connected. There are two sets of two pointers to connect between the segments at level 1: the ones for the routing ring labeled 0 and the ones for the routing ring labeled 1 (see FIG. 10). We can repair the level 1 ring labeled 0 by traversing the level 0 ring from one of the edge nodes until we find nodes in each segment belonging to the ring labeled 0. The same procedure is followed to correctly connect the level 1 ring labeled 1. After the level 1 rings, we use the same approach to repair the four level 2 rings.

Because rings at higher levels are nested within rings at lower levels, repair of a ring at level h+1 can be initiated by one of the nodes that had its pointer repaired for the enclosing ring at level h. A repair operation at level h+1 is unnecessary if the level h ring (a) contains only a single member or (b) does not have an inter-segment pointer that required repair. The latter termination condition implies that most rings—and hence most nodes—in the global SkipNet will not, in fact, need to be examined for potential repair.

The total work involved in this repair algorithm is O(M log(N/M)), where M is the size of the disconnecting/reconnecting SkipNet segment and N is the size of the external SkipNet. Note that rings at level h+1 can be repaired in parallel once their enclosing rings at level h have been repaired across all segment boundaries. Thus, the repair process for a given segment boundary parallelizes to the extent supported by the underlying network infrastructure. We provide a theoretical analysis of the total work and total time to complete repair in Section 8.7.

To repair multiple segment boundaries, we simply call the algorithm described above once for each segment boundary. In the current implementation, we perform this process iteratively, waiting for the repair operation to complete on one boundary before initiating the repair at the next boundary. In future work, we plan to investigate initiating the segment repair operations in parallel—the open question is how to avoid repair operations from different boundaries interfering with each other.

7 Design Alternatives

The locality properties provided by SkipNet can be obtained to a limited degree by suitable extensions to existing overlay network designs. However, none of these design alternatives provide all the locality advantages that SkipNet does. In this section we describe various alternatives to SkipNet and compare them with SkipNet's approach.

One can divide the space of alternative design choices into three cases:

Don't use an overlay network at all; instead, rely on the inherent locality properties of the underlying IP network and DNS naming.

Use a single existing overlay network, possibly augmented, to provide locality.

Use multiple existing overlay networks that provide locality by spanning different sets of member nodes.

Consider the approach of doing without an overlay network. One justification for this is that explicit content placement consists of naming a data object as a concatenation of a node string name and a node-relative string name—just let the node string name be the node's DNS name. This approach would also arguably provide path locality since most organizations structure their internal networks in a path-local manner. However, discarding the overlay network also discards all of its advantages, including:

Implicit support for DHTs, and in the case of SkipNet, support for constrained load balancing.

Seamless reassignment of traffic to well-defined alternative nodes in the presence of node failures.

Support for higher level abstractions, such as multicast [5, 29, 26] and load-aware replication [33].

The ability to directly route messages to string name destinations independent of the availability of DNS services.

Now consider the approach of trying to achieve SkipNet's goals with an existing overlay network, possibly augmented in some fashion. Scalable, general-purpose alternatives to SkipNet are all DHT-based designs, such as Chord, Pastry, and Tapestry. Such overlay networks depend on random assignment of node IDs in order to obtain a uniform distribution of nodes within the address space they use.

Explicit content placement is a necessary ability if we want to prevent organizational disconnects from separating the data important to an organization from that organization. To support explicit content placement of a given data object on to a particular node in an existing overlay network, one could imagine modifying the current naming conventions for either the data object or the node that is the desired recipient of the object.

One could modify the naming convention for the node to achieve explicit content placement by choosing a node ID that directly corresponds to the hash ID of the data object's name, or some portion of its name. This effectively virtualizes overlay nodes so that each node joins the overlay once per data object. This scheme has the disadvantage that a separate routing table is required for each data object assigned to a given physical overlay node. The cost of this is prohibitive if a single node needs to store more than a few hundred data objects since, although memory resources are arguably cheap these days, the network traffic overhead of maintaining all the routing tables would overwhelm the node's network and CPU resources. Even just building the routing tables would require a significant amount of additional network traffic.

If instead one modified the naming convention for data objects, one could employ a two-part naming scheme, much like in SkipNet, wherein data object names consist of a virtual node name followed by a node-relative name. By virtualizing node names one could control which physical node is responsible for each virtual node. By bundling data object names under node names, one need only support a single or a smaller number of virtual nodes on each physical node. Although this approach supports explicit content placement, it does not support guaranteed path locality, nor does it support constrained load balancing (including continued content locality in the event of failover).

Now consider the second kind of locality SkipNet provides, path locality. Although existing overlay networks do not guarantee path locality, one might hope that they happen to provide it. In particular, Pastry supports network-proximity aware routing, and thus we expect organization-local messages to primarily travel within that organization [4]. However, Pastry's network proximity support depends on having a nearby node to use as a "seed" node when joining an overlay. If the nearby node is not within the same organization as the joining node, Pastry might not be able to provide good, let alone guaranteed, path locality. This problem is exacerbated for organizations that consist of multiple separate "islands" of nodes that are far apart in terms of network distance. In contrast, SkipNet is able to guarantee path locality, even across organizations that consist of separate clusters of nodes, as long as they are contiguous in name ID space.

One might imagine providing path locality in a design such as Pastry's by adding routing constraints to messages, so that messages are not allowed to be forwarded outside of a given organizational boundary. Such constraints would be used to exclude routing table entries from use that violate the routing constraint. Unfortunately, such constraints would also prevent routing from being consistent. That is, messages sent to the same destination ID from two different source nodes would not be guaranteed to end up at the same destination node.

The final locality property of SkipNet we discussed is that of tolerance to failures along organizational boundaries. This property stems from path locality, and hence design alternatives should fare better to the degree that they support path locality.

An interesting alternative to virtualizing node names would be to modify the naming conventions in existing overlays by lengthening the numeric IDs of the overlay network and partitioning them into separate parts. For example, in a two-part scheme, node names would consist of two concatenated random, uniformly distributed, unique numeric IDs. The first part might be a function of some portion of the node ID and the second part a function of the remainder of the node ID. Data object names would also consist of two parts: a numeric ID value and a string name. The numeric ID would map to the first part of an overlay ID while the hash of the string name would map to the second part.

The result is a static form of constrained load balancing: The numeric ID part of a data object's name selects the DHT formed by all nodes that share that same numeric ID and the string name part determines which node to map to within the selected DHT. This approach could be combined with virtualization of nodes in order to also provide explicit content placement. The major drawbacks of this approach are that the granularity of the hierarchy is frozen at the time of overlay creation by human decision; every layer of the hierarchy incurs an additional cost in the length of the numeric ID, and in the size of the routing table that must be maintained; the hierarchy must be an absolute function of the node ID, not the relative function that SkipNet provides; and the path locality guarantee is only with respect to boundaries in the static hierarchy. An alternative interpretation of the statement that a larger routing table must be maintained is that for a fixed budget of resources that can be devoted to maintaining the routing table, routing performance will be degraded.

Given the difficulties of extending a single DHT-based overlay network to support locality properties, one might consider employing multiple overlays, each containing a different set of participant nodes. One can define either a static set of overlay networks that reflect the locality requirements one desires or a dynamic set of overlay networks that reflect the participation of nodes in particular applications.

If the static set of overlay networks is hierarchical, nodes must pay the overhead of belonging to multiple overlay networks; for example, to a global overlay, an organization-wide overlay, and perhaps also a divisional or building-wide overlay. This affords a static form of constrained load balancing and path locality within each overlay. Explicit content placement would still require extension of the overlay design as discussed earlier. Furthermore, although load balancing can now be constrained to those nodes participating in a particular overlay, access to data that is load balanced in this fashion is not readily accessible to clients that do not belong to that overlay network. Thus, for example, load balancing data across the machines of a data center while still making it available to the entire world is not possible with this approach.

One alternative to belonging to different overlays would be for many mostly-disjoint overlays to exist. One could then use well-known gateway nodes to route to overlays of which you are not a member. If the adjacent overlay IDs for gateway nodes were reserved for backup gateway nodes then the implicit failover semantics of overlay routing can be used to avoid gateway nodes becoming single points of failure. However, the gateway nodes are points of congestion even if they are not points of failure, and this approach suffers the previously mentioned problem that a human must configure a good set of overlay networks.

These approaches could be combined. Each node could participate in an overlay network at multiple levels of a hierarchy, and one could route to other overlays (not just nodes) using well-defined gateways. One could then route to any node either in its role as a member of the global overlay or its role as a member of a smaller overlay. In effect, this approach defines a hierarchical overlay network, in which the concatenated parts of an overlay ID define the pathname through the hierarchy. The gateway node to a particular subtree of the hierarchy would have a virtual name consisting of the pathname prefix of that subtree.

This combined approach comes close to providing the same locality semantics as SkipNet: it provides explicit content placement, a static form of constrained load balancing, and path locality within each numeric ID domain. However, routing among domains now requires serial traversal of the domain hierarchy, implying that two domains that are far apart in the hierarchy may suffer a non-negligible increase in routing latencies between them. In contrast, SkipNet provides explicit content placement, allows clients to dynamically define new DHTs over whatever name prefix scope they desire, guarantees path locality within any shared name prefix, and does not pay a serial traversal penalty when routing between sources and destinations that do not share a name prefix.

A final design alternative involving multiple overlays is that of defining an overlay network per application. This lets applications dynamically define the locality requirements they wish to enforce and allows nodes to only participate in overlay networks they actually use. However, this approach suffers the same problems as the statically-defined multiple overlays approach does with respect to explicit content placement and external visibility of content, and it incurs the additional cost of maintaining a separate overlay for each application. In contrast, SkipNet provides a shared infrastructure.

8 Analysis of SkipNet

In this section we analyze various properties of and costs of operations in SkipNet. Each subsection begins with a summary of the main results followed by a brief, intuitive explanation. The remainder of each subsection proves the results formally.

8.1 Searching by Name ID

Searches by name ID in a dense SkipNet take $O(\log_k N)$ hops in expectation, and $O(k \log_k N)$ hops in a sparse SkipNet. Furthermore, these bounds hold with high probability. (Refer to Section 5.1 for the definition of 'sparse', 'dense', and parameter k; the basic SkipNet design described in Section 3 is a sparse SkipNet with k=2). We formally prove these results in Theorem 8.5 and Theorem 8.2. Intuitively, searches in SkipNet require this many hops for the same reason that Skip List searches do: every node's pointers are approximately exponentially distributed, and hence there will most likely be some pointer that halves the remaining distance to the destination. A dense SkipNet maintains roughly a factor of k more pointers and makes roughly a factor of k more progress on every hop.

For the formal analysis, we will consider a sparse R-Table first, and then extend our analysis to the dense R-Table. It will be helpful to have the following definitions: The node from which the search operation begins is called the source node and the node at which the search operation terminates is called the destination node. The search operation visits a sequence of nodes, until the destination node is found; this sequence is called the search path. Each step along the search path from one node to the next is called a hop. Throughout this subsection we will refer to nodes by their name IDs, and we will denote the name ID of the source by s, and the name ID of the destination by d.

The rings to which s belongs induce a Skip List structure on all nodes, with s at the head. To analyze the search path in SkipNet, we consider the path that the Skip List search algorithm would use on the induced Skip List; we then prove that the SkipNet search path is no bigger the Skip List search path. Let P be the SkipNet search path from s to d using a sparse R-Table. Let Q be the path that the Skip List search algorithm would use in the Skip List induced by node s. Note that both search paths begin with s and end with d, and all the nodes in the paths lie between s and d. To see that P and Q need not be identical, note that the levels of the pointers traversed in a Skip List search path are monotonically non-increasing; in a SkipNet search path this is not necessarily true.

To characterize the paths P and Q, it will be helpful to let F(x,y) denote the longest common prefix in x and y's numeric IDs. The following useful identities follow immediately from the definition of F:

$$F(x,y)=F(y,x) \tag{1}$$

$$F(x,y)<F(y,z) \Rightarrow F(x,z)=F(x,y) \tag{2}$$

$$F(x,y) \leq F(y,z) \Rightarrow F(x,z) \geq F(x,y) \tag{3}$$

$$F(x,y)>f, F(x,z)>f \Rightarrow F(y,z)>f \tag{4}$$

The Skip List search path, Q, includes every node x between s and d such that no node closer to d has more digits in common with s. Formally, Q contains x∈[s,d] if and only if ∄y∈[x,d] such that F(s,y)>F(s,x).

The SkipNet search path P contains every node between s and d such that no node closer to d has more digits in common with the previous node on the path. This uniquely defines P by specifying the nodes in order; the node following s is uniquely defined, and this uniquely defines the subsequent node, etc. Formally, x∈[s,d] immediately follows w in P if and only if it is the closest node following w such that ∄y∈[x,d] satisfying F(w,y)>F(w,x).

Lemma 8.1. Let P be the SkipNet search path from s to d using a sparse R-Table and let Q be the path that the Skip List search algorithm would use in the induced Skip List. Then P is a subsequence of Q. That is, every node encountered in the SkipNet search is also encountered in the Skip List search.

Proof: Suppose for the purpose of showing a contradiction that some node x in P does not appear in Q. Let x be the first such node. Clearly x≠s because s must appear in both P and Q. Let w denote x's predecessor in P; since x≠s, x is not the first node in P and so w is indeed well-defined. Node w must belong to Q because x was the first node in P that is not in Q.

We first consider the case that F(s,x)>F(s,w), i.e., x shares more digits with s than w does. We show that this implies that w is not in Q, the Skip List search path (a contradiction). Referring back to the Skip List search path invariant, x∈[w,d] plays the role of y, thereby showing that w is not in Q.

We next consider the case that F(s,x)=F(s,w), i.e., x shares equally many digits with s as w does. We show that this implies that x is in Q, the Skip List search path (a contradiction). Referring back to the Skip List search path invariant, ∄y∈[w,d] such that F(s,y)>F(s,w). Combining the assumption of this case, F(s,w)=F(s,x), with [x,d] ⊂ [w,d], we have that ∄y∈[x,d] such that F(s,y)>F(s,x), and therefore x is in Q.

We consider the last case F(s,x)<F(s,w), i.e., x shares fewer digits with s than w does. We show that this implies that x is not in P, the SkipNet search path (a contradiction). Applying Identity 2 yields that F(s,x)=F(w,x), i.e., x shares the same number of digits with w as it does with s. By the assumption that x is not in Q, the Skip List search path, there exists y∈[x,d] satisfying F(s,y)>F(s,x). Combining F(s,y)>F(s,x) with the case assumption, F(s,w)>F(s,x) and applying Identity 4 yields F(w,y)>F(s,x). Since F(s,x)=F(w,x), this y also satisfies F(w,y)>F(w,x). Combining this with y∈[x,d] implies that y violates the SkipNet search path invariant for x; x is not in P.

A consequence of Lemma 8.1 is that the length of the Skip List search path bounds the length of the SkipNet search path. In the following theorem, we prove a bound on the length of the SkipNet search path as a function of D, the distance between the source s and the destination d, by analyzing the Skip List search path. Note that our high-probability result holds for arbitrary values of D; to the best of our knowledge, analyses of Skip Lists and of other overlay networks [31, 27]

prove bounds that hold with high probability for large N. Because of the SkipNet design, we expect that D<<N will be a common case. There is no reason to expect this in Skip Lists or other overlay networks.

It will be convenient to define some standard probability distribution functions. Let $f_{n,1/k}(g)$ be the distribution function of the binomial distribution: if each experiment succeeds with probability $1/k$, then $f_{n,1/k}(g)$ is the probability that we see exactly g successes after n experiments. Let $F_{n,1/k}(g)$ be the cumulative distribution function of the binomial distribution: $F_{n,1/k}(g)$ is the probability that we see at most g successes after n experiments. Let $G_{g,1/k}(n)$ be the cumulative distribution function of the negative binomial distribution: $G_{g,1/k}(n)$ is the probability that we see g successes after at most n experiments.

We use the following two identities below:

$$G_{g,\frac{1}{k}}(n) = 1 - F_{n,\frac{1}{k}}(g-1) \quad (5)$$

$$F_{n,\frac{1}{k}}(\alpha n - 1) < \frac{1-\alpha}{1-\alpha k} f_{n,\frac{1}{k}}(\alpha n) \text{ for } \alpha < \frac{1}{k} \quad (6)$$

Identity 5 follows immediately from the definitions of our cumulative distribution functions, F and G. Identity 6 follows from [7, Theorem 6.4], where we substitute our $\alpha n$ for their k, our $1/k$ for their p, and our $1-1/k$ for their q.

Theorem 8.2. Using a sparse R-Table, the expected number of search hops in SkipNet is $$O(k \log_k D)$$

to arrive at a node distance D away from the source. More precisely, there exist constants $z_0 = \sqrt{e}$ and $t_0 = 9$, such that for $t \geq t_0$, the search requires no more than $(tk \log_k D + t^2 k)$ hops with probability at least $1 - 3/z_0^t$.

Proof: By Lemma 8.1, it suffices to upper bound the number of hops in the Skip List search path; we focus on the Skip List search path for the remainder of the proof. Define g to be $t + \log_k D$. Let X be the random variable giving the maximum level traversed in the Skip List search path. We now show that $Pr[X \geq g]$ is small. Note that the probability that a given node matches s in g or more digits is $1/k^g$. By a simple union bound, the probability that any node between s and d matches s in g or more digits is at most $D/k^g$. Thus, $$Pr[X \geq g] \leq D/k^g$$

$$= 1/k^{g - \log_k D}$$

$$= 1/k^t$$

Let Y be the random variable giving the number of hops traversed in a Skip List search path, and define m to be $tkg$, i.e., $m = (tk \log_k D + t^2 k)$. We will upper bound the probability that Y takes more than m hops via:

$$Pr[Y > m] = Pr[Y > m \text{ and } X < g]$$

$$+ Pr[Y > m \text{ and } X \geq g]$$

$$\leq Pr[Y > m \text{ and } X < g]$$

$$+ Pr[X \geq g]$$

It remains to show that the probability the search takes more than m hops without traversing a level g pointer is small. The classical Skip List analysis [24] upper bounds this probability using the negative binomial distribution, showing that $Pr[Y > m \text{ and } X < g] \leq 1 - G_{g,1/k}(m)$. Using Identity 5, we have $1 - G_{g,1/k}(m) = F_{m,1/k}(g-1)$. Setting $\alpha = 1/tk$ and applying Identity 6 gives the following upper bound:

$$F_{m,\frac{1}{k}}(g-1) = F_{m,\frac{1}{k}}(\alpha m - 1) < \frac{1-\alpha}{1-\alpha k} f_{m,\frac{1}{k}}(\alpha m)$$

Note that $$\frac{1-\alpha}{1-\alpha k}$$

is at most 2, since t and k are both at least 2. This yields that $F_{m,1/k}(g-1)$ is less than:

$$2 \binom{m}{g} (1/k)^g (1 - 1/k)^{m-g}$$

$$= 2 \binom{tkg}{g} (1/k)^g (1-1/k)^{tkg} (1-1/k)^{-g}$$

$$< 2 \frac{(tkg)^g}{g!} (1/k)^g e^{-tg} (1-1/k)^{-g}$$

$$< 2 e^{g \log tkg} \left( \frac{1}{\sqrt{2\pi g}} \left( \frac{g}{e} \right)^{-g} \right) e^{-g \log k} e^{-tg} e^g$$

$$< 2 e^{g \log tkg} e^{-g \log g} e^g e^{-g \log k} e^{-tg} e^g$$

$$\leq 2 e^{g(\log t + \log k + \log g) - g \log g + g - g \log k + g - tg}$$

$$= 2 e^{g \log t + g + g - tg}$$

$$= 2 e^{(-t + \log t + 2)g}$$

For $t \geq 9$, we have $-t + \log t + 2 < -t/2 < 0$ and so $e^{(-t + \log t + 2)g} < e^{-t/2}$. Thus, $$F_{m,1/k}(g) < 2 e^{-t/2}$$

Combining our results and letting $z_0 = \sqrt{e}$ yields $$Pr[Y > m] \leq Pr[Y > m \text{ and } X < g] + Pr[X \geq g]$$

$$< 2/e^{t/2} + 1/k^t$$

$$< 3/z_0^t$$

Setting $t_0 = 9$, for $t \geq t_0$, we have that $Pr[Y > m] < 3/z_0^t$. That is, $Pr[Y \leq m] \geq 1 - 3/z_0^t$. The expectation bound straightforwardly follows.

We now consider the case of searching by name ID in a SkipNet using a dense R-Table. Recall that a dense R-Table points to the $k-1$ closest neighbours in each direction at each level. Note that it would be possible to use the same approach to create a 'dense Skip List', but such a structure would not be useful because in a Skip List, comparisons are typically more expensive than hops. Whenever we refer to a Skip List, we are always referring to a sparse Skip List. Define P to be the SkipNet search path with a dense R-Table and, as before, let Q be the path that the Skip List search algorithm would use in the induced Skip List.

To characterize the path P, it will be helpful to let G(x,y,h) denote to be the number of hops between nodes x and y in the ring that contains them both at level h. If h>F(x,y) (meaning nodes x and y are not in the same ring at level h), we define $G(x,y,h)=\infty$. Note that node x has a pointer to node y at level h if and only if $G(x,y,h)<k$. At each intermediate node on the SkipNet search path we hop using the pointer that takes us as close to the destination as possible without going beyond it. The formal characterization is: $x \in [s, d]$ immediately follows w in P if and only if $G(w, x, F(w,x))<k$ and $\not\exists y$, h such that $x<y \leq d$ and $G(w,y,h)<k$.

Lemma 8.3. Let P be the SkipNet search path with a dense R-Table and let Q be the path that the Skip List search algorithm would use in the induced Skip List Then P is a Subsequence of Q.

Proof: The proof begins by defining the same quantities as in the proof of Lemma 8.1. Suppose for the purpose of showing a contradiction that some node x in P does not appear in Q. Let x be the first such node; clearly $x \neq s$ because s must appear in both P and Q. Let w denote x's predecessor in P; since $x \neq s$, x is not the first node in P and so w is indeed well-defined. Node w must belong to Q because x was the first node in P that is not in Q.

We consider the three cases that $F(s,x)>F(s,w)$, $F(s,x)=F(s,w)$, $F(s,x)<F(s,w)$ separately. The first two were shown to lead to a contradiction in the proof of Lemma 8.1 without reference to the SkipNet search path; thus it remains to consider only the case $F(s,x)<F(s,w)$.

Let $l=G(w, x, F(w,x))$ be the number of hops between w and x in the highest ring that contains them both. Since $x \in P$, we must have $l<k$ (from the characterization of the dense SkipNet search path). Since $x \notin Q$, there must exist $y \in [x, d]$ such that $F(s,y)>F(s,x)$ (from the characterization of the Skip List search path). Since $w \in Q$ and y e [w, d], it cannot be the case that $F(s,y)>F(s,w)$, otherwise that would contradict the fact that $w \in Q$ (using the Skip List search path characterization again). Therefore $F(s,y) \leq F(s,w)$, and Identity 3 yields that $F(w,y) \geq F(s,y)$. Applying Identity 2 to $F(s,x)<F(s,w)$ (the case assumption) implies $F(w,x)=F(s,x)$. Putting the inequalities together yields $F(w,y) \geq F(s,y)>F(s,x)=F(w,x)$. We apply the conclusion, $F(w,y)>F(w,x)$, in the rest of the proof to derive a contradiction.

Consider the ring containing w at level $F(w,y)$. Node y must be in this ring but node x cannot be because $F(w,y)>F(w,x)$. Starting at w, consider traversing this ring until we encounter z, the first node on this ring with $x<z$ (to the right of x). Such a node z must exist because y is in this ring and $x<y$. Note that $x<z \leq y \leq d$.

Since this ring at level $F(w,y)$ is a strict subset of the ring at level $F(w,x)$ (in particular, x is not in it), it takes at most $l<k$ hops to traverse from w to z. We now have $x<z \leq d$ and $G(w, z, F(w,y))<k$, which contradicts the fact that $x \in Q$.

Lemma 8.4. Let P be the SkipNet search path from s to d using a dense R-Table. Let Q be the search path from s to d in the induced Skip List. Let m be the number of hops along path Q and let g be the maximum level of a pointer traversed on path Q. Then the number of hops taken on path P is at most $$\frac{m}{k-1} + g + 1.$$

Proof: Let $Q=(s, q_1, \ldots, q_m)$ be the sequence of nodes on path Q, where $q_m=d$. By choice of g, $F(s, q_i) \leq 9$ for all $i \geq 1$. Thus, the $q_i$ nodes are partitioned into levels according to the value of $F(s, q_i)$. Recall that $F(s, q_i)$ is monotonically non-increasing with i since Q is a Skip List search path. Thus the nodes in each partition are contiguous on path Q.

Suppose P contains $q_i$. Using the dense R-Table, it is possible to advance in one hop to any node in the Skip List path that is at most k−1 hops away at level $F(s, q_i)$. Thus, if there are $l_i$ nodes at level i in P, then Q contains at most $\lceil l_i/(k-1) \rceil$ of those nodes. Summing over all levels, Q contains at most $$\frac{m}{k-1} + g + 1$$

nodes.

Theorem 8.5. Using a dense R-Table, the expected number of search hops is $$O(\log_k D)$$

to arrive at a node distance D away from the source. More precisely, for constants $z_0=\sqrt{e}$ and $t_0=9$, and for $t \geq t_0$, the search completes in at most $(2t+1)\log_k D+2t^2+t+1$ hops with probability at least $1-3/z_0^t$.

Proof: As in the proof of Theorem 8.2, with probability at least $1-3/z_0^t$ the number of levels in the Skip List search path is at most $g=t+\log_k D$, and the number of hops is at most $m=tkg=(tk \log_k D+t^2k)$. Applying Lemma 8.4, the number of hops in the dense SkipNet search path is $$\begin{aligned}\frac{m}{k-1} + g + 1 &= \frac{tkg}{k-1} + g + 1 \\ &\leq 2tg + g + 1 = (2t+1)g + 1 \\ &= (2t+1)(t + \log_k D) + 1 \\ &= (2t+1)\log_k D + 2t^2 + t + 1\end{aligned}$$

8.2 Correspondence Between SkipNet and Tries

The pointers of a SkipNet effectively make every node the head of a Skip List ordered by the nodes' name IDs. Simultaneously, every node is also the root of a trie [10] on the nodes' numeric IDs. Thus the SkipNet simultaneously implements two distinct data structures in a single structure. One implication is that we can reuse the trie analysis to determine the expected number of non-null pointers in the sparse R-Table of a SkipNet node. This extends previous work relating Skip Lists and tries by Papadakis in [22, pp. 38]: The expected height of a Skip List with N nodes and parameter p corresponds exactly to the expected height of a $$\frac{1}{p}\text{-ary}$$

trie with N+1 keys drawn from the uniform [0, 1] distribution.

Recall that ring membership in a SkipNet is determined as follows: For $i \geq 0$, two nodes belong to the same ring at level i if the first i digits of their numeric ID match exactly. All nodes belong to the one ring at level 0, which is called the root ring. Note that if two nodes belong to ring R at level $i>0$ then they must also belong to the same ring at level i−1, which we refer to as the parent ring of ring R. Moreover, every ring R at level $i \geq 0$ is partitioned into at most k disjoint rings at level i+1, which we refer to as the child rings of ring R. Thus, the rings naturally form a Ring Tree which is rooted at the root ring.

Given a Ring Tree, one can construct a trie as follows. First, remove all rings whose parent ring contains a single node— this will collapse any subtree of the trie that contains only a single node. Every remaining ring that contains a single node is called a leaf ring; label the leaf ring with the numeric ID of its single node. The resulting structure on the rings is a trie containing all the numeric IDs of the nodes in the SkipNet.

Let $Y_N$ be the random variable denoting the number of non-null right (equivalently, left) pointers at a particular node in a SkipNet containing N nodes. Papadakis defines $D_N$ to be the random variable giving the depth of a node in a k-ary trie with keys drawn from the uniform [0,1] distribution. Note that $Y_N$ is identical to the random variable giving the depth of a node's numeric ID in the trie constructed above, and thus we have $Y_N = D_N$.

We may use this correspondence and Papadakis' analysis to show that $$E[Y_N] = 1 + V_{\frac{1}{k}}(N),$$

where $$V_{\frac{1}{k}}(N)$$

is (as defined in [17]):

$$V_{\frac{1}{k}}(N) = \frac{1}{N} \sum_{g=2}^{N} \binom{n}{g} (-1)^g \frac{g \cdot (1/k)^{g-1}}{1 - (1/k)^{g-1}}$$

Knuth proves in [17, Ex. 6.3.19] that $$V_{\frac{1}{k}}(N) = \log_k N + O(1),$$

and thus the expected number of right (equivalently, left) non-null pointers is given by $E[Y_N] = \log_k N + O(1)$.

8.3 Searching by Numeric ID

SkipNet supports searches by numeric ID as well as searches by name ID. Searches by numeric ID in a dense SkipNet take $O(\log_k N)$ hops in expectation, and $O(k \log_k N)$ in a sparse SkipNet. We formally prove these results in Theorem 8.6. Intuitively, search by numeric ID corrects digits one at a time and needs to correct at most $O(\log_k N)$ digits. In the sparse SkipNet correcting a single digit requires about $O(k)$ hops, while in the dense case only $O(1)$ hops are required.

Theorem 8.6. The expected number of hops in a search by numeric ID using a sparse R-Table is $O(k \log_k N)$. In a dense R-Table, the expected number of hops is $O(\log_k N)$. Additionally, these bounds hold with high probability (i.e., the number of hops is close to the expectation).

Proof: We use the same upper bound as in the proof of Theorem 8.2,

Pr[search takes more than m hops]

≦Pr[more than m hops and at most g levels]

+Pr[more than g levels]

and bound the two terms separately. In Theorem 8.2 we showed that the maximum number of digits needed to uniquely identify a node is $g = O(\log_k N)$ with high probability, and thus no search by numeric ID will need to climb more than this many levels. This upper bounds the right-hand term. The number of hops necessary on any given level in the sparse R-Table before the next matching digit is found is upper bounded by a geometric random variable with parameter 1/k. The sum of g of these random variables has expectation gk, and this random variable is close to its expectation with high probability (by standard arguments). Thus the expected number of hops in a search by numeric ID using a sparse R-Table is $O(k \log_k N)$, and additionally the bound holds with high probability.

For a search by numeric ID using a dense R-Table, we upper bound the number of hops necessary on any given level differently. Informally, instead of performing one experiment that succeeds with probability 1/k repeatedly, we perform k−1 such experiments simultaneously. Formally, the probability of finding a matching digit in one hop is now $1-(1-1/k)^{k-1} \geq \frac{1}{2}$. Therefore the analysis in the case of a sparse R-Table need only be modified by replacing the parameter 1/k with ½. Thus the expected number of hops in a search by numeric ID using a dense R-Table is $O(\log_k N)$, and additionally the bound holds with high probability.

8.4 Node Joins and Departure

We now analyze node join and departure operations using the analysis of both search by name ID and by numeric ID from the previous sections. As described in Section 3.5, a node join can be implemented using a search by numeric ID followed by a search by name ID, and will require $O(k \log_k N)$ hops in either a sparse or a dense SkipNet. Implementing node departure is even easier: As described in Section 3.5, a departing node need only notify its left and right neighbors at every level that it is leaving, and that the left and right neighbors of the departing node should point to each other. This yields a bound of $O(\log_k N)$ hops for the sparse SkipNet and $O(k \log_k N)$ for the dense SkipNet, where hops measure the total number of hops traversed by messages since these messages may be sent in parallel.

Theorem 8.7. The number of hops required by a node join operation is $O(k \log_k N)$ in expectation and with high probability in either a sparse or a dense SkipNet.

Proof: The join operation can be decomposed into a search by numeric ID, followed by a Skip List search by name ID. Because of this, the bound on the number of hops follows immediately from Theorem 8.2 and Theorem 8.6. It only remains to establish that the join operation finds all required neighbors of the joining node.

For a sparse SkipNet, the joining node needs a pointer at each level h to the node whose numeric ID matches in h digits that is closest to the right or closest to the left in the order on the name IDs. For a dense SkipNet, the joining node must find the same nodes as in the sparse SkipNet case, and then notify k−2 additional neighbors at each level.

The join operation begins with a search for a node with the most numeric ID digits in common with the joining node. The search by name ID operation for the joining node starts at this node, and it is implemented as a Skip List search by name ID; the pointers traversed are monotonically decreasing in height, in contrast to the normal SkipNet search by name ID. Whenever the Skip List search path drops a level, it is because the current node at level h points to a node beyond the joining node. Therefore this last node at level h on the Skip List search path is the closest node that matches the joining node in h digits. This gives the level h neighbor on one side, and the joining node's level h neighbor on the other side is that node's former neighbor. The message traversing the Skip List search path accumulates this information about all the required neighbors on its way to the joining node. This establishes the correctness of the join operation.

8.5 Node Stress

We now analyze the distribution of load when performing searches by name ID using R-Tables. To analyze the routing load, we must assume some distribution of routing traffic. We assume a uniform distribution on both the source and the destination of all routing traffic. Under some routing algorithms (which happen not to preserve path locality), the distribution of routing load is obviously uniform. For example, if routing traffic were always routed to the right, the load would be uniform. If the source and destination name ID do not share a common prefix, then path locality is not an issue and the SkipNet routing algorithm may randomly choose a direction in which to route—such traffic is uniformly distributed.

If the SkipNet routing algorithm can preserve path locality, it does so by always routing in the direction of the destination (i.e., if the destination is to the right of the source, routing proceeds to the right). We show that in this case load is approximately balanced: very few nodes' loads are much smaller than the average load. We also shows that no node's load exceeds the average load by more than a constant factor with high probability; this result is relevant whether the routing algorithm preserves path locality or not. In the interest of simplicity, our proof assumes that k=2; a similar result holds for arbitrary k. Also, we have previously given an upper bound of O(log d) on the number of hops between two nodes at distance d. In order to estimate the average load, we assume a tight bound of $\Theta(\log d)$ without proof.

Theorem 8.8. Consider an interval on which we preserve path locality containing N nodes. Then the $u^{th}$ node of the interval bears $$\Theta\left(\frac{\log \min\{u, N-u\}}{\log N}\right)$$

fraction of the average load in expectation.

Proof: We first establish the expected load on node u due to routing traffic between a particular source l and destination r. The search path can only encounter u if, for some h, the numeric IDs of l and u have a common prefix of length h but no node between u and r has a longer common prefix with l. We observe that every node's random choice of numeric ID digits is independent, and apply a union bound over h to obtain the following upper bound on the probability that the search encounters u. Denote the distance from u to r by d.

$Pr[\text{search encounters } u]$ $\leq \sum_{h \geq 0} Pr[u \text{ and } l \text{ share } h \text{ digits}] \cdot$ $Pr[\text{no node between } u \text{ and } r \text{ shares more}]$ $= \sum_{h \geq 0} \frac{1}{2^h} \cdot \left(1 - \frac{1}{2^{h+1}}\right)^d$ Denote the term in the above summation by H(h). Because H(h) falls by at most a factor of 2 when h increases by 1, we can upper bound the summation using:

$$\sum_{h \geq 0} H(h) \leq 2 \cdot \int_{h \geq 0} H(h) dh$$

Making the change of variables $$\alpha = 1 - \frac{1}{2^{h+1}},$$

and hence $$d\alpha = \frac{\ln 2}{2^{h+1}}.$$

dh, we obtain.

$$\int_{h \geq 0} H(h) dh = \int_{\alpha=1/2}^{1} \frac{2}{\ln 2} \cdot \alpha^d \cdot d\alpha$$

$$= \frac{2}{\ln 2} \cdot \frac{1^{d+1} - \left(\frac{1}{2}\right)^{d+1}}{d+1} = O(1/d)$$

This completes the analysis of a single source/destination pair. A similar single pair analysis was also noted in [1]. We complete our theorem by considering all source/destination pairs.

Our bound on the average load of a node is given by the total number of source/destination pairs multiplied by the bound on search hops divided by the total number of nodes. Summing over all the routing traffic that passes through u and dividing by the average load yields the proportion of the average load that u carries. To within a constant factor, this is:

$$\frac{\sum_{l \in [1, u-1]} \sum_{r \in [u+1, r]} \left(\frac{1}{|u-l|} + \frac{1}{|u-r|}\right)}{\left(\binom{N}{2} \log N\right)/(N)} = \frac{u \log(N-u) + (N-u) \log u}{((N-1) \log N)/2}$$

$$= \Theta\left(\frac{\log \min\{u, N-u\}}{\log N}\right)$$

Corollary 8.9. The number of nodes with expected load less than $\Theta(\alpha \cdot \text{average load})$ is $N^\alpha$.

Proof: Apply Theorem 8.8 and note that $$\frac{\log u}{\log N} < \alpha$$

implies that $u < N^\alpha$.

This completes the analysis showing that few nodes expect to do much less work than the average node in the presence of path locality. Our next theorem shows that it is very unlikely any node will carry more than a constant factor times the average load; this analysis is relevant whether the routing policy maintains path locality or not.

Theorem 8.10. With high probability, no node bears more than a constant factor times the average load.

Proof: Consider any node u. There are at most N nodes to the left of u and at most N nodes to the right. As in the previous theorem, let l and r denote nodes to the left and right of u respectively. Then the Skip List path from l to r (of which the SkipNet path is a subsequence) encounters u only if there is some number h such that l and u share exactly h bits, but no node between u and r shares exactly h bits with u. Considering only routing traffic passing from left to right affects our bound by at most a factor of two.

Let $L_h$ be a random variable denoting the number of l that share exactly h bits with u. Let $R_h$ denote the number of r such that no node between u and r shares exactly h bits with u. (Note that if r shares exactly h bits with u, it must share more than h bits with l, and thus routing traffic from l to r does not pass through u.) The analysis in the previous paragraph implies that the load on u is exactly $\Sigma_h L_h R_h$. We desire to show that this quantity is O(N log N) with high probability.

The random variable $L_h$ has the binomial distribution with parameter $\frac{1}{2}^{h+1}$. From this observation, standard arguments (that we have made explicit in earlier proofs in this section) show that $L_h$ has expectation $N/2^{h+1}$, and for $h \in [0, \log N - \log \log N]$, $L_h = O(N/2^{h+1})$ with high probability. The number of l that share more than log N−log log N bits with u is log N in expectation, and is O(log N) with high probability; these l (whose number of common bits with u we do not bound) can contribute at most O(N log N) to the final total.

To analyze the random variables $R_h$, we introduce new random variables $R'_h$ that stochastically dominate $R_h$. In particular, let $R'_h$ be the distance from u to the first node after node $R'_{h-1}$ that matches u in exactly h bits. Also, let $R'_0 = R_0$. We define additional random variables $Y_h$ using the recurrence $R'_h = \Sigma_{i=0}^{h} Y_i$. The $Y_h$ are completely independent of each other; $Y_h$ only depends on the random bit choices of nodes after the nodes that determine $Y_{h-1}$.

The random variable $Y_h$ is distributed as a geometric random variable with parameter $\frac{1}{2}^{h+1}$ (and upper bounded by N). We rewrite the quantity we desire to bound as $$\sum_h L_h R_h = O(N \log N) + \sum_{h=0}^{\log N - \log \log N} O\left(\frac{N}{2^{h+1}}\right) \cdot \sum_{i=0}^{h} Y_i$$

Using that the $N/2^{h+1}$ form a geometric series, we apply the upper bound $$\sum_{h=0}^{\log N - \log \log N} \frac{N}{2^{h+1}} \cdot \sum_{i=0}^{h} Y_i \leq \sum_{h=0}^{\log N - \log \log N} \frac{2N}{2^{h+1}} \cdot Y_h$$

We have that $\Sigma_h L_h R_h$ equals O(N log N) plus the sum of (slightly fewer than) log N independent random variables, where the $h^{th}$ random variable is distributed like a geometric random variable with parameter $\frac{1}{2}^h$ multiplied by $O(N/2^h)$, and thus has expectation O(N). This yields the O(N log N) bound with high probability.

8.6 Virtual Node Analysis

We outlined in Section 5.5 a scheme by which a single physical node could host multiple virtual nodes. Using this scheme, the bounds on search hops are unaffected, and the number of pointers per physical node is only $O(k \log_k N + kv)$ in the dense case, where v is the number of virtual nodes. In the sparse case, the number of pointers is just $O(\log_k N + v)$.

Intuitively, we obtain this by relaxing the requirement that nodes after the first have height $O(\log_k N)$. We instead allow node heights to be randomly distributed as they are in a Skip List. Because Skip List nodes maintain a constant number of pointers in expectation, we add only O(k) pointers per virtual node in the dense case, and O(1) in the sparse case. Search are still efficient, just as they are in a Skip List.

Theorem 8.11. Consider a single physical node supporting v virtual nodes using the scheme of Section 5.5. In the dense case, searches require $O(\log_k D)$ hops, and the number of pointers is $O(k \log_k N + kv)$. In the sparse case, searches require $O(k \log_k D)$ hops, and the number of pointers is $O(\log_k N + v)$. All these bounds hold in expectation and with high probability.

Proof: The bound on the number of pointers is by construction. Consider the sparse case. The leading term in the bound, $O(\log_k N)$, is due to the one virtual node that is given all of its SkipNet pointers. The additional virtual nodes have heights given by geometric random variables with parameter ½, which is O(1) in expectation. The claimed bound on the number of pointers immediately follows, and the dense case follows by an identical argument with an additional factor of k.

We now analyze the number of search hops, focusing first on the sparse case. Because we might begin the search at a virtual node that does not have full height, we will break the analysis into two phases. During the first phase, the search path uses pointers of increasing level. At some point, we encounter a node whose highest pointer goes beyond the destination. From this point on (the second phase), we consider the Skip List search path to the destination that begins at this node. As in Theorem 8.2, the rest of the actual search path will be a subsequence of this Skip List path.

As in Theorem 8.2, the maximum level of any pointer in this interval of D nodes is $O(\log_k D)$ with high probability. Suppose that some particular node t is the first node encountered whose highest pointer points beyond the destination. In this case, the first phase is exactly a search by numeric ID for t's numeric ID, and therefore the high probability bound of Theorem 8.6 on the number of hops applies. The second phase is a search from t for d, and the high probability bound of Theorem 8.2 on the number of hops applies. There is a subtlety to this second argument—although some or all of the intermediate nodes may be virtual, the actual search path is necessarily a subset of the search path in the Skip List induced by t (by the arguments of Lemma 8.1 and Lemma 8.3). We previously supposed that t was fixed; because there are at most D possibilities for t, considering all such possibilities increases the probability of requiring more than $O(k \log_k D)$ hops by at most a factor of D. Because the bound held with high probability initially, the probability of exceeding this bound remains negligible.

This yields the result in the sparse case. An identical argument holds in the dense case.

8.7 Ring Merge

We now analyze the performance of the proactive algorithm for merging disjoint SkipNet segments, as described in Section 6. Consider the merge of a single SkipNet segment containing M nodes with a larger SkipNet segment containing N nodes. In the interest of simplicity, our discussion assumes that k=2; a similar analysis applies for arbitrary k. Recall that the expected maximum level of a ring in the merged SkipNet is O(log N) with high probability (Section 8.2). Intuitively, the expected time to repair a ring at a given level after having reached that level is O(1) and ring repair occurs in parallel across all rings at a given level. This suggests that the expected time required to perform the merge operation is O(log N), and we will show this formally in Theorem 8.12 under the assumption that the underlying network accommodates unbounded parallelization of the repair traffic. In practice, the bandwidth of the network may impose a limit: doing many repairs in parallel may saturate the network and hence take more time.

The expected amount of work required by the merge is O(M log(N/M))=O(N). We first give an intuitive justification for this. The merge operation repairs at most four pointers per SkipNet ring. Since the total number of rings in the merged SkipNet is O(N) and the expected work required to repair a ring is O(1), the expected total work performed by the merge operation is O(N). Additionally, if M is much less than N, the bound O(M log(N/M)) proved in Theorem 8.13 is much less than O(N).

Now consider an organization consisting of S disjoint SkipNet segments, each of size at most M, merging into a global SkipNet of size N. In this case, the merge algorithm sequentially merges each segment of the organization one at a time into the global SkipNet. The total time required in this case is O(S log N) and the total work performed is O(SM log(N/M)); these are straightforward corollaries of Theorem 8.12 and Theorem 8.13.

Theorem 8.12. The time to merge a SkipNet segment of size M with a larger SkipNet segment of size N is O(log N) with high probability, assuming sufficient bandwidth in the underlying network.

Proof: After repairing a ring, the merge operation branches to repair both child rings in parallel, until there are no more child rings. Using the analogy with tries from Section 8.2, consider any path along the branches from the root ring to a ring with no children. We show that this path uses O(log N) hops with high probability. Union bounding over all such paths will complete the theorem.

We can assume that the height of any pointer is at most $c_1$ log N. The number of hops to traverse this path is then upper bounded by a sum of $c_1$ log N geometric random variables with parameter ½. We now show that this sum is at most $c_2$ log N=O(log N) with high probability. Applying the same reduction as in Section 8.1, using Identity 5 and Identity 6, we obtain the following upper bound on the probability of taking more than $c_2$ log N hops:

$$F_{c_2 \log N, 1/2}(c_1 \log N) \le \frac{1 - c_1/c_2}{1 - 2c_1/c_2} f_{c_2 \log N, 1/2}(c_1 \log N)$$

$$= \left(\frac{1 - c_1/c_2}{1 - 2c_1/c_2}\right)\left(\frac{c_2 \log N}{c_1 \log N}\right)(1/2)^{c_2 \log N}$$

$$\le \left(\frac{1 - c_1/c_2}{1 - 2c_1/c_2}\right)\frac{(c_2 \log N)^{c_1 \log N}}{(c_1 \log N)!}(1/2)^{c_2 \log N}$$

$$\le \left(\frac{1 - c_1/c_2}{1 - 2c_1/c_2}\right)\frac{(c_2 \log N)^{c_1 \log N}}{\left(\frac{c_1 \log N}{e}\right)^{c_1 \log N}}2^{-c_2 \log N}$$

-continued
$$< \left(\frac{1 - c_1/c_2}{1 - 2c_1/c_2}\right)\left(\frac{c_2 \cdot e}{c_1}\right)^{c_1 \log N} 2^{-c_2 \log N}$$

Choosing $c_2$=max$\{7c_1, 7\}$, this is at most $2N^{-2}$. Applying a union bound over the N possible paths completes the proof.

Theorem 8.13. The expected total work to merge a SkipNet segment of size M with a larger SkipNet segment of size N is O(M log(N/M)).

Proof: Suppose all the pointers at level i have been repaired and consider any two level i+1 rings that are children of a single level i ring. To repair the pointers in these two child rings, the nodes adjacent to the segment boundary at level i must each find the first node in the direction away from the segment boundary who differs in the $i^{th}$ bit. The number of hops necessary to find either node is upper bounded by a geometric random variable with parameter ½. Only O(1) additional hops are necessary to finish the repair operation.

By considering a particular order on the random bit choices, we show that the number of additional hops incurred in every ring repair operation are independent random variables. Let all the level i bits be chosen before the level i+1 bits. Then the number of hops incurred in fixing any two level i+1 rings that are children of the same level i ring depends only on the level i+1 random bits of those two rings. Also, only rings that require repair initiate a repair operation on their children. Therefore we can assume that the level i rings from which we will continue the merge operation are fixed before we choose the level i+1 bits. Hence the number of hops incurred in repairing these two child rings is independent of the number of hops incurred in the repair of any other ring.

We now consider the levels of the pointers that require repair. For low levels, we use the bound that the number of pointers needing repair at level i is at most $2^i$ because there are at most $2^i$ rings at this level. For higher levels, we prove a high probability bound on the total number of pointers that need to be repaired, showing that the total number is M(log N+O(l)) with high probability in M.

A node of height i cannot contribute more than i pointers to the total number needing repair. We upper bound the probability that a particular node's height exceeds h by:

$$Pr[\text{height} > h] \le \frac{N + M}{2^h} \le \frac{2N}{2^h} = \frac{1}{2^{h - \log N - 1}}$$

Thus each node's height is upper bounded by a geometric random variable starting at (log N+1) with parameter ½, and these random variables are independent. By standard arguments, their sum is at most M(log N+3) with high probability in M.

The contribution of the first log M levels is at most 2M pointers, while the remaining levels contribute at most M(log N+3−log M) with high probability. In total, the number of pointers is O(M log(N/M)). The total number of hops is bounded by the sum of this many geometric random variables. This sum has expectation O(M log(N/M)) and is close to this expectation with high probability, again by standard arguments.

8.8 Incorporating the P-Table and the C-Table

We first argue that our bounds on search by numeric ID, node join, and node departure continue to hold with the addition of C-Tables to SkipNet. Search by numeric ID corrects at least one digit on each hop, and there are never more than $O(\log_k N)$ digits to correct (Section 8.2). Construction of a C-Table during node join amounts to a search by numeric ID, using C-Tables, from an arbitrary SkipNet node to the joining node. This yields the same bound on node join as on search by numeric ID. During node departure, no work is performed to maintain the C-Table.

We only give an informal argument that search by name ID, node join, and departure continue to be efficient with the addition of P-Tables. Intuitively, search by name ID using P-Tables encounters nodes that interleave the R-Table nodes and since the R-Table nodes are exponentially distributed in expectation, we expect the P-Table nodes to be approximately exponentially distributed as well. Thus search should still approximately divide the distance to the destination by k on each hop.

P-Table construction during node join is more involved. Suppose that the intervals defined by the R-Table are perfectly exponentially distributed. Finding a node in the furthest interval is essentially a single search by name ID, and thus takes $O(\log_k N)$ time. Suppose the interval we are currently in contains g nodes. Finding a node in the next closest interval (containing at least g/k nodes) has at least constant probability of requiring only one hop. If we don't arrive in the next closest interval after the first hop, we expect to be much closer, and we expect the second hop to succeed in arriving in the next closest interval with good probability. Iterating over all intervals, the total number of hops is $O(k \log_k N)$ to fill in every P-Table entry.

This completes the informal argument for construction of P-Tables during node join. As with C-Tables, no work is performed to maintain the P-Table during node departure.

9 Experimental Evaluation

To understand and evaluate SkipNet's design and performance, we used a simple packet-level, discrete event simulator that counts the number of packets sent over a physical link and assigns either a unit hop count or specified delay for each link, depending upon the topology used. It does not model either queuing delay or packet losses because modeling these would prevent simulation of large networks.

We implemented three overlay network designs: Pastry, Chord, and SkipNet. The Pastry implementation is described in Rowstron and Druschel [27]. Our Chord implementation is the one available on the MIT Chord web site [14], adapted to operate within our simulator. For our simulations, we run the Chord stabilization algorithm until no finger pointers need updating after all nodes have joined. We use two different implementations of SkipNet: a "basic" implementation based on the design in Section 3, and a "full" implementation that uses the enhancements described in Section 5. For "full" SkipNet, we run two rounds of stabilization for P-Table entries before each experiment.

All our experiments were run both on a Mercator topology [32] and a GT-ITM topology [35]. The Mercator topology has 102,639 nodes and 142,303 links. Each node is assigned to one of 2,662 Autonomous Systems (ASs). There are 4,851 links between ASs in the topology. The Mercator topology assigns a unit hop count to each link. All figures shown in this section are for the Mercator topology. The experiments based on the GT-ITM topology produced similar results.

Our GT-ITM topology has 5050 core routers generated using the Georgia Tech random graph generator according to a transit-stub model. Application nodes were assigned to core routers with uniform probability. Each end system was directly attached by a LAN link to its assigned router (as was done in [5]). We used the routing policy weights generated by the Georgia Tech random graph generator [35] to perform IP unicast routing. The delay of each LAN link was set to 1 ms and the average delay of core links was 40.5 ms.

9.1 Methodology

We measured the performance characteristics of lookups using the following evaluation criteria:

Relative Delay Penalty (RDP): The ratio of the length of the overlay network path between two nodes to the length of the IP-level path between them.

Physical network distance: The absolute length of the overlay path between two nodes, in terms of the underlying network distance. In contrast, RDP measures the penalty of using an overlay network relative to IP. However, since part of SkipNet's goal is to enable the placement of data near its clients, we also care about the absolute length in network distance of the path traversed by a DHT lookup. For the Mercator topology the length of the path is given in terms of physical network hops since the Mercator topology does not provide link latencies. For the GT-ITM topology we use latency, measured in terms of milliseconds.

Number of failed lookups: The number of unsuccessful lookup requests in the presence of failures.

We also model the presence of organizations within the overlay network; each participating node belongs to a single organization. The number of organizations is a parameter to the experiment, as is the total number of nodes in the overlay. For each experiment, the total number of client lookups is twice the number of nodes in the overlay.

The format of the names of participating nodes is org-name/node-name. The format of data object names is org-name/node-name/random-obj-name. Therefore we assume that the "owner" of a particular data object will name it with the owner node's name followed by a node-local object name. In SkipNet, this results in a data object being placed on the owner's node; in Chord and Pastry, the object is placed on a node corresponding to the MD-5 hash of the object's name. For constrained load balancing experiments we use data object names that include the '!' delimiter following the name of the organization.

We model organization sizes two ways: a uniform model and a Zipf-like model.

In the uniform model the size of each organization is uniformly distributed between 1 and N—the total number of application nodes in the overlay network.

In the Zipf-like model the size of an organization is determined according to a distribution governed by $x^{-1.25}+0.5$ and normalized to the total number of overlay nodes in the system. All other Zipf-like distributions mentioned in this section are defined in a similar manner.

We model three kinds of node locality: uniform, clustered, and Zipf-clustered.

In the uniform model, nodes are uniformly spread throughout the overlay.

In the clustered model, the nodes of an organization are uniformly spread throughout a single randomly chosen autonomous system in the Mercator topology and throughout a randomly chosen stub network in GT-ITM. In Mercator we ensure that the selected AS has at least $\frac{1}{10}$-th as many core router nodes as overlay nodes. In GT-ITM we place organizations above a certain size on "stub clusters". These are stub networks that all connect to the same transit link.

For Zipf-clustered, we place organizations within ASes or stub networks, as before. However, the nodes of an organization are spread throughout its AS or stub network as follows: A "root" physical node is randomly placed within the AS or stub network and all overlay nodes are placed relative to this root, at distances modeled by a Zipf-like distribution. In this configuration most of the overlay nodes of an organization will be closely clustered together within their AS or stub network. This configuration is especially relevant to the Mercator topology, in which some ASes span large portions of the entire topology.

Data object names, and therefore data placement, is modelled similarly. In a uniform model, data names are generated by randomly selecting an organization and then a random node within that organization. In a clustered model, data names are generated by selecting an organization according to a Zipf-like distribution and then a random member node within that organization. For Zipf-clustered, data names are generated by randomly selecting an organization according to a Zipf-like distribution and then selecting a member node according to a Zipf-like distribution of its distance from the "root" node of the organization. Note that for Chord and Pastry, but not SkipNet, hashing spreads data objects uniformly among all overlay nodes in all these three models.

We model locality of data access by specifying what fraction of all data lookups will be forced to request data local to the requestor's organization. Finally, we model system behavior under Internet-like failures and study document availability within a disconnected organization. We simulate domain isolation by failing the links connecting the organization's AS to the rest of the network in Mercator and by failing the relevant transit links in GT-IM.

Each experiment is run ten different times, with different random seeds, and the average values are presented. For SkipNet, we used 128-bit random identifiers and a leaf set size of 16 nodes. For Pastry and Chord, we used their default configurations [14, 27].

Our experiments measured the costs of sending overlay messages to overlay nodes using the different overlays under various distributions of nodes and content. Data gathered included:

Application Hops: The number of application-level hops required to route a message via the overlay to the destination Relative Delay Penalty (RDP): The ratio between the average delay using overlay routing and the average delay using IP routing.

Experimental Parameters Varied Included:

Overlay Type: Chord, Pastry, Basic SkipNet, or Full SkipNet.

Topology: Mercator (the default) or GT-ITM.

Message Type: Either DHT Lookup (the default), indicating that messages are DHT lookups, or Send, indicating that messages are being sent to randomly chosen overlay nodes.

Nodes (N): Number of overlay nodes. Most experiments vary N from $2^8$ through $2^{16}$ increasing by powers of two. Some fix N at $2^{16}$.

Lookups: Number of lookup requests routed per experiment. Usually 2×N.

Trials: The number of times each experiment is run, each with different random seed values. Usually 10. Results reported are the average of all runs.

Organizations: Number of distinct organization names content is located within. Typical values include 1, 10, 100, and 1000 organizations. Nodes within an organization are located within the same region of the simulated network topology. For Mercator topologies they are located within the same Autonomous System (AS). In a GT-ITM topology for small organizations they are all nodes attached to the same stub network and for large organizations they are all nodes connected to a chosen core node.

Organization Sizes: One of Uniform—indicating randomly chosen organization sizes between 1 and N in size or Zipf—indicating organization sizes chosen using a $$\frac{1}{x^{1.25}}$$

Zipf distribution with the largest organization size being $$\frac{1}{2}N.$$

Node Locality: One of Uniform or Zipf. Controls how node locations cluster within each organization. Uniform spreads nodes randomly among the nodes within an organization's topology. Zipf sorts candidate nodes by distance from a chosen root node within an organization's topology and clusters nodes using a Zipf distribution near that node.

Document Locality: One of Uniform, By Org, or By Node. Uniform spreads document names uniformly across all nodes. By Org applies a Zipf distribution causing larger organizations to have a larger share of documents, with documents uniformly distributed across nodes within each organization.

% Local: Fraction of lookups that are constrained to be local to documents within the client's organization. Non-local lookups are distributed among all documents in the experiment.

Overlay-specific parameter defaults were:

Chord: NodeID Bits=40.

Pastry: NodeID Bits=128, Bits per Digit (b)=4, Leaf Set size=16.

SkipNet: Basic configuration: Random ID Bits=128, Leaf Set size=16, ring branching factor (k)=2. Full configuration: Same as basic, except k=8 and adds use of P-Table for proximity awareness and C-Table for efficient numeric routing.

9.2 Basic Routing Costs

To understand SkipNet's routing performance we simulated overlay networks with $N=2^i$ nodes, where i ranges from 10 to 16. We ran experiments with 10, 100, and 1000 organizations and with all the permutations obtainable for organization size distribution, node placement, and data placement. The intent was to see how RDP behaves under various configurations. We were especially curious to see whether the non-uniform distribution of data object names would adversely affect the performance of SkipNet lookups, as compared to Chord and Pastry.

FIG. 18 presents the RDPs measured for both implementations of SkipNet, as well as Chord and Pastry, for a configuration in which organization sizes, node placement, and data placement are all governed by Zipf-like distributions. Table 1 shows the average number of unique routing table entries per node in an overlay with $2^{16}$ nodes. All other configurations, including the completely uniform ones, exhibited similar results to those shown here.

Our conclusion is that basic SkipNet performs similarly to Chord and full SkipNet performs similarly to Pastry. This is not surprising since both basic SkipNet and Chord do not support network proximity-aware routing whereas full SkipNet and Pastry do. Since all our other configurations produced similar results, we conclude that SkipNet's performance is not adversely affected by non-uniform distributions of names.

9.3 Exploiting Locality of Placement

RDP only measures performance relative to IP-based routing. However, one of SkipNet's key benefits is that it enables localized placement of data. FIG. 19 shows the average number of physical network hops

TABLE 1

Average number of unique routing entries per node in an overlay with $2^{16}$ nodes.

| Chord | Basic SkipNet | Full SkipNet | Pastry |
|---|---|---|---|
| 16.3 | 41.7 | 73.5 | 63.2 | for lookup requests for an experiment configuration containing $2^{16}$ overlay nodes and 100 organizations, with organization size, node placement, and data placement all governed by Zipf-like distributions. The x axis indicates what fraction of lookups were forced to be to local data (i.e. the data object names that were looked up were from the same organization as the requesting client). The y axis shows the number of physical network hops for lookup requests.

As expected, both Chord and Pastry are oblivious to the locality of data references since they diffuse data throughout their overlay network. On the other hand, both versions of SkipNet show significant performance improvements as the locality of data references increases. It should be noted that FIG. 19 actually under-states the benefits gained by SkipNet because, in our Mercator topology, inter-domain links have the same cost as intra-domain links. In an equivalent experiment run on the GT-ITM topology, SkipNet end-to-end lookup latencies were over a factor of seven less than Pastry's for 100% local lookups.

9.4 Fault Tolerance to Organizational Disconnect

Locality of placement also improves fault tolerance. FIG. 20 shows the number of lookup requests that failed when an organization was disconnected from the rest of the network.

This (common) Internet-like failure had catastrophic consequences for Chord and Pastry. The size of the isolated organization in this experiment was roughly 15% of the total nodes in the system. Consequently, Chord and Pastry will both place roughly 85% of the organization's data on nodes outside the organization. Furthermore, they must also attempt to route lookup requests with 85% of the overlay network's nodes effectively failed (from the disconnected organization's point-of-view). At this level of failures, routing is effectively impossible. The net result is a failed lookups ratio of very close to 100%.

In contrast, both versions of SkipNet do better the more locality of reference there is. When no lookups are forced to be local, SkipNet fails to access the 85% of data that is non-local to the organization. As the percentage of local lookups is increased to 100%, the percentage of failed lookups goes to 0.

To experimentally confirm the behavior of SkipNet's disconnection and merge algorithms described in Section 6, we extended the simulator was to support disconnection of AS subnetworks. FIG. 21 shows the routing performance we observed between a previously disconnected organization and the rest of the system once the organization's SkipNet had been connected to the global SkipNet at level 0. We also show the routing performance observed when all higher level pointers have been repaired.

9.5 Constrained Load Balancing

FIG. 22 explores the routing performance of two different CLB configurations, and compares their performance with Pastry. For each system, all lookup traffic is organization-local data. The organization sizes as well as node and data placement are clustered with a Zipf-like distribution. The Basic CLB configuration uses only the R-Table described in Section 3, whereas Full CLB makes use of the C-Table described in Section 5.4.

The Full CLB curve shows a significant performance improvement over Basic CLB, justifying the cost of maintaining extra routing state. However, even with the additional routing table, the Full CLB performance trails Pastry's performance. The key observation, however, is that in order to mimic the CLB functionality with a traditional peer-to-peer overlay network, multiple routing tables are required, one for each domain that you want to load-balance across.

10 Conclusion

Other peer-to-peer systems assume that all peers are equal. We elaborate on this by assuming that to any particular peer, peers within the same organization are more important than most peers in the system. In particular, they are less likely to fail, more likely to be near in network distance, and less likely to be the source of an attack.

SkipNet realizes this philosophical assumption at a functional level by providing content and path locality: the ability to control data placement, and the guarantee that routing remains within an administrative domain whenever possible. We believe this functionality is critical if peer-to-peer systems are to succeed broadly as infrastructure for distributed applications. To our knowledge, SkipNet is the first peer-to-peer system design that achieves both content and routing path locality. SkipNet achieves this without sacrificing performance goals of previous peer-to-peer systems: SkipNet nodes maintain a logarithmic amount of state and SkipNet operations require a logarithmic number of messages.

SkipNet provides content locality at any desired degree of granularity. Constrained load balancing encompasses placing data on a particular node, as well as traditional DHT functionality, and any intermediate level of granularity. This granularity is only limited by the hierarchy encoded in nodes' name IDs.

SkipNet's design provides resiliency to common Internet failures that other peer-to-peer systems do not. In the event of a network partition along an organizational boundary, SkipNet fragments into a small number of segments. SkipNet also provides a mechanism to efficiently re-merge these segments with the global SkipNet when the network partition heals. In the face of uncorrelated and independent node failures, SkipNet provides similar guarantees to other peer-to-peer systems.

Our evaluation efforts have demonstrated that SkipNet has performance similar to other peer-to-peer systems such as Chord and Pastry under uniform access patterns. Under access patterns where intra-organizational traffic predominates, SkipNet provides better performance. We have also experimentally verified that SkipNet is significantly more resilient to network partitions than other peer-to-peer systems.

In future work, we plan to deploy SkipNet across a testbed of 2000 machines emulating a WAN. This deployment should further our understanding of SkipNet's behavior in the face of dynamic host joins and departures, network congestion, and other real-world scenarios. We also plan to evaluate the suitability of SkipNet as infrastructure for implementing a scalable event notification service [2].

Acknowledgements

We thank Antony Rowstron, Miguel Castro, and Anne-Marie Kermarrec for allowing us to use their Pastry implementation and network simulator. We also thank Scott Sheffield for his insights on the analysis of searching by name.

REFERENCES

[1] J. Aspnes and G. Shah. Skip Graphs. Accepted for publication to SODA 2003.
[2] L. F. Cabrera, M. B. Jones, and M. Theimer. Herald: Achieving a global event notification service. In *HotOS VIII*, May 2001.
[3] M. Castro, P. Druschel, A. Ganesh, A. Rowstron, and D. Wallach. Security for peer-to-peer routing overlays. In *Proc. of the Fifth Symposium on Operating System Design and Implementation (OSDI)*. USENIX, December 2002.
[4] M. Castro, P. Druschel, Y. C. Hu, and A. Rowstron. Topology-aware routing in structured peer-to-peer overlay networks. In *Microsoft Technical Report #MSR-TR-2002-82*, 2002.
[5] Y.-H. Chu, S. G. Rao, and H. Zhang. A case for end system multicast. In *ACM SIGMETRICS 2000*, pages 1-12, Santa Clara, Calif., June 2000. ACM.
[6] I. Clarke, O. Sandberg, B. Wiley, and T. W. Hong. Freenet: A Distributed Anonymous Information Storage and Retrieval System. In *Workshop on Design Issues in Anonymity and Unobservability*, pages 311-320, July 2000. ICSI, Berkeley, Calif., USA.
[7] T. H. Cormen, C. E. Leiserson, and R. L. Rivest. *Introduction to Algorithms*. MIT Press, Cambridge, Mass., 1990.
[8] F. Dabek, M. F. Kaashoek, D. Karger, R. Morris, and I. Stoica. Wide-area cooperative storage with CFS. In *18th ACM Symposium on Operating Systems Principles*, October 2001.
[9] J. R. Douceur. The Sybil Attack. In *First International Workshop on Peer-to-Peer Systems (IPTPS '02)*, March 2002.
[10] E. Fredkin. Trie Memory. *Communications of the ACM*, 3(9):490-499, September 1960.
[11] Gnutella. http://www.gnutelliums.com/.
[12] S. Gribble, E. Brewer, J. Hellerstein, and D. Culler. Scalable, distributed data structures for Internet service construction. In *Proceedings of the Fourth Symposium on Operating Systems Design and Implementation (OSDI 2000)*, October 2000.
[13] S. Iyer, A. Rowstron, and P. Druschel. Squirrel: A decentralized, peer-to-peer web cache. In *Proceedings of the 21st Annual ACM Symposium on Principles of Distributed Computing (PODC)*. ACM, July 2002.
[14] F. Kaashoek, R. Morris, F. Dabek, 1. Stoica, E. Brunskill, D. Karger, R. Cox, and A. Muthitacharoen. The Chord Project, 2002. http://www.pdos.lcs.mit.edu/chord/.
[15] D. Karger, E. Lehman, F. Leighton, M. Levine, D. Lewin, and R. Panigraphy. Consistent hashing and random trees: Distributed caching protocols for relieving hot spots on the World Wide Web. In *Proceedings of the 29th Annual ACM Symposium on Theory of Computing*, pages 654-663, May 1997.
[16] P. Keleher, S. Bhattacharjee, and B. Silaghi. Are Virtualized Overlay Networks Too Much of a Good Thing? In *First International Workshop on Peer-to-Peer Systems (IPTPS '02)*, March 2002.
[17] D. E. Knuth. *The Art of Computer Programming, Volume 3: Sorting and Searching*. Addison-Wesley, Reading, Mass., 1973.
[18] C. Labovitz and A. Ahuja. Experimental Study of Internet Stability and Wide-Area Backbone Failures. In *Fault-Tolerant Computing Symposium (FTCS)*, June 1999.
[19] D. Malkhi, M. Naor, and D. Ratajczak. Viceroy: A Scalable and Dynamic Emulation of the Butterfly. In *Proceedings of the 21st Annual ACM Symposium on Principles of Distributed Computing (PODC)*. ACM, July 2002.
[20] P. Maymounkov and D. Mazieres. Kademlia: A Peer-to-peer Information System Based on the XOR Metric. In *Proceedings of the 1st International Workshop on Peer-to-Peer Systems (IPTPS '02)*, MIT, March 2002.
[21] D. Oppenheimer and D. A. Patterson. Studying and using failure data from large-scale Internet services. In *10th ACM SIGOPS European Workshop*, September 2002.
[22] T. Papadakis. *Skip Lists and Probabilistic Analysis of Algorithms*. PhD thesis, University of Waterloo, 1993. Also available as Technical Report CS93-28.
[23] W. Pugh. Skip Lists: A Probabilistic Alternative to Balanced Trees. In *Workshop on Algorithms and Data Structures*, pages 437-449, 1989.
[24] W. Pugh. A Skip List Cookbook. Technical Report CS-TR-2286.1, University of Maryland, 1990.
[25] S. Ratnasamy, P. Francis, M. Handley, R. Karp, and S. Shenker. A Scalable Content-Addressable Network. In *Proc. of ACM SIGCOMM*, August 2001.
[26] S. Ratnasamy, M. Handley, R. Karp, and S. Shenker. Application-level Multicast using Content-Addressable Networks. In *Proceedings of the Third International Workshop on Networked Group Communication*, November 2001.
[27] A. Rowstron and P. Druschel. Pastry: Scalable, distributed object location and routing for large-scale peer-to-peer systems. In *International Conference on Distributed Systems Platforms (Middleware)*, pages 329-350, Heidelberg, Germany, November 2001.
[28] A. Rowstron and P. Druschel. Storage management and caching in PAST, a large-scale, persistent peer-to-peer storage utility. In *18th ACM Symposium on Operating Systems Principles*, October 2001.
[29] A. Rowstron, A.-M. Kermarrec, M. Castro, and P. Druschel. Scribe: The design of a large-scale event notification infrastructure. In *Third International Workshop on Networked Group Communications*, November 2001.
[30] I. Stoica, R. Morris, D. Karger, M. F. Kaashoek, and H. Balakrishnan. Chord: A Scalable Peer-To-Peer Lookup Service for Internet Applications. In *Proceedings of the ACM SIGCOMM '01 Conference*, pages 149-160, San Diego, Calif., August 2001.
[31] I. Stoica, R. Morris, D. Karger, M. F. Kaashoek, and H. Balakrishnan. Chord: A Scalable Peer-To-Peer Lookup Service for Internet Applications. Technical Report TR-819, MIT, March 2001.
[32] H. Tangmunarunkit, R. Govindan, S. Shenker, and D. Estrin. The Impact of Routing Policy on Internet Paths. In *INFOCOM*, pages 736-742, April 2001.
[33] M. Theimer and M. B. Jones. Overlook: Scalable Name Service on an Overlay Network. In *Proceedings of the 22nd International Conference on Distributed Computing Systems (ICDCS)*. IEEE Computer Society, July 2002.
[34] A. Vahdat, J. Chase, R. Braynard, D. Kostic, and A. Rodriguez. Self-Organizing Subsets: From Each According to His Abilities, To Each According to His Needs. In *First International Workshop on Peer-to-Peer Systems (IPTPS '02)*, March 2002.
[35] E. W. Zegura, K. L. Calvert, and S. Bhattacharjee. How to Model an Internetwork. In *Proceedings of IEEE Infocom '96*, April 1996.

[36] B. Y. Zhao, J. D. Kubiatowicz, and A. D. Joseph. Tapestry: An Infrastructure for Fault-Resilient Wide-area Location and Routing. Technical Report UCBI/CSD-01-1141, U. C. Berkeley, April 2001.

We claim:

1. At least one computer storage medium storing instructions that, when executed on at least one processor, perform a method for creating an overlay network from a set of networked computers, the method comprising:

assigning each computer a different string name, the string name comprising at least one text string having at least one letter such that the string name can be ordered lexicographically;

assigning each computer a different number, wherein each number is unique over the set of networked computers and the distribution of numbers over computers is probabilistically uniform;

forming at least a base ring, the base ring having the set of networked computers as members, the set of networked computers in the base ring being logically ordered lexicographically by string name;

creating at least one routing table for each computer, wherein the at least one routing table includes two or more pointers, each of the two or more pointers pointing to a respective particular computer that is a different number of positions offset from the computer associated with the respective at least one routing table, a first pointer of the two or more pointers being based, at least in part, on a lexicographical distance between the computer and the respective particular computer to which the at least one pointer points such that the at least one routing table supports routing through a namespace comprising the string names of the set of networked computers;

wherein the first pointer in each computer's at least one routing table points to an immediately following computer when the computers are ordered lexicographically by string name;

wherein a second pointer in each computer's at least one routing table points to an immediately preceding computer when the computers are ordered lexicographically by string name;

wherein a third pointer in each computer's at least one routing table points to a distant computer that is K positions ahead when the computers are ordered lexicographically by string name; and wherein a fourth pointer in each computer's at least one routing table points to a distant computer that is K positions behind when the computers are ordered lexicographically by string name.

2. The at least one computer storage medium of claim 1, wherein the string name is indicative of a domain of the respective computers such that computers that are on the same domain are adjacent to one another when ordered lexicographically by string name.

3. The at least one computer storage medium of claim 1, wherein the pointers are network addresses of computers.

4. The method of claim 3, wherein the network addresses are IP addresses, and wherein the overlay network comprises a subset of the computers connected to the Internet.

5. The at least one computer storage medium of claim 1, further comprising forming one or more subrings within the overlay network by adding additional addresses to each computer's at least one routing table, wherein the additional addresses identify other computers belonging to the same subring, each of the one or more subrings having a respective subset of the set of networked computers.

6. The at least one computer storage medium of claim 1, wherein the computer string names are user email addresses.

7. The at least one computer storage medium of claim 1, wherein the computer string names are uniform resource locators (URLs).

8. The at least one computer storage medium of claim 1, wherein the computer string names are DNS (Domain Name Service) names.

9. The at least one computer storage medium of claim 1, further comprising creating a proximity table for each computer, wherein the proximity table stores one or more pointers to neighboring computers based on network location.

10. The at least one computer storage medium of claim 1, further comprising storing two or more leaf set pointers for each computer.

11. The at least one computer storage medium of claim 1, further comprising:

hashing a file's name to obtain a globally unique identifier (GUID);

finding a computer on the overlay network with a closest number to the GUID; and storing the file on that computer.

12. The at least one computer storage medium of claim 1, further comprising:

receiving a file name and identifying a computer on the overlay network whose string name most closely matches the file name; and storing the file associated with the file name on the identified computer.

13. The at least one computer storage medium of claim 1, further comprising:

hashing a file's name to obtain a globally unique identifier (GUID), wherein the file's name includes a domain identifier prefix indicating which domain on the overlay network the file should be stored in;

finding the computer on the overlay network that has the closest number to the GUID of the computers on the overlay network with computer string names matching the domain identifier; and storing the file on that computer.

14. The at least one computer storage medium of claim 1, further comprising receiving a file to store on the overlay network and performing constrained load balancing.

15. The at least one computer storage medium of claim 1, further comprising:

receiving a file to store on the overlay network; and performing a constrained load balancing to store the file on a computer on the overlay network.

16. The at least one computer storage medium of claim 1, further comprising using the overlay network to implement a peer-to-peer network.

17. The at least one computer storage medium of claim 1, further comprising:

establishing intervals of the arbitrary string identifiers; and choosing computers with desirable properties to fill those intervals.

18. The at least one computer storage medium of claim 17, wherein the desirable property is network proximity.

19. The at least one computer storage medium of claim 16, wherein the peer-to-peer network allows users to store data on a particular computer of the overlay network by specifying the particular computer using the particular computer's string identifier.

20. The at least one computer storage medium of claim 1, wherein a network partition at an organizational boundary within the overlay network results in two disjoint, but internally connected and operationally smaller overlay networks.

21. The at least one computer storage medium of claim 20, further comprising updating the pointer table after the network partition is detected such that the local partition forms a complete overlay network.

22. The at least one computer storage medium of claim 20, further comprising updating the pointer table after the network partition is repaired and the individual partitioned overlay networks are rejoined.

23. The at least one computer storage medium method of claim 1, in which the computers' numbers are used to determine the pointers used in the routing table.

24. The at least one computer storage medium of claim 1, in which the computers' numbers are randomly generated.

25. The at least one computer storage medium of claim 1, in which prefixes of the computers' numbers are used to determine membership in a ring.

26. At least one computer storage medium storing instructions that when executed on at least one processor, perform a method for creating an overlay network from a set of networked computers, wherein each computer has an address, the method comprising:
   assigning each computer a different string name, the string name comprising at least one text string having at least one letter such that the string name can be ordered lexicographically;
   assigning each computer a different number; and
   creating a table for each computer, wherein the table has two or more levels having respective level numbers h, wherein a first level has a level number h=0 and includes an address of an immediately following computer when the computers are ordered lexicographically by string name, wherein a second level includes an address of an immediately preceding computer when the computers are ordered lexicographically by string name, wherein a third level includes an address of a distant computer that is K positions ahead when the computers are ordered lexicographically by string name, wherein a fourth level includes an address of a distant computer that is K positions behind when the computers are ordered lexicographically by string name, and wherein subsequent levels of the table respectively include an address of a computer that is $h^k$ computers away lexicographically, wherein k is a positive integer,
   wherein the lexicographical order of the computers is determined by the computers' string names, and wherein the table supports routing through a namespace comprising the string names of the set of networked computers.

27. The at least one computer storage medium of claim 26, wherein the number associated with the computer is used to substantially evenly distribute computers into subrings, wherein each computer belonging to a particular subring has at least a pointer to the immediately neighboring computers in the subring when the computers in the subrings are ordered lexicographically according to computer string name.

28. The at least one computer storage medium of claim 26 further comprising:
   determining whether a file is to be restricted to a set of computers on the overlay network sharing a common name prefix of the associated string name;
   hashing a file's filename to produce a globally unique identifier (GUID); and searching the overlay network for the best matching computer, wherein each computer on the overlay network has an associated number, and wherein the best matching computer is determined by comparing the GUID and the associated number, wherein only computers sharing the common name prefix are considered if the file is to be restricted to the set of computers on the overlay network sharing the common name prefix.

29. The at least one computer storage medium of claim 28, wherein the method is implemented as an application level overlay network.

30. At least one computer storage medium storing instructions that, when executed on at least one processor, perform a method for managing an overlay network when two or more computers share a single physical location, the method comprising:
   assigning each computer a different string name, the string name comprising at least one text string having at least one letter such that the string name can be ordered lexicographically;
   storing only a partial routing table for some of the computers; and
   storing a shared proximity table for the computers, wherein each routing table includes two or more routing pointers,
   each routing pointer points to a particular computer that is a different number of positions offset from the current computer when the set of networked computers is ordered lexicographically by string name,
   each proximity table includes one or more proximity pointers, each of the one or more proximity pointers pointing to a particular computer that is a different number of network positions offset from the current computer when the set of networked computers is ordered according to their network distance from each other,
   wherein the routing table supports routing through a namespace comprising the plurality of computer string names, and
   wherein a first pointer in each computer's at least one routing table points to an immediately following computer when the computers are ordered lexicographically by string name,
   wherein a second pointer in each computer's at least one routing table points to an immediately preceding computer when the computers are ordered lexicographically by string name,
   wherein a third pointer in each computer's at least one routing table points to a distant computer that is K positions ahead when the computers are ordered lexicographically by string name, and
   wherein a fourth pointer in each computer's at least one routing table points to a distant computer that is K positions behind when the computers are ordered lexicographically by string name.

31. A system including an overlay network comprising:
   a plurality of computers interconnected via the overlay network in a plurality of ring levels ordered in a hierarchy, each ring at a successive level in the hierarchy including a subset of the plurality of computers included in a ring at a level higher up in the hierarchy, each of the plurality of computers having a respective string identifier comprising at least one text string having at least one letter such that the string identifier can be ordered lexicographically, the plurality of computers being ordered lexicographically within each of the plurality of ring levels,
   wherein each of the plurality of computers comprises at least one memory device having stored thereon:
      a proximity table to store pointers to other nodes connected via the overlay network such that routing may be performed in a namespace formed by the respective string identifiers, the proximity table storing the pointers based, at least in part, on a network distance between the computer associated with the proximity table and respective neighboring computers;

a routing table to store pointers to neighboring computers based, at least in part, on ring memberships and on a lexicographical distance between the computer associated with the routing table and respective neighboring computers;

wherein a first pointer in each computer's at least one routing table points to an immediately following computer when the computers are ordered lexicographically by string name, wherein a second pointer in each computer's at least one routing table points to an immediately preceding computer when the computers are ordered lexicographically by string name, wherein a third pointer in each computer's at least one routing table points to a distant computer that is K positions ahead when the computers are ordered lexicographically by string name, and wherein a fourth pointer in each computer's at least one routing table points to a distant computer that is K positions behind when the computers are ordered lexicographically by string name.

32. The system of claim 31, further comprising maintaining the pointer tables for each computer in the overlay network as computers join or leave the overlay network.

* * * * *